US012709453B2

(12) United States Patent
Waltermire et al.

(10) Patent No.: US 12,709,453 B2
(45) Date of Patent: Aug. 18, 2026

(54) INSULATED BOX

(71) Applicant: Pratt Retail Specialties, LLC, Brookhaven, GA (US)

(72) Inventors: Jamie Waltermire, Peachtree City, GA (US); Paul Ott, Atlanta, GA (US); Greg Sollie, Sharpsburg, GA (US)

(73) Assignee: Pratt Retail Specialties, LLC, Brookhaven, GA (US)

( * ) Notice: Subject to any disclaimer, the term of this patent is extended or adjusted under 35 U.S.C. 154(b) by 0 days.

(21) Appl. No.: 18/385,726

(22) Filed: Oct. 31, 2023

(65) Prior Publication Data

US 2024/0067438 A1 Feb. 29, 2024

Related U.S. Application Data

(62) Division of application No. 17/127,050, filed on Dec. 18, 2020, now Pat. No. 11,858,717, which is a (Continued)

(51) Int. Cl.

*B65D 81/38* (2006.01)

*B31B 70/26* (2017.01)

(Continued)

(52) U.S. Cl.

CPC .......... *B65D 81/3858* (2013.01); *B31B 70/26* (2017.08); *B65D 1/24* (2013.01); (Continued)

(58) Field of Classification Search

CPC .... B65D 25/28; B65D 25/30; B65D 25/2802; B65D 25/2882; B65D 5/001; B65D 81/386; B65D 81/3858; B65D 1/24

(Continued)

(56) References Cited

U.S. PATENT DOCUMENTS

| | | | |
|---|---|---|---|
| 265,985 | A | 10/1882 | Seabury |
| 1,061,531 | A | 5/1913 | Emmons |

(Continued)

FOREIGN PATENT DOCUMENTS

| | | |
|---|---|---|
| AU | 2021204424 | 7/2023 |
| AU | 2021245201 | 4/2024 |

(Continued)

OTHER PUBLICATIONS

US 10,562,676 B2, 02/2020, Waltermire et al. (withdrawn)

(Continued)

*Primary Examiner* — Steven A. Reynolds

(74) *Attorney, Agent, or Firm* — Smith, Gambrell & Russell, LLP

(57) ABSTRACT

An insulated box assembly includes an insulated box, the insulated box including a box, the box including a bottom panel and a side panel, the side panel attached to the bottom panel, the box defining a box cavity; and an insulated panel attached to the side panel, the insulated panel including an insulation batt and a sheet, the insulation batt enclosed between the side panel and the sheet; and an insulated cavity panel, the insulated cavity panel disposed within the box cavity, the insulated cavity panel including a cavity sheet and a cavity insulation batt, the cavity sheet encapsulating the cavity insulation batt.

16 Claims, 12 Drawing Sheets

Related U.S. Application Data division of application No. 15/590,349, filed on May 9, 2017, now Pat. No. 10,954,057.

(51) Int. Cl.

| | |
|---|---|
| ***B65D 1/24*** | (2006.01) |
| ***B65D 5/00*** | (2006.01) |
| ***B65D 5/24*** | (2006.01) |
| ***B65D 25/28*** | (2006.01) |
| *B31B 50/26* | (2017.01) |
| *B31B 120/50* | (2017.01) |
| *B65D 6/18* | (2006.01) |

(52) U.S. Cl.

CPC ............. *B65D 5/0065* (2013.01); *B65D 5/24* (2013.01); *B65D 25/287* (2013.01); *B65D 81/386* (2013.01); *B31B 50/26* (2017.08); *B31B 2120/501* (2017.08); *B65D 5/001* (2013.01); *B65D 11/1806* (2013.01); *B65D 81/3848* (2013.01); *B65D 2525/281* (2013.01)

(58) Field of Classification Search

USPC .......................................... 206/545; 220/752

See application file for complete search history.

(56) References Cited

U.S. PATENT DOCUMENTS

| | | | |
|---|---|---|---|
| 1,150,105 | A | 8/1915 | Emmons |
| 1,527,167 | A | 2/1925 | Birdseye |
| 1,601,547 | A | 9/1926 | Wofford |
| 1,677,565 | A | 7/1928 | Oppenheim |
| 1,682,410 | A | 8/1928 | Oppenheim |
| 1,747,980 | A | 2/1930 | Kondolf |
| 1,753,813 | A | 4/1930 | Washburn |
| 1,792,627 | A | 2/1931 | Bowersock |
| 1,868,996 | A | 7/1932 | Sharp |
| 1,896,076 | A | 2/1933 | Frostad |
| 1,896,393 | A | 2/1933 | Devine |
| 1,899,892 | A | 2/1933 | D'Este et al. |
| 1,930,680 | A | 10/1933 | Hinton |
| 1,935,923 | A | 11/1933 | Thoke |
| 1,937,263 | A | 11/1933 | Bubb |
| 1,942,917 | A | 1/1934 | D'Este et al. |
| 1,954,013 | A | 4/1934 | Lilienfield |
| 1,993,394 | A | 3/1935 | Bangs et al. |
| 2,018,519 | A | 10/1935 | Hall |
| 2,023,682 | A | 12/1935 | Higginbottom |
| 2,070,747 | A | 2/1937 | Ostrom |
| 2,116,513 | A | 5/1938 | Frankenstein |
| 2,148,454 | A | 2/1939 | Gerard |
| 2,165,327 | A | 7/1939 | Zalkind |
| 2,289,060 | A | 7/1942 | Merkle |
| 2,293,361 | A | 8/1942 | Roberts |
| 2,326,817 | A | 8/1943 | Zalkind |
| 2,360,806 | A | 10/1944 | Van Rosen |
| 2,386,905 | A | 10/1945 | Meitzen |
| 2,389,601 | A | 11/1945 | De Witt |
| 2,485,643 | A | 10/1949 | Norquist |
| 2,554,004 | A | 5/1951 | Bergstein |
| 2,632,311 | A | 3/1953 | Sullivan |
| 2,650,016 | A | 8/1953 | Mcmillan |
| 2,717,114 | A | 9/1955 | Parham, Jr. |
| 2,753,102 | A | 7/1956 | Paige |
| 2,761,610 | A | 9/1956 | Welshenbach |
| 2,867,035 | A | 1/1959 | Patterson, Jr. |
| 2,899,103 | A | 8/1959 | Ebert |
| 2,927,720 | A | 3/1960 | Adams |
| 2,950,225 | A | 8/1960 | Losse |
| 2,954,913 | A | 10/1960 | Rossman |
| 2,979,246 | A | 4/1961 | Liebeskind |
| 2,986,324 | A | 5/1961 | Anderson, Jr. |
| 2,987,239 | A | 6/1961 | Atwood |
| 3,003,622 | A | 10/1961 | Hardigg |
| 3,003,680 | A | 10/1961 | Wilcox, Jr. et al. |
| 3,024,935 | A | 3/1962 | Mnick |
| 3,029,008 | A | 4/1962 | Membrino |
| 3,031,121 | A | 4/1962 | Chase |
| 3,055,575 | A | 9/1962 | Gerard |
| 3,065,514 | A | 11/1962 | Henning et al. |
| 3,065,895 | A | 11/1962 | Lipschutz |
| 3,096,879 | A | 7/1963 | Schumacher |
| 3,097,782 | A | 7/1963 | Koropatkin et al. |
| 3,149,771 | A | 9/1964 | Pearl |
| 3,182,913 | A | 5/1965 | Brian |
| 3,193,176 | A | 7/1965 | Gullickson et al. |
| 3,194,471 | A | 7/1965 | Murphy |
| 3,206,103 | A | 9/1965 | Bixler |
| 3,222,843 | A | 12/1965 | Schneider |
| 3,236,206 | A | 2/1966 | Willinger |
| 3,282,411 | A | 11/1966 | Jardine |
| 3,286,825 | A | 11/1966 | Laas |
| 3,335,941 | A | 8/1967 | Gatward |
| 3,344,973 | A | 10/1967 | Studen |
| 3,346,173 | A | 10/1967 | Smith et al. |
| 3,349,984 | A | 10/1967 | Halko, Jr. |
| 3,371,462 | A | 3/1968 | Nordkvist et al. |
| 3,375,934 | A | 4/1968 | Bates |
| 3,399,818 | A | 9/1968 | Stegner |
| 3,420,363 | A | 1/1969 | Blickensderfer |
| 3,435,736 | A | 4/1969 | Reiche |
| 3,465,948 | A | 9/1969 | Boyer |
| 3,503,550 | A | 3/1970 | Main et al. |
| 3,504,475 | A | 4/1970 | Dickard et al. |
| 3,551,945 | A | 1/1971 | Eyberg et al. |
| 3,670,948 | A | 6/1972 | Berg |
| 3,703,383 | A | 11/1972 | Kuchenbecker |
| 3,719,318 | A | 3/1973 | Moran |
| 3,734,336 | A | 5/1973 | Rankow et al. |
| 3,736,221 | A | 5/1973 | Evers et al. |
| 3,747,743 | A | 7/1973 | Hoffman, Jr. |
| 3,749,299 | A | 7/1973 | Ingle |
| 3,836,044 | A | 9/1974 | Tilp et al. |
| 3,843,038 | A | 10/1974 | Sax |
| 3,850,362 | A | 11/1974 | Stollberg et al. |
| 3,880,341 | A | 4/1975 | Bamburg et al. |
| 3,883,065 | A | 5/1975 | Presnick |
| 3,887,743 | A | 6/1975 | Lane |
| 3,890,762 | A | 6/1975 | Ernst et al. |
| 3,919,372 | A | 11/1975 | Vogele |
| 3,945,561 | A | 3/1976 | Strebelle |
| 3,976,605 | A | 8/1976 | Matsunaga et al. |
| 3,980,005 | A | 9/1976 | Buonaiuto |
| 4,030,227 | A | 6/1977 | Oftedahl |
| 4,050,264 | A | 9/1977 | Tanaka |
| 4,068,779 | A | 1/1978 | Canfield |
| 4,091,852 | A | 5/1978 | Jordan et al. |
| 4,146,660 | A | 3/1979 | Hall et al. |
| 4,169,540 | A | 10/1979 | Larsson et al. |
| 4,170,304 | A | 10/1979 | Huke |
| 4,211,267 | A | 7/1980 | Skovgaard |
| 4,213,310 | A | 7/1980 | Buss |
| 4,335,844 | A | 6/1982 | Egli |
| 4,339,039 | A | 7/1982 | Mykleby |
| 4,342,416 | A | 8/1982 | Philips |
| 4,351,165 | A | 9/1982 | Gottsegen et al. |
| 4,380,314 | A | 4/1983 | Langston, Jr. et al. |
| D270,041 | S | 8/1983 | Vestal |
| 4,396,144 | A | 8/1983 | Gutierrez et al. |
| 4,411,373 | A | 10/1983 | Kupersmit |
| 4,418,864 | A | 12/1983 | Neilsen |
| 4,488,623 | A | 12/1984 | Linnell, II et al. |
| 4,509,645 | A | 4/1985 | Hotta |
| 4,536,145 | A | 8/1985 | Sawyer et al. |
| 4,584,201 | A | 4/1986 | Boston |
| 4,602,971 | A | 7/1986 | Bergeron et al. |
| 4,613,627 | A | 9/1986 | Sherman et al. |
| 4,679,242 | A | 7/1987 | Brockhaus |
| 4,682,708 | A | 7/1987 | Pool |
| 4,686,814 | A | 8/1987 | Yanase |
| 4,711,390 | A | 12/1987 | Andrews et al. |
| 4,755,064 | A | 7/1988 | Weber |
| 4,797,010 | A | 1/1989 | Coelho |

(56) References Cited

U.S. PATENT DOCUMENTS 4,805,776 A 2/1989 Namgyal et al.
4,819,793 A 4/1989 Willard et al.
4,828,133 A 5/1989 Hougendobler
4,830,282 A 5/1989 Knight, Jr.
4,889,252 A 12/1989 Rockom et al.
4,930,903 A 6/1990 Mahoney
4,953,705 A 9/1990 Evamy
4,979,933 A 12/1990 Runge
4,988,216 A 1/1991 Lyman
4,989,780 A 2/1991 Foote et al.
5,016,813 A 5/1991 Simons
5,018,663 A * 5/1991 Corso ..................... B65D 5/22 229/148
5,020,481 A 6/1991 Nelson
5,044,776 A 9/1991 Schramer et al.
5,062,527 A 11/1991 Westerman
5,094,547 A 3/1992 Graham
5,100,016 A 3/1992 Wischusen, III
5,102,004 A 4/1992 Hollander et al.
5,154,309 A 10/1992 Wischusen, III et al.
5,158,371 A 10/1992 Moravek
5,165,583 A 11/1992 Kouwenberg
5,185,904 A 2/1993 Rogers et al.
5,201,868 A 4/1993 Johnson
5,226,542 A 7/1993 Boecker et al.
5,229,447 A 7/1993 Miyajima et al.
5,230,450 A 7/1993 Mahvi et al.
5,263,339 A 11/1993 Evans
5,358,757 A 10/1994 Robinette et al.
5,372,429 A 12/1994 Beaver, Jr. et al.
5,414,039 A 5/1995 Watson et al.
5,417,342 A 5/1995 Hutchison
5,418,031 A 5/1995 English
5,441,170 A 8/1995 Bane, III
5,454,471 A 10/1995 Norvell
5,454,909 A 10/1995 Morganelli
5,460,324 A 10/1995 Vinther
5,491,186 A 2/1996 Kean et al.
5,493,874 A 2/1996 Landgrebe
5,499,473 A 3/1996 Ramberg
5,505,810 A 4/1996 Kirby et al.
5,507,429 A 4/1996 Arlin
5,511,667 A 4/1996 Carder
5,512,345 A 4/1996 Tsutsumi et al.
5,516,580 A 5/1996 Frenette et al.
5,562,228 A 10/1996 Ericson
5,562,980 A 10/1996 Koutitonsky
5,573,119 A 11/1996 Luray
5,596,880 A 1/1997 Welker et al.
5,601,232 A 2/1997 Greenlee
5,613,610 A 3/1997 Bradford
5,615,795 A 4/1997 Tipps
5,637,368 A 6/1997 Cadalbert et al.
5,638,978 A 6/1997 Cadiente
5,683,772 A 11/1997 Andersen et al.
5,685,129 A 11/1997 Baker
5,775,576 A 7/1998 Stone
5,804,024 A 9/1998 Bloch et al.
5,820,268 A 10/1998 Becker et al.
5,842,571 A 12/1998 Rausch
5,857,778 A 1/1999 Ells
5,906,290 A * 5/1999 Haberkorn ......... B65D 81/3886 190/110
5,922,379 A 7/1999 Wang
5,989,371 A 11/1999 Nishimoto
5,989,724 A 11/1999 Wittosch et al.
5,993,953 A 11/1999 Takahashi et al.
5,996,366 A 12/1999 Renard
6,003,719 A 12/1999 Steward, III
6,007,467 A 12/1999 Becker et al.
6,022,615 A 2/2000 Rettenbacher
D421,457 S 3/2000 Crofton
6,041,958 A 3/2000 Tremelo
6,048,099 A 4/2000 Muffett et al.
6,050,410 A 4/2000 Quirion
6,050,412 A 4/2000 Clough et al.
6,068,402 A 5/2000 Freese et al.
6,080,096 A 6/2000 Becker et al.
6,083,586 A 7/2000 Andersen et al.
6,090,027 A 7/2000 Brinkman
6,103,809 A 8/2000 Ahmed et al.
6,132,822 A 10/2000 Overcash et al.
6,138,902 A 10/2000 Welch
6,146,016 A 11/2000 Mucci et al.
6,164,526 A 12/2000 Dalvey
6,168,040 B1 1/2001 Sautner et al.
6,179,025 B1 1/2001 Sutton
6,200,404 B1 3/2001 Andersen et al.
6,220,473 B1 4/2001 Lehman et al.
6,223,551 B1 5/2001 Mitchell
6,238,091 B1 5/2001 Mogil
6,244,458 B1 6/2001 Frysinger et al.
6,247,328 B1 6/2001 Mogil
6,253,993 B1 7/2001 Lloyd et al.
6,274,077 B1 8/2001 Hur et al.
6,295,830 B1 10/2001 Newman
6,295,860 B1 10/2001 Sakairi et al.
6,296,134 B1 10/2001 Cardinale
6,308,850 B1 10/2001 Coom et al.
6,325,281 B1 12/2001 Grogan
6,364,199 B1 4/2002 Rose
6,406,649 B1 6/2002 Fisk
6,416,620 B1 7/2002 Narancic et al.
6,443,309 B1 9/2002 Becker
6,453,682 B1 9/2002 Jennings et al.
6,478,268 B1 11/2002 Bidwell et al.
6,510,705 B1 1/2003 Jackson
6,513,974 B2 2/2003 Malone et al.
6,517,243 B2 2/2003 Huffer et al.
6,530,480 B1 3/2003 Hardy
6,582,124 B2 6/2003 Mogil
6,598,783 B2 7/2003 Brinkman
6,618,868 B2 9/2003 Minnick
6,641,758 B1 11/2003 Arentsen et al.
6,688,133 B1 2/2004 Donefrio
6,713,548 B1 3/2004 Zhang et al.
6,725,783 B2 4/2004 Sekino
6,726,017 B2 4/2004 Maresh et al.
6,736,309 B1 5/2004 Westerman et al.
6,771,183 B2 8/2004 Hunter
6,821,019 B2 11/2004 Mogil
6,837,420 B2 1/2005 Westerman et al.
6,868,982 B2 3/2005 Gordon
6,875,486 B2 4/2005 Miller
6,878,199 B2 4/2005 Bowden et al.
6,899,229 B2 5/2005 Dennison et al.
6,910,582 B2 6/2005 Lantz
6,913,389 B2 7/2005 Kannankeril et al.
6,971,539 B1 12/2005 Abbe
7,000,962 B2 2/2006 Le
7,019,271 B2 3/2006 Wnek et al.
7,041,369 B1 5/2006 Mackey et al.
7,070,841 B2 7/2006 Benim et al.
7,083,673 B2 8/2006 Bowden et al.
7,094,192 B2 8/2006 Schoenberger et al.
7,138,078 B2 11/2006 Gotoh
7,140,773 B2 11/2006 Becker et al.
D534,797 S 1/2007 El-Afandi
7,170,040 B1 1/2007 Benim et al.
D545,189 S 6/2007 El-Afandi
7,225,632 B2 6/2007 Derifield
7,225,970 B2 6/2007 Philips
7,229,677 B2 6/2007 Miller
7,235,308 B2 6/2007 Druckrey et al.
D546,679 S 7/2007 El-Afandi
7,255,261 B2 8/2007 Mesly
7,264,147 B1 9/2007 Benson et al.
7,270,358 B2 9/2007 Hirsch
7,322,162 B2 1/2008 Gifford
7,392,931 B2 7/2008 Issler
7,452,316 B2 11/2008 Cals et al.
D582,676 S 12/2008 Rothschild
7,484,623 B2 2/2009 Goodrich
7,487,904 B2 2/2009 McClure

(56) References Cited

U.S. PATENT DOCUMENTS 7,597,209 B2 10/2009 Rothschild et al.
7,607,563 B2 10/2009 Hanna et al.
7,659,316 B2 2/2010 Kittle et al.
7,677,406 B2 3/2010 Maxson
7,681,405 B2 3/2010 Williams
7,784,301 B2 8/2010 Sasaki et al.
7,807,773 B2 10/2010 Matsuoka et al.
7,832,558 B2 11/2010 Cheng et al.
7,841,512 B2 11/2010 Westerman et al.
7,845,508 B2 12/2010 Rothschild et al.
7,870,992 B2 1/2011 Schille et al.
7,908,870 B2 3/2011 Williams
7,909,806 B2 3/2011 Goodman et al.
7,943,765 B2 5/2011 Muller et al.
7,955,428 B2 6/2011 Aoki et al.
7,967,904 B2 6/2011 Bowden et al.
7,971,720 B2 7/2011 Minkler
8,003,032 B2 8/2011 Al-Sabih et al.
8,118,177 B2 2/2012 Drapela et al.
8,153,783 B2 4/2012 Muller et al.
8,209,995 B2 7/2012 Kieling et al.
8,210,353 B2 7/2012 Epicureo
8,277,718 B2 10/2012 Aoki et al.
8,343,024 B1 1/2013 Contanzo, Jr. et al.
8,365,943 B2 2/2013 Bentley
8,389,110 B2 3/2013 Liu
8,465,404 B2 6/2013 Hadley
8,567,662 B2 10/2013 Costanzo, Jr.
8,579,183 B2 11/2013 Belfort et al.
8,596,520 B2 12/2013 Scott
8,613,202 B2 12/2013 Williams
8,651,593 B2 2/2014 Bezich et al.
8,679,826 B2 3/2014 Yamamoto et al.
8,763,811 B2 7/2014 Lantz
8,763,886 B2 7/2014 Hall
D710,692 S 8/2014 Genender
8,795,470 B2 8/2014 Henderson et al.
8,875,885 B2 * 11/2014 Padden .................. B65D 65/44
206/593
8,875,983 B2 11/2014 Lenhard et al.
8,919,082 B1 12/2014 Cataldo
8,960,528 B2 2/2015 Sadlier
9,139,319 B2 9/2015 Crespo et al.
9,199,782 B1 12/2015 Cliatt
9,211,970 B2 12/2015 Hubbard, Jr. et al.
9,217,253 B2 12/2015 Collison
9,272,475 B2 3/2016 Ranade et al.
9,290,313 B2 3/2016 De Lesseux et al.
9,322,136 B2 4/2016 Ostendorf et al.
D758,182 S 6/2016 Sponselee
9,358,576 B2 6/2016 Anderson et al.
9,394,633 B2 7/2016 Shimotsu et al.
D764,903 S 8/2016 Sanfilippo et al.
9,408,445 B2 8/2016 Mogil et al.
9,410,032 B2 8/2016 Kim et al.
9,429,350 B2 8/2016 Chapman, Jr.
9,457,929 B2 10/2016 Jenkins
9,499,294 B1 11/2016 Contanzo, Jr.
9,499,309 B2 11/2016 Zerfas et al.
9,505,516 B2 11/2016 Hubbard, Jr. et al.
9,533,790 B2 1/2017 Williams
9,550,618 B1 1/2017 Jobe
9,580,846 B2 2/2017 Tseitlin et al.
9,605,382 B2 3/2017 Mrtanen
9,611,067 B2 4/2017 Collison
9,635,916 B2 5/2017 Bezich et al.
9,656,779 B2 5/2017 Arki
9,688,454 B2 6/2017 Ranade
9,701,437 B2 7/2017 Bugas et al.
9,738,420 B2 8/2017 Miller
9,738,432 B1 8/2017 Petrucci et al.
9,828,165 B2 11/2017 Ranade et al.
9,834,366 B2 12/2017 Giuliani
9,856,069 B1 1/2018 Dong
9,908,680 B2 3/2018 Shi et al.
9,908,684 B2 3/2018 Collison
9,920,517 B2 3/2018 Sollie et al.
9,950,830 B2 4/2018 De Lesseux et al.
9,957,098 B2 5/2018 Jobe
9,981,797 B2 5/2018 Aksan et al.
10,046,901 B1 8/2018 Jobe
10,065,786 B2 9/2018 Kuhn
10,094,126 B2 10/2018 Collison et al.
10,112,756 B2 10/2018 Menzel, Jr.
10,226,909 B2 3/2019 Frem et al.
10,266,332 B2 4/2019 Aksan et al.
10,273,073 B2 4/2019 Collison
10,357,936 B1 7/2019 Mncent et al.
10,392,156 B2 8/2019 Mcdonald et al.
10,400,105 B2 9/2019 Stevens
10,435,194 B2 10/2019 Sollie et al.
10,442,600 B2 10/2019 Waltermire et al.
10,449,694 B2 10/2019 Ojala et al.
10,507,968 B2 12/2019 Sollie et al.
10,550,523 B2 2/2020 Shih
10,551,110 B2 2/2020 Waltermire et al.
10,583,977 B2 3/2020 Collison et al.
10,604,304 B2 3/2020 Waltermire et al.
D881,690 S 4/2020 Smalley
10,661,941 B2 5/2020 Genender et al.
10,662,301 B2 5/2020 Krause et al.
10,676,263 B2 6/2020 Menzel, Jr.
10,745,542 B2 8/2020 Bastioli et al.
10,787,303 B2 9/2020 Chase et al.
10,800,595 B2 10/2020 Waltermire et al.
10,843,840 B2 11/2020 Sollie et al.
10,858,141 B2 12/2020 Sollie et al.
10,875,979 B2 12/2020 Ge et al.
10,882,681 B2 1/2021 Waltermire et al.
10,882,682 B2 1/2021 Collison et al.
10,882,683 B2 1/2021 Collison et al.
10,882,684 B2 1/2021 Sollie et al.
10,926,939 B2 2/2021 Collison et al.
10,941,977 B2 3/2021 Waltermire et al.
10,947,025 B2 3/2021 Sollie et al.
10,954,057 B2 3/2021 Waltermire et al.
10,954,058 B2 3/2021 Sollie et al.
11,027,875 B2 6/2021 Sollie et al.
11,046,500 B2 6/2021 Collison et al.
11,059,652 B2 7/2021 Sollie et al.
11,066,228 B2 7/2021 Sollie et al.
11,117,731 B2 9/2021 Waltermire et al.
11,124,354 B2 9/2021 Waltermire et al.
D934,064 S 10/2021 Satnick
11,137,198 B2 10/2021 Waltermire et al.
11,148,870 B2 10/2021 Collison et al.
11,203,458 B2 12/2021 Sollie et al.
11,214,427 B2 1/2022 Collison et al.
11,215,393 B2 1/2022 Waltermire et al.
11,230,404 B2 1/2022 Sollie et al.
11,247,806 B2 2/2022 Sollie et al.
11,247,827 B2 2/2022 Jobe
11,255,596 B2 2/2022 Waltermire et al.
11,261,017 B2 3/2022 Waltermire et al.
11,267,641 B2 3/2022 Collison et al.
11,286,099 B2 3/2022 Sollie et al.
11,312,563 B2 4/2022 Smith
11,325,772 B2 5/2022 Sollie et al.
D955,876 S 6/2022 Sill et al.
D957,246 S 7/2022 Culler et al.
D957,936 S 7/2022 Lincoln
D968,950 S 11/2022 Sollie et al.
11,485,566 B2 11/2022 Waltermire et al.
11,499,770 B2 11/2022 Rizzo et al.
11,524,832 B2 12/2022 Sollie et al.
11,542,092 B2 1/2023 Sollie et al.
11,565,871 B2 1/2023 Waltermire et al.
11,618,608 B2 4/2023 Sollie et al.
11,623,783 B2 4/2023 Sollie et al.
11,628,978 B2 4/2023 Waltermire et al.
11,634,265 B2 4/2023 Collison et al.
11,679,925 B2 6/2023 Sollie et al.
11,692,762 B2 7/2023 Waltermire et al.
11,697,542 B2 7/2023 Sollie et al.

(56) References Cited

U.S. PATENT DOCUMENTS 11,713,180 B2 8/2023 Sollie et al.
11,718,464 B2 8/2023 Sollie et al.
11,724,851 B2 8/2023 Sollie et al.
11,780,635 B2 10/2023 Sollie et al.
11,780,636 B2 10/2023 Sollie et al.
11,780,666 B2 10/2023 Collison et al.
11,820,579 B1 11/2023 Lantz
11,858,717 B2 1/2024 Waltermire et al.
11,919,699 B2 3/2024 Sollie et al.
11,940,204 B2 3/2024 Waltermire et al.
11,975,910 B2 5/2024 Sollie et al.
11,999,553 B2 6/2024 Sollie et al.
12,038,227 B2 7/2024 Waltermire et al.
12,060,214 B2 8/2024 Waltermire et al.
12,179,990 B2 12/2024 Sollie et al.
12,195,266 B2 1/2025 Sollie et al.
12,270,153 B2 4/2025 Anagnostopoulos et al.
12,286,285 B2 4/2025 Waltermire et al.
12,286,286 B2 4/2025 Sollie et al.
12,297,016 B2 5/2025 Sollie et al.
12,298,060 B2 5/2025 Waltermire et al.
12,305,911 B2 5/2025 Waltermire et al.
12,344,454 B2 7/2025 Sollie et al.
12,365,529 B2 7/2025 Collison et al.
12,371,221 B2 7/2025 Sollie et al.
12,415,649 B2 9/2025 Sollie et al.
12,504,220 B2 12/2025 Waltermire et al.
12,515,870 B2 1/2026 Waltermire et al.
12,522,420 B2 1/2026 Sollie et al.
12,528,637 B2 1/2026 Sollie et al.
12,565,371 B2 3/2026 Colilson et al.
2001/0004088 A1* 6/2001 Lau ...................... B65D 5/2033 229/117.22
2001/0010312 A1 8/2001 Mogil
2001/0024716 A1 9/2001 Chen et al.
2002/0020188 A1 2/2002 Sharon et al.
2002/0050324 A1 5/2002 Middelstadt
2002/0056500 A1 5/2002 Collison et al.
2002/0064318 A1 5/2002 Malone et al.
2002/0134698 A1 9/2002 Rhodes et al.
2002/0162767 A1 11/2002 Ohtsubo
2003/0099833 A1 5/2003 Erb, Jr. et al.
2003/0113563 A1 6/2003 Buhring
2003/0113565 A1 6/2003 Silver et al.
2003/0145561 A1 8/2003 Cals et al.
2003/0159777 A1 8/2003 Tsujimoto et al.
2003/0199218 A1 10/2003 Mueller et al.
2004/0004111 A1 1/2004 Cardinale
2004/0031842 A1 2/2004 Westerman et al.
2004/0079794 A1 4/2004 Mayer
2004/0119202 A1 6/2004 Helber et al.
2004/0140243 A1 7/2004 Roesel et al.
2004/0164132 A1 8/2004 Kuester
2004/0209058 A1 10/2004 Chou et al.
2005/0109655 A1 5/2005 Vershum et al.
2005/0117817 A1 6/2005 Mogil et al.
2005/0186417 A1 8/2005 Rodriguez
2005/0189404 A1 9/2005 Xiaohai et al.
2005/0214512 A1 9/2005 Fascio
2005/0224501 A1 10/2005 Folkert et al.
2005/0279963 A1 12/2005 Church et al.
2006/0037815 A1 2/2006 Schabel, Jr.
2006/0053828 A1 3/2006 Shallman et al.
2006/0062990 A1 3/2006 Gotoh
2006/0078720 A1 4/2006 Toas et al.
2006/0096978 A1 5/2006 Lafferty et al.
2006/0193541 A1 8/2006 Norcom
2006/0235099 A1 10/2006 Kamite et al.
2006/0243784 A1 11/2006 Glaser et al.
2006/0255507 A1 11/2006 Bowden et al.
2007/0000932 A1 1/2007 Cron et al.
2007/0000983 A1 1/2007 Spurrell et al.
2007/0012414 A1 1/2007 Kajander et al.
2007/0051782 A1 3/2007 Lantz
2007/0071368 A1 3/2007 Becker et al.
2007/0122584 A1 5/2007 Song et al.
2007/0151685 A1 7/2007 Horsfield et al.
2007/0193298 A1 8/2007 Derifield
2007/0209307 A1 9/2007 Andersen
2007/0257040 A1 11/2007 Price, Jr. et al.
2008/0095959 A1 4/2008 Warner et al.
2008/0095970 A1 4/2008 Takashima et al.
2008/0135564 A1 6/2008 Romero
2008/0156581 A1 7/2008 Englert et al.
2008/0173703 A1 7/2008 Westerman et al.
2008/0190940 A1 8/2008 Scott
2008/0203090 A1 8/2008 Dickinson
2008/0268220 A1 10/2008 Olliges
2008/0289302 A1 11/2008 Vulpitta
2008/0296356 A1 12/2008 Hatcher et al.
2008/0308616 A1 12/2008 Phung
2008/0314794 A1 12/2008 Bowman
2009/0034883 A1 2/2009 Giuliani
2009/0078708 A1 3/2009 Williams
2009/0114311 A1 5/2009 McDowell
2009/0193765 A1 8/2009 Lantz
2009/0214142 A1 8/2009 Bossel et al.
2009/0275531 A1 11/2009 Muller et al.
2009/0283578 A1 11/2009 Miller
2009/0288791 A1 11/2009 Hammer et al.
2010/0001056 A1 1/2010 Chandaria
2010/0006630 A1 1/2010 Humphries et al.
2010/0062921 A1 3/2010 Veiseh
2010/0072105 A1 3/2010 Glaser et al.
2010/0109196 A1 5/2010 Al-Sabih et al.
2010/0139878 A1 6/2010 Clemente
2010/0140124 A1 6/2010 Hafner
2010/0151164 A1 6/2010 Grant et al.
2010/0168260 A1 7/2010 Frenzel et al.
2010/0219232 A1 9/2010 Smith
2010/0258574 A1 10/2010 Bentley
2010/0263812 A1 10/2010 Awadel-Karim
2010/0270317 A1 10/2010 Kieling et al.
2010/0282827 A1 11/2010 Padovani
2010/0284634 A1 11/2010 Hadley
2010/0285294 A1 11/2010 Crane et al.
2010/0291822 A1 11/2010 Netravali
2010/0314397 A1 12/2010 Williams et al.
2010/0314437 A1 12/2010 Dowd
2010/0326993 A1 12/2010 Mayer et al.
2011/0042388 A1 2/2011 Tristancho Tello
2011/0042449 A1 2/2011 Copenhaver et al.
2011/0095245 A1 4/2011 Munson et al.
2011/0100868 A1 5/2011 Lantz
2011/0114513 A1 5/2011 Miller
2011/0147391 A1 6/2011 Corder et al.
2011/0235950 A1 9/2011 Lin
2011/0240515 A1 10/2011 Ridgeway
2011/0244258 A1 10/2011 Vonfelden
2011/0284556 A1 11/2011 Palmer et al.
2011/0311758 A1 12/2011 Burns et al.
2011/0317944 A1 12/2011 Liu
2012/0031957 A1 2/2012 Whitaker
2012/0074823 A1 3/2012 Bezich et al.
2012/0097067 A1 4/2012 Fascio
2012/0145568 A1 6/2012 Collison et al.
2012/0178856 A1 7/2012 Gobl et al.
2012/0193365 A1 8/2012 Humphries et al.
2012/0243808 A1 9/2012 De Lesseux et al.
2012/0248101 A1 10/2012 Tumber et al.
2012/0251818 A1 10/2012 Axrup et al.
2012/0276619 A1 11/2012 Yamamoto et al.
2012/0279896 A1 11/2012 Lantz
2012/0292226 A1 11/2012 Hilbish
2012/0309246 A1 12/2012 Tseitlin et al.
2012/0328807 A1 12/2012 Grimes
2013/0017349 A1 1/2013 Heiskanen et al.
2013/0026215 A1 1/2013 Lenhard et al.
2013/0101855 A1 4/2013 Cham et al.
2013/0112694 A1 5/2013 Bentley
2013/0112695 A1 5/2013 Hall
2013/0140317 A1 6/2013 Roskoss
2013/0203879 A1 8/2013 Rensen et al.
2013/0256940 A1 10/2013 Henderson et al.

(56) References Cited

U.S. PATENT DOCUMENTS

2014/0000306 A1 1/2014 Chapman, Jr.
2014/0021208 A1 1/2014 Anti et al.
2014/0093697 A1 4/2014 Perry et al.
2014/0144161 A1 5/2014 Pointer et al.
2014/0174682 A1 6/2014 Brungardt
2014/0248003 A1 9/2014 Mogil et al.
2014/0272163 A1 9/2014 Tilton
2014/0272352 A1 9/2014 Tilton
2014/0274633 A1 9/2014 Tilton
2014/0300026 A1 10/2014 Taccolini
2014/0312107 A1 10/2014 Nash
2014/0319018 A1 10/2014 Collison
2014/0367393 A1 12/2014 Ranade
2015/0068696 A1 3/2015 Reed et al.
2015/0110423 A1 4/2015 Fox et al.
2015/0111011 A1 4/2015 Hoekstra et al.
2015/0166244 A1 6/2015 Wood et al.
2015/0175338 A1 6/2015 Culp et al.
2015/0238033 A1 8/2015 Zavitsanos
2015/0239639 A1 8/2015 Wenner et al.
2015/0255009 A1 9/2015 Akhter et al.
2015/0259126 A1* 9/2015 Mcgoff .................. B23P 19/00 220/592.2
2015/0284131 A1 10/2015 Genender et al.
2015/0345853 A1 12/2015 Oeyen
2015/0367981 A1 12/2015 Moore
2015/0377407 A1 12/2015 Shinoki et al.
2016/0015039 A1 1/2016 Pierce
2016/0052696 A1 2/2016 Cook et al.
2016/0060017 A1 3/2016 De Lesseux et al.
2016/0230343 A1 8/2016 Pang et al.
2016/0236498 A1 8/2016 Anderson et al.
2016/0264294 A1 9/2016 Bacon
2016/0304267 A1 10/2016 Aksan
2016/0312010 A1 10/2016 Alavi
2016/0312941 A1 10/2016 Alavi et al.
2016/0318648 A1 11/2016 Kuninobu
2016/0325915 A1 11/2016 Aksan
2016/0340064 A1 11/2016 Loda
2017/0015080 A1 1/2017 Collison et al.
2017/0021961 A1 1/2017 Humphrey et al.
2017/0043937 A1 2/2017 Lantz
2017/0121052 A1 5/2017 Morimoto
2017/0144792 A1 5/2017 Block
2017/0198959 A1 7/2017 Morris
2017/0217654 A1 8/2017 Harmon
2017/0225870 A1 8/2017 Collison
2017/0233134 A9 8/2017 Grajales et al.
2017/0233165 A1 8/2017 Kuhn
2017/0283157 A1 10/2017 Jobe
2017/0305639 A1 10/2017 Kuhn et al.
2017/0320653 A1 11/2017 Mogil et al.
2017/0334622 A1 11/2017 Menzel, Jr.
2017/0341847 A1 11/2017 Chase et al.
2017/0361973 A1 12/2017 Padilla
2017/0369226 A1 12/2017 Chase et al.
2017/0369667 A1 12/2017 Ruckdaschel et al.
2018/0002451 A1 1/2018 Ge et al.
2018/0050857 A1 2/2018 Collison
2018/0051460 A1 2/2018 Sollie et al.
2018/0086539 A1 3/2018 Aksan et al.
2018/0148245 A1 5/2018 Aggarwal et al.
2018/0148246 A1 5/2018 Fu et al.
2018/0178965 A1 6/2018 Tsai et al.
2018/0194534 A1 7/2018 Jobe
2018/0215525 A1 8/2018 Vogel et al.
2018/0229917 A1 8/2018 Jobe
2018/0237207 A1 8/2018 Aksan et al.
2018/0274837 A1 9/2018 Christensen
2018/0290813 A1 10/2018 Waltermire et al.
2018/0290815 A1 10/2018 Waltermire et al.
2018/0299059 A1 10/2018 Mcgoff et al.
2018/0319569 A1 11/2018 Mcgoff et al.
2018/0327171 A1 11/2018 Waltermire et al.
2018/0327172 A1 11/2018 Waltermire et al.
2018/0334308 A1 11/2018 Moore et al.
2018/0335241 A1 11/2018 Li et al.
2019/0009946 A1 1/2019 Nixon et al.
2019/0032991 A1 1/2019 Waltermire et al.
2019/0040221 A1 2/2019 Hitzler et al.
2019/0047775 A1 2/2019 Waltermire et al.
2019/0071550 A1 3/2019 Ge et al.
2019/0085155 A1 3/2019 Niles
2019/0144155 A1 5/2019 Geng et al.
2019/0185246 A1 6/2019 Sollie et al.
2019/0185247 A1 6/2019 Sollie et al.
2019/0193916 A1 6/2019 Waltermire et al.
2019/0210790 A1 7/2019 Rizzo et al.
2019/0234679 A1 8/2019 Waltermire et al.
2019/0248573 A1 8/2019 Collison et al.
2019/0270572 A1 9/2019 Collison et al.
2019/0270573 A1 9/2019 Collison et al.
2019/0352075 A1 11/2019 Waltermire et al.
2019/0352076 A1 11/2019 Waltermire et al.
2019/0352080 A1 11/2019 Waltermire et al.
2019/0359411 A1 11/2019 Fallgren
2019/0359412 A1 11/2019 Sollie et al.
2019/0359413 A1 11/2019 Sollie et al.
2019/0359414 A1 11/2019 Sollie et al.
2019/0367208 A1 12/2019 Jobe
2019/0367209 A1 12/2019 Jobe
2019/0376636 A1 12/2019 Fellinger et al.
2019/0382186 A1 12/2019 Sollie et al.
2019/0390892 A1 12/2019 Waltermire et al.
2020/0032454 A1 1/2020 Soidinsalo
2020/0047976 A1 2/2020 Collison et al.
2020/0048422 A1 2/2020 Doug et al.
2020/0071056 A1 3/2020 Henderson et al.
2020/0088458 A1 3/2020 Waltermire et al.
2020/0103159 A1 4/2020 Waltermire et al.
2020/0122896 A1 4/2020 Waltermire et al.
2020/0129338 A1 4/2020 Gardiner et al.
2020/0140179 A1 5/2020 Costanzo, Jr.
2020/0148409 A1 5/2020 Sollie et al.
2020/0148410 A1 5/2020 Sollie et al.
2020/0148452 A1 5/2020 Sollie et al.
2020/0148453 A1 5/2020 Sollie et al.
2020/0214314 A1 7/2020 Bakker et al.
2020/0283188 A1 9/2020 Sollie et al.
2020/0308359 A1 10/2020 Glenn et al.
2020/0318292 A1 10/2020 Alden et al.
2020/0346816 A1 11/2020 Sollie et al.
2020/0346841 A1 11/2020 Sollie et al.
2021/0039869 A1 2/2021 Waltermire et al.
2021/0039870 A1 2/2021 Sollie et al.
2021/0039871 A1 2/2021 Sollie et al.
2021/0070527 A1 3/2021 Sollie et al.
2021/0070529 A1 3/2021 Sollie et al.
2021/0070530 A1 3/2021 Sollie et al.
2021/0078755 A1 3/2021 Sollie et al.
2021/0101734 A1 4/2021 Collison et al.
2021/0101735 A1 4/2021 Collison et al.
2021/0101736 A1 4/2021 Waltermire et al.
2021/0101737 A1 4/2021 Waltermire et al.
2021/0102746 A1 4/2021 Waltermire et al.
2021/0155365 A1 5/2021 Sollie et al.
2021/0155367 A1 5/2021 Sollie et al.
2021/0163210 A1 6/2021 Waltermire et al.
2021/0179313 A1 6/2021 Sollie et al.
2021/0179337 A1 6/2021 Sollie et al.
2021/0300665 A1 9/2021 Melchor
2021/0347553 A1 11/2021 Sollie et al.
2022/0002070 A1 1/2022 Moghaddas et al.
2022/0017260 A1 1/2022 Sollie et al.
2022/0024634 A1 1/2022 Sollie et al.
2022/0024635 A1 1/2022 Sollie et al.
2022/0026140 A1 1/2022 Waltermire et al.
2022/0026141 A1 1/2022 Waltermire et al.
2022/0033167 A1 2/2022 Collison et al.
2022/0081152 A1 3/2022 Sollie et al.
2022/0081186 A1 3/2022 Waltermire et al.
2022/0177216 A1 6/2022 Sollie et al.
2022/0185533 A1 6/2022 Chen et al.
2022/0242607 A1 8/2022 Sollie et al.

(56) References Cited

U.S. PATENT DOCUMENTS

| | | | |
|---|---|---|---|
| 2022/0251783 | A1 | 8/2022 | Anagnostopoulos et al. |
| 2022/0288870 | A1 | 9/2022 | Collison et al. |
| 2022/0297918 | A1 | 9/2022 | Collison et al. |
| 2022/0388755 | A1 | 12/2022 | Waltermire et al. |
| 2022/0411167 | A1 | 12/2022 | Sollie et al. |
| 2023/0125191 | A1 | 4/2023 | Waltermire et al. |
| 2023/0159213 | A1 | 5/2023 | Sollie et al. |
| 2023/0159214 | A1 | 5/2023 | Sollie et al. |
| 2023/0182990 | A1 | 6/2023 | Sollie et al. |
| 2023/0227210 | A1 | 7/2023 | Waltermire et al. |
| 2023/0257157 | A1 | 8/2023 | Sollie et al. |
| 2023/0280087 | A1 | 9/2023 | Waltermire et al. |
| 2023/0322466 | A1 | 10/2023 | Sollie et al. |
| 2023/0322467 | A1 | 10/2023 | Sollie et al. |
| 2023/0322468 | A1 | 10/2023 | Sollie et al. |
| 2023/0382627 | A1 | 11/2023 | Collison et al. |
| 2024/0083659 | A1 | 3/2024 | Sollie et al. |
| 2024/0158155 | A1 | 5/2024 | Coles |
| 2024/0159455 | A1 | 5/2024 | Waltermire et al. |
| 2024/0159456 | A1 | 5/2024 | Waltermire et al. |
| 2024/0262600 | A1 | 8/2024 | Collison et al. |
| 2024/0318899 | A1 | 9/2024 | Waltermire et al. |
| 2024/0336424 | A1 | 10/2024 | Waltermire et al. |
| 2025/0100775 | A1 | 3/2025 | Sollie et al. |
| 2025/0187782 | A1 | 6/2025 | Sollie et al. |
| 2025/0188679 | A1 | 6/2025 | Anagnostopoulos et al. |
| 2025/0242992 | A1 | 7/2025 | Sollie et al. |
| 2025/0250095 | A1 | 8/2025 | Waltermire et al. |
| 2025/0257932 | A1 | 8/2025 | Waltermire et al. |
| 2025/0326562 | A1 | 10/2025 | Sollie et al. |
| 2025/0368426 | A1 | 12/2025 | Sollie et al. |
| 2026/0008585 | A1 | 1/2026 | Sollie et al. |
| 2026/0138808 | A1 | 5/2026 | Sollie et al. |
| 2026/0138809 | A1 | 5/2026 | Sollie et al. |

FOREIGN PATENT DOCUMENTS

| | | | |
|---|---|---|---|
| AU | 2018260918 | B2 | 5/2024 |
| AU | 2018260919 | B2 | 5/2024 |
| AU | 2018260920 | B2 | 8/2024 |
| AU | 2018264050 | | 10/2024 |
| AU | 2018260911 | | 11/2024 |
| AU | 2018260915 | B2 | 11/2024 |
| AU | 2018260914 | | 12/2024 |
| AU | 2018260901 | B2 | 1/2025 |
| AU | 2024216411 | B2 | 1/2025 |
| AU | 2023266362 | B2 | 2/2025 |
| AU | 2023285879 | B2 | 4/2025 |
| AU | 2024200915 | B2 | 4/2025 |
| AU | 2024200916 | B2 | 4/2025 |
| AU | 2024200959 | B2 | 4/2025 |
| AU | 2024200964 | B2 | 4/2025 |
| AU | 2023285920 | B2 | 8/2025 |
| AU | 2024216412 | B2 | 9/2025 |
| AU | 2023203006 | B2 | 11/2025 |
| AU | 2024204391 | B2 | 12/2025 |
| CA | 2019104 | | 12/1991 |
| CA | 2097735 | | 12/1994 |
| CA | 2145953 | | 10/1996 |
| CA | 2149939 | | 11/1996 |
| CA | 3176052 | | 9/2025 |
| CN | 1073993 | | 7/1993 |
| CN | 1503962 | | 6/2004 |
| CN | 101605652 | | 12/2009 |
| CN | 102206361 | | 10/2011 |
| CN | 102264961 | | 11/2011 |
| CN | 206494316 | | 9/2017 |
| CN | 108001787 | | 5/2018 |
| CN | 110204794 | | 9/2019 |
| CN | 117071332 | A | 11/2023 |
| DE | 1897846 | | 7/1964 |
| DE | 102011016500 | | 10/2012 |
| DE | 202017103230 | | 7/2017 |
| DE | 202017003908 | | 10/2017 |
| DE | 202018101998 | | 7/2019 |
| DE | 202019003407 | | 11/2019 |
| EP | 0133539 | | 2/1985 |
| EP | 0537058 | | 4/1993 |
| EP | 2363544 | | 9/2011 |
| EP | 2781652 | | 12/2015 |
| EP | 2990196 | | 3/2016 |
| EP | 3144248 | | 3/2017 |
| EP | 3348493 | | 7/2018 |
| EP | 3538708 | | 1/2022 |
| EP | 4071298 | B1 | 1/2024 |
| EP | 4043639 | B1 | 1/2025 |
| FR | 1241878 | | 9/1960 |
| FR | 2705317 | | 11/1994 |
| FR | 2820718 | | 8/2002 |
| FR | 2821786 | | 9/2002 |
| FR | 3016352 | | 7/2015 |
| GB | 217683 | | 6/1924 |
| GB | 235673 | | 6/1925 |
| GB | 528289 | | 1/1940 |
| GB | 713640 | | 8/1954 |
| GB | 1204058 | | 9/1970 |
| GB | 1305212 | | 1/1973 |
| GB | 1372054 | | 10/1974 |
| GB | 2029461 | | 3/1980 |
| GB | 2400096 | | 5/2006 |
| GB | 2516490 | | 1/2015 |
| GB | 2528289 | | 1/2016 |
| GB | 2534912 | | 8/2016 |
| JP | 01254557 | | 10/1989 |
| JP | H0632386 | | 2/1994 |
| JP | H06135487 | | 5/1994 |
| JP | 2001009949 | | 1/2001 |
| JP | 2005139582 | | 6/2005 |
| JP | 2005247329 | | 9/2005 |
| JP | 2006158584 | | 6/2006 |
| JP | 2008050724 | | 3/2008 |
| JP | 4069255 | | 4/2008 |
| JP | 2012126440 | | 7/2012 |
| JP | 2017079632 | | 5/2017 |
| KR | 20050050848 | | 6/2005 |
| KR | 101730461 | | 4/2017 |
| WO | 8807476 | | 10/1988 |
| WO | 9726192 | | 7/1997 |
| WO | 9932374 | | 7/1999 |
| WO | 2001070592 | | 9/2001 |
| WO | 2006091031 | | 8/2006 |
| WO | 2009026256 | | 2/2009 |
| WO | 2009106974 | | 9/2009 |
| WO | 2014147425 | | 9/2014 |
| WO | 2016187435 | A2 | 5/2016 |
| WO | 2016187435 | A3 | 11/2016 |
| WO | 2017207974 | | 12/2017 |
| WO | 2018089365 | | 5/2018 |
| WO | 2018093586 | | 5/2018 |
| WO | 2018112585 | | 6/2018 |
| WO | 2018227047 | | 12/2018 |
| WO | 2019113453 | | 6/2019 |
| WO | 2019125904 | | 6/2019 |
| WO | 2019125906 | | 6/2019 |
| WO | 2019226199 | | 11/2019 |
| WO | 2020011587 | | 1/2020 |
| WO | 2020101939 | | 5/2020 |
| WO | 2020102023 | | 5/2020 |
| WO | 2020122921 | | 6/2020 |
| WO | 2020222943 | | 11/2020 |

OTHER PUBLICATIONS

US 10,899,530 B2, 01/2021, Sollie et al. (withdrawn)
US 10,899,531 B2, 01/2021, Sollie et al. (withdrawn)
US 11,027,908 B2, 06/2021, Sollie et al. (withdrawn)
US 11,040,817 B2, 06/2021, Sollie et al. (withdrawn)
US 11,072,486 B2, 07/2021, Waltermire et al. (withdrawn)
US 11,079,168 B2, 08/2021, Waltermire et al. (withdrawn)
US 11,084,644 B2, 08/2021, Waltermire et al. (withdrawn)
US 11,167,877 B2, 11/2021, Sollie et al. (withdrawn)
US 11,167,878 B2, 11/2021, Sollie et al. (withdrawn)
US 11,247,836 B2, 02/2022, Sollie et al. (withdrawn)

(56) References Cited

OTHER PUBLICATIONS

US 11,292,656 B2, 04/2022, Sollie et al. (withdrawn)
US D959,977 S, 08/2022, Sollie et al. (withdrawn)
US 11,479,403 B2, 10/2022, Sollie et al. (withdrawn)
US 11,498,745 B2, 11/2022, Sollie et al. (withdrawn)
US 11,591,131 B2, 02/2023, Sollie et al. (withdrawn)
US 11,591,132 B2, 02/2023, Sollie et al. (withdrawn)
US 11,603,253 B2, 03/2023, Collison et al. (withdrawn)
US 11,613,421 B2, 03/2023, Sollie et al. (withdrawn)
MP Global Products, LLC; Extended European Search Report for application No. 22152100.8, mailed Jun. 2, 2022, 7 pgs.
Collison, Alan B.; Extended European Search Report for application No. 22173063.3, filed Nov. 7, 2017, mailed Sep. 9, 2022, 7 pgs.
MP Global Products, L.L.C.; Examination Report for Australian patent application No. 2021245201, filed Nov. 7, 2017, mailed Feb. 21, 2023, 3 pgs.
Sollie, Greg; International Preliminary Report on Patentability for PCT/US18/65463, filed Dec. 13, 2018, mailed Dec. 3, 2020, 9 pgs.
Sollie, Greg; International Search Report and Written Opinion for PCT/US18/65463, filed Dec. 13, 2018, mailed Mar. 25, 2019, 11 pgs.
Sollie, Greg; International Preliminary Report on Patentability for PCT Application No. PCT/US20/24820, filed Mar. 26, 2020, mailed Nov. 11, 2021, 13 pgs.
Sollie, Greg; International Search Report and Written Opinion for PCT Application No. PCT/US20/24820, filed Mar. 26, 2020, mailed Jul. 2, 2020, 14 pgs.
Sollie, Greg; International Preliminary Report on Patentability for PCT Application No. PCT/US19/60486, filed Nov. 18, 2019, mailed May 27, 2021, 9 pgs.
Sollie, Greg; International Search Report and Written Opinion for PCT Application No. PCT/US19/60486, filed Nov. 18, 2019, mailed Jan. 13, 2020, 10 pgs.
Sollie, Greg; International Preliminary Report on Patentability for PCT Application No. PCT/US19/59764, filed Nov. 5, 2019, mailed May 27, 2021, 9 pgs.
Sollie, Greg; International Search Report and Written Opinion for PCT Application No. PCT/US19/59764, filed Nov. 5, 2019, mailed Jul. 1, 2020, 13 pgs.
Sollie, Greg; Invitation to Pay Additional Fees for PCT/US19/59764, filed Nov. 5, 2019, mailed Jan. 2, 2020, 2 pgs.
Amazon. ECOOPTS Cling Wrap Plastic Food Wrap with Slide Cutter. First available Dec. 21, 2020. Visited Sep. 2, 2022. https://www.amazon.com/ECOOPTS-Cling-Plastic-Cutter-121 N %C3%971 000FT/dp/B08R3L7K4W/ (Year: 2020).
Sollie, Greg; Notice of Allowance for U.S. Appl. No. 29/745,881, filed Aug. 10, 2020, mailed May 9, 2022, 139 pgs.
Sollie, Greg; Notice of Allowance for U.S. Appl. No. 29/745,881, filed Aug. 10, 2020, mailed Sep. 13, 2022, 12 pgs.
American Bag Company; Article entitled: "Cool Green Bag, Small", located at <http://hotcoldbags.com/items/Cool%20Green%20Bag,%20Small>, accessed on Mar. 20, 2017, 2 pgs.
Cold Keepers; Article entitled: "Insulated Shipping Boxes—Coldkeepers, Thermal Shipping Solutions", located at <https://www.coldkeepers.com/product-category/shipping/>, (Accessed: Jan. 12, 2017), 3 pgs.
Duro Bag; Article entitled: "The Load and Fold Bag", accessed on May 24, 2017, copyrighted Apr. 2017, 3 pgs.
Greenblue; "Environmental Technical Briefs of Common Packaging Materials-Fiber-Based Materials", Sustainable Packaging Solution, 2009.
Images of Novolex bag, including an outer paper bag, a corrugated cardboard insert, and an inner foil-covered bubble-wrap bag, publicly available prior to May 9, 2017, 7 pgs.
MP Global Products, LLC; International Search Report and Written Opinion of the International Searching Authority for PCT/US2017/060403, filed Nov. 7, 2017, mailed Feb. 19, 2018, 15 pgs.
MP Global Products; Article entitled: "Thermopod mailer envelopes and Thermokeeper insulated box liners", located at < http://www.mhpn.com/product/thermopod_mailer_envelopes_and_thermokeeper_insulated_box_liners/packaging>, accessed on Aug. 30, 2017, 2 pgs.
Needles 'N' Knowledge; Article entitled: "Tall Box With Lid", located at <http://needlesnknowledge.blogspot.com/2017/10/tall-box-with-lid.html> (Accessed: Jan. 12, 2017), 10 pgs.
PERIWRAP; Article entitled: "Insulated Solutions", located at <https://www.peri-wrap.com/insulation/>, accessed on Dec. 3, 2018, 9 pgs.
Salazar Packaging; Article entitle: "Custom Packaging and Design", located at <https://salazarpackaging.com/custom-packaging-and-design/>, accessed on Sep. 28, 2017, 2 pgs.
Singh, et al; Article entitled: "Performance Comparison of Thermal Insulated Packaging Boxes, Bags and Refrigerants for Single-parcel Shipments", published Mar. 13, 2007, 19 pgs.
TERA-PAK; Article entitled: "Insulated Shipping Containers", located at <http://www.tera-pak.com/>, accessed on Mar. 20, 2017, 3 pgs.
UN Packaging; Article entitled: "CooLiner ® Insulated Shipping Bags", available at <http://www.chem-tran.com/ packaging/supplies/cooliner-insulated-shipping-bags.php>, accessed on Aug. 30, 2017, 2 pgs.
weiku.com; Article entitled: "100% Biodegradable Packing materials Green Cell Foam Stock Coolers", located at <http://www.weiku.com/products/18248504/100_Biodegradable_Packing_materials_Green_Cell_Foam_Stock_Coolers.html>, accessed on Sep. 28, 2017, 7 pgs.
Sollie, Greg; Final Office Action for U.S. Appl. No. 16/951,465, filed Nov. 18, 2020, mailed Aug. 18, 2022, 20 pgs.
Sollie, Greg; Non-Final Office Action for U.S. Appl. No. 17/493,449, filed Oct. 4, 2021, mailed Jul. 14, 2022, 110 pgs.
Benezet, et al.; Article entitled: "Mechanical and physical properties of expanded starch, reinforced by natural fibres", Industrial Corps and Products 37 (2012) 435-440, available online Oct. 4, 2011, 6 pgs.
Collison, Alan B .; Office Action for Mexico patent application No. MX/a/2019/005376, mailed Mar. 1, 2022, 5 pgs.
Collison, Alan B.; Office Action for Chinese patent application No. 2021107289972, filed Nov. 7, 2017, mailed May 7, 2022, 20 pgs.
Any Custom Box. Perforated Dispenser Boxes. Publication date unavailable. Visited May 2, 2022. https://anycustombox.com/folding-cartons/perforated-dispenser-boxes/, 9 pgs.
Massage Warehouse. Cando® Low Powder 100 Yard Perforated Dispenser. Publication date unavailable. Visited May 2, 2022. https://www.massagewarehouse.com/products/cando-perf-low-powder-1 DO-yd-dispenser/, 2 pgs.
Premier Storage. Oil & Fuel Absorbent Pads. Publication date unavailable. Visited May 2, 2022. https://www.premier-storage.co.uk/oil-and-fuel-absorbent-pads-bonded-and-perforated-double-weight.html, 1 pg.
Collison, Alan B.; Office Action for Chinese patent application No. 2021107289972, filed Nov. 7, 2017, mailed Nov. 23, 2022, 7 pgs.
Sollie, Greg; Notice of Allowance for U.S. Appl. No. 18/208,709, filed Jun. 12, 2023, mailed Jan. 17, 2024, 76 pgs.
Sollie, Greg; Notice of Allowance for U.S. Appl. No. 18/208,708, filed Jun. 12, 2023, mailed Jan. 17, 2024, 142 pgs.
Waltermire, Jamie; Final Office Action for U.S. Appl. No. 17/891,565, filed Aug. 19, 2022, mailed Jan. 17, 2024, 77 pgs.
Waltermire, Jamie; Certificate of Correction for U.S. Appl. No. 15/482,186, filed Apr. 7, 2017, mailed Dec. 29, 2020, 1 pg.
Waltermire, Jamie; Non-Final Office Action for U.S. Appl. No. 15/482,186, filed Apr. 7, 2017, mailed Aug. 20, 2019, 81 pgs.
Waltermire, Jamie; Notice of Allowance for U.S. Appl. No. 15/482,186, filed Apr. 7, 2017, mailed Mar. 5, 2020, 29 pgs.
Waltermire, Jamie; Requirement for Restriction/Election for U.S. Appl. No. 15/482,186, filed Apr. 7, 2017, mailed Apr. 17, 2019, 7 pgs.
Waltermire, Jamie; Applicant-Initiated Interview Summary for U.S. Appl. No. 16/526,511, filed Jul. 30, 2019, mailed Jun. 12, 2020, 5 pgs.
Waltermire, Jamie; Final Office Action for U.S. Appl. No. 16/526,511, filed Jul. 30, 2019, mailed May 19, 2020, 39 pgs.
Waltermire, Jamie; Non-Final Office Action for U.S. Appl. No. 16/526,511, filed Jul. 30, 2019, mailed Dec. 9, 2019, 55 pgs.

(56) References Cited

OTHER PUBLICATIONS

Waltermire, Jamie; Non-Final Office Action for U.S. Appl. No. 16/526,511, filed Jul. 30, 2019, mailed Jul. 10, 2020, 23 pgs.
Waltermire, Jamie; Notice of Allowance for U.S. Appl. No. 16/526,511, filed Jul. 30, 2019, mailed Sep. 14, 2020, 18 pgs.
Carlson, Dave; Article entitled: "FBA Updates Voluntary Standard For Recyclable Wax Alternatives", dated Aug. 14, 2013, Fiber Box Association (Year: 2013), 2 pgs.
Waltermire, Jamie; Final Office Action for U.S. Appl. No. 17/079,437, filed Oct. 24, 2020, mailed Feb. 24, 2022, 24 pgs.
Waltermire, Jamie; Non-Final Office Action for U.S. Appl. No. 17/079,437, filed Oct. 24, 2020, mailed Sep. 20, 2021, 108 pgs.
Waltermire, Jamie; Notice of Allowance for U.S. Appl. No. 17/079,437, filed Oct. 24, 2020, mailed Jun. 2, 2022, 21 pgs.
Waltermire, Jamie; Non-Final Office Action for U.S. Appl. No. 17/891,565, filed Aug. 19, 2022, mailed Sep. 6, 2023, 115 pgs.
Waltermire, Jamie; Final Office Action for U.S. Appl. No. 15/482,200, filed Apr. 7, 2017, mailed Jan. 2, 2019, 23 pgs.
Waltermire, Jamie; Non-Final Office Action for U.S. Appl. No. 15/482,200, filed Apr. 7, 2017, mailed Jun. 11, 2018, 36 pgs.
Waltermire, Jamie; Notice of Allowance for U.S. Appl. No. 15/482,200, filed Apr. 7, 2017, mailed May 14, 2019, 25 pgs.
Waltermire, Jamie; Applicant-Initiated Interview Summary for U.S. Appl. No. 16/530,045, filed Aug. 2, 2019, mailed Jun. 15, 2020, 3 pgs.
Waltermire, Jamie; Certificate of Correction for U.S. Appl. No. 16/530,045, filed Aug. 2, 2019, mailed Mar. 28, 2023, 1 pg.
Waltermire, Jamie; Final Office Action for U.S. Appl. No. 16/530,045, filed Aug. 2, 2019, mailed Nov. 24, 2020, 40 pgs.
Waltermire, Jamie; Final Office Action for U.S. Appl. No. 16/530,045, filed Aug. 2, 2019, mailed Jun. 9, 2022, 20 pgs.
Waltermire, Jamie; Non-Final Office Action for U.S. Appl. No. 16/530,045, filed Aug. 2, 2019, mailed Dec. 20, 2019, 61 pgs.
Waltermire, Jamie; Non-Final Office Action for U.S. Appl. No. 16/530,045, filed Aug. 2, 2019, mailed Feb. 10, 2022, 82 pgs.
Waltermire, Jamie; Non-Final Office Action for U.S. Appl. No. 16/530,045, filed Aug. 2, 2019, mailed May 27, 2020, 38 pgs.
Waltermire, Jamie; Notice of Allowance for U.S. Appl. No. 16/530,045, filed Aug. 2, 2019, mailed Oct. 5, 2022, 14 pgs.
Waltermire, Jamie; Non-Final Office Action for U.S. Appl. No. 16/164,933, filed Oct. 19, 2018, mailed Nov. 18, 2020, 104 pgs.
Waltermire, Jamie; Notice of Allowance for U.S. Appl. No. 16/164,933, filed Oct. 19, 2018, mailed May 14, 2021, 24 pgs.
Waltermire, Jamie; Notice of Allowance for U.S. Appl. No. 16/164,933, filed Oct. 19, 2018, mailed Aug. 9, 2021, 10 pgs.
Waltermire, Jamie; Corrected Notice of Allowance for U.S. Appl. No. 15/590,345, filed May 9, 2017, mailed Feb. 18, 2020, 9 pgs.
Waltermire, Jamie; Final Office Action for U.S. Appl. No. 15/590,345, filed May 9, 2017, mailed Mar. 19, 2019, 42 pgs.
Waltermire, Jamie; Non-Final Office Action for U.S. Appl. No. 15/590,345, filed May 9, 2017, mailed Aug. 24, 2018, 41 pgs.
Waltermire, Jamie; Notice of Allowance for U.S. Appl. No. 15/590,345, filed May 9, 2017, mailed Oct. 1, 2019, 28 pgs.
Waltermire, Jamie; Supplemental Notice of Allowance for U.S. Appl. No. 15/590,345, filed May 9, 2017, mailed Jan. 9, 2020, 8 pgs.
Waltermire, Jamie; Supplemental Notice of Allowance for U.S. Appl. No. 15/590,345, filed May 9, 2017, mailed Dec. 3, 2019, 14 pgs.
Waltermire, Jamie; Non-Final Office Action for U.S. Appl. No. 16/721,995, filed Dec. 20, 2019, mailed Dec. 27, 2021, 133 pgs.
Waltermire, Jamie; Non-Final Office Action for U.S. Appl. No. 16/721,995, filed Dec. 20, 2019, mailed Jul. 5, 2022, 28 pgs.
Waltermire, Jamie; Notice of Allowance for U.S. Appl. No. 16/721,995, filed Dec. 20, 2019, mailed Dec. 5, 2022, 22 pgs.
Waltermire, Jamie; Requirement for Restriction/Election for U.S. Appl. No. 16/721,995, filed Dec. 20, 2019, mailed Aug. 13, 2021, 6 pgs.
Waltermire, Jamie; Applicant-Initiated Interview Summary for U.S. Appl. No. 15/590,349, filed May 9, 2017, mailed Dec. 3, 2019, 3 pgs.
Waltermire, Jamie; Certificate of Correction for U.S. Appl. No. 15/590,349, filed May 9, 2017, mailed Jun. 1, 2021, 1 pg.
Waltermire, Jamie; Corrected Notice of Allowance for U.S. Appl. No. 15/590,349, filed May 9, 2017, mailed Nov. 2, 2020, 9 pgs.
Waltermire, Jamie; Corrected Notice of Allowance for U.S. Appl. No. 15/590,349, filed May 9, 2017, mailed Dec. 22, 2020, 9 pgs.
Waltermire, Jamie; Corrected Notice of Allowance for U.S. Appl. No. 15/590,349, filed May 9, 2017, mailed Feb. 5, 2021, 9 pgs.
Waltermire, Jamie; Final Office Action for U.S. Appl. No. 15/590,349, filed May 9, 2017, mailed Jan. 6, 2020, 26 pgs.
Waltermire, Jamie; Final Office Action for U.S. Appl. No. 15/590,349, filed May 9, 2017, mailed May 9, 2019, 31 pgs.
Waltermire, Jamie; Non-Final Office Action for U.S. Appl. No. 15/590,349, filed May 9, 2017, mailed Nov. 5, 2018, 41 pgs.
Waltermire, Jamie; Non-Final Office Action for U.S. Appl. No. 15/590,349, filed May 9, 2017, mailed Jun. 12, 2020, 30 pgs.
Waltermire, Jamie; Non-Final Office Action for U.S. Appl. No. 15/590,349, filed May 9, 2017, mailed Sep. 5, 2019, 25 pgs.
Waltermire, Jamie; Notice of Allowance for U.S. Appl. No. 15/590,349, filed May 9, 2017, mailed Oct. 20, 2020, 20 pgs.
Waltermire, Jamie; Requirement for Restriction/Election for U.S. Appl. No. 15/590,349, filed May 9, 2017, mailed Aug. 30, 2018, 10 pgs.
Collison, Alan B.; Final Office ACtion for U.S. Appl. No. 15/677,738, filed Aug. 15, 2017, mailed Feb. 28, 2019, 14 pgs.
Collison, Alan B.; Non-Final Office Action for U.S. Appl. No. 15/677,738, filed Aug. 15, 2017, mailed Oct. 23, 2018, 11 pgs.
Collison, Alan B.; Notice of Allowance for U.S. Appl. No. 15/677,738, filed Aug. 15, 2017, mailed Oct. 29, 2019, 14 pgs.
Collison, Alan B.; Notice of Allowance for U.S. Appl. No. 15/677,738, filed Aug. 15, 2017, mailed Jun. 19, 2019, 10 pgs.
Collison, Alan B.; Requirement for Restriction/Election for U.S. Appl. No. 15/677,738, filed Aug. 15, 2017, mailed Jul. 3, 2018, 8 pgs.
Collison, Alan B.; Requirement for Restriction/Election for U.S. Appl. No. 15/677,738, filed Aug. 15, 2017, mailed Jul. 31, 2018, 8 pgs.
Collison, Alan B.; Supplemental Notice of Allowance for U.S. Appl. No. 15/677,738, filed Aug. 15, 2017, mailed Dec. 10, 2019, 4 pgs.
CooLiner ® Insulated Shipping Bags, available at <http://www/chem-tran.com/packaging/supplies/cooliner-insulated-shipping-bags.php>, accessed on Oct. 18, 2019, 4 pgs.
Voluntary Standard for Repulping and Recycling Corrugated Fiberboard Treated to Improve Its Performance in the Presence of Water and Water Vapor. (revises Aug. 16, 2013) Fibre Box Association (FBA), Elk Grove Village, IL, 1-23, Retrieved from http://www.corrugated.org/wp-content/uploads/PDFs/Recycling/Vol_Std_Protocol_2013. pdf.
Collison, Alan B.; Advisory Action for U.S. Appl. No. 16/658,756, filed Oct. 21, 2019, mailed Sep. 25, 2020, 4 pgs.
Collison, Alan B.; Applicant Interview Summary for U.S. Appl. No. 16/658,756, filed Oct. 21, 2019, mailed May 6, 2020, 3 pgs.
Collison, Alan B.; Applicant Interview Summary for U.S. Appl. No. 16/658,756, filed Oct. 21, 2019, mailed Jun. 29, 2020, 3 pgs.
Collison, Alan B.; Final Office Action for U.S. Appl. No. 16/658,756, filed Oct. 21, 2019, mailed Jun. 17, 2020, 10 pgs.
Collison, Alan B.; Non-Final Office Action for U.S. Appl. No. 16/658,756, filed Oct. 21, 2019, mailed Feb. 4, 2020, 14 pgs.
Collison, Alan B.; Notice of Allowance for U.S. Appl. No. 16/658,756, filed Oct. 21, 2019, mailed Oct. 23, 2020, 10 pgs.
MP Global Products LLC: European Search Report for serial No. 17868605.1, mailed Mar. 16, 2020, 7 pgs.
MP Global Products LLC: Office Action for European application No. 17868605.1, mailed Dec. 3, 2020, 4 pgs.
MP Global Products, LLC; Examination Report for Australian patent application No. 2017359035, mailed Nov. 27, 2020, 3 pgs.
MP Global Products, LLC; Office Action for Chinese patent application No. 201780081689.7, mailed Nov. 2, 2020, 17 pgs.
Collison, Alan B.; Non-Final Office Action for U.S. Appl. No. 17/181,377, filed Feb. 22, 2021, mailed Jul. 1, 2021, 22 pgs.
Collison, Alan B.; Notice of Allowance for U.S. Appl. No. 17/181,377, filed Feb. 22, 2021, mailed Oct. 21, 2021, 6 pgs.

(56) References Cited

OTHER PUBLICATIONS

Collison, Alan B.; Restriction Requirement for U.S. Appl. No. 17/181,377, filed Feb. 22, 2021, mailed Apr. 22, 2021, 6 pgs.
MP Global Products LLC; Office Action for Chinese Patent Application No. 201780081689.7, mailed May 14, 2021, 17 pgs.
MP Global Products, LLC; Decision on Rejection for Chinese patent application No. 201780081689.7, mailed Sep. 23, 2021, 15 pgs.
Collison, Alan B.; Applicant-Initiated Interview Summary for U.S. Appl. No. 16/414,309, filed May 16, 2019, mailed Aug. 21, 2020, 3 pgs.
Collison, Alan B.; Applicant-Initiated Interview Summary for U.S. Appl. No. 16/414,309, filed May 16, 2019, mailed Oct. 15, 2020, 3 pgs.
Collison, Alan B.; Certificate of Correction for U.S. Patent Application No. 16/414/309, filed May 16, 2019, mailed Mar. 9, 2021, 1 pg.
Collison, Alan B.; Final Office Action for U.S. Appl. No. 16/414,309, filed May 16, 2019, mailed Oct. 8, 2020, 15 pgs.
Collison, Alan B.; Non-Final Office Action for U.S. Appl. No. 16/414,309, filed May 16, 2019, mailed Jul. 17, 2020, 77 pgs.
Collison, Alan B.; Notice of Allowance for U.S. Appl. No. 16/414,309, filed May 16, 2019, mailed Oct. 21, 2020, 6 pgs.
Collison, Alan B.; Requirement for Restriction/Election for U.S. Appl. No. 16/414,309, filed May 16, 2019, mailed Jun. 16, 2020, 5 pgs.
Collison, Alan B.; Applicant-Initiated Interview Summary for U.S. Appl. No. 17/123,673, filed Dec. 16, 2020, mailed Jun. 24, 2021, 2 pgs.
Collison, Alan B.; Certificate of Correction for U.S. Appl. No. 11/214,427, filed Dec. 16, 2020, mailed Mar. 29, 2022, 1 pg.
Collison, Alan B.; Non-Final Office Action for U.S. Appl. No. 17/123,673, filed Dec. 16, 2020, mailed Mar. 23, 2021, 86 pgs.
Collison, Alan B.; Notice of Allowance for U.S. Appl. No. 17/123,673, filed Dec. 16, 2020, mailed Jul. 1, 2021, 12 pgs.
Collison, Alan B.; Applicant-Initiated Interview Summary for U.S. Appl. No. 16/414,310, filed May 16, 2019, mailed Jul. 30, 2020, 3 pgs.
Collison, Alan B.; Non-Final Office Action for U.S. Appl. No. 16/414,310, filed May 16, 2019, mailed Jul. 8, 2020, 84 pgs.
Collison, Alan B.; Notice of Allowance for U.S. Appl. No. 16/414,310, filed May 16, 2019, mailed Nov. 13, 2020, 15 pgs.
Collison, Alan; Final Office Action for U.S. Appl. No. 16/414,310, filed May 16, 2019, mailed Oct. 13, 2020, 30 pgs.
Collison, Alan B.; Applicant-Initiated Interview Summary for U.S. Appl. No. 17/123,676, filed Dec. 16, 2020, mailed May 4, 2021, 4 pgs.
Collison, Alan B.; Certificate of Correction for U.S. Appl. No. 17/123,676, filed Dec. 16, 2020, mailed Jan. 4, 2021, 1 pg.
Collison, Alan B.; Non-Final Office Action for U.S. Appl. No. 17/123,676, filed Dec. 16, 2020, mailed Feb. 3, 2021, 23 pgs.
Collison, Alan B.; Notice of Allowance for U.S. Appl. No. 17/123,676, filed Dec. 16, 2020, mailed May 13, 2021, 93 pgs.
Collison, Alan B.; Applicant-Initiated Interview Summary for U.S. Appl. No. 17/502,599, filed Oct. 15, 2021, mailed Oct. 27, 2022, 2 pgs.
Collison, Alan B.; Certificate of Correction for U.S. Appl. No. 17/502,599, filed Oct. 15, 2021, mailed Jun. 6, 2023, 1 pg.
Collison, Alan B.; Non-Final Office Action for U.S. Appl. No. 17/502,599, filed Oct. 15, 2021, mailed Nov. 30, 2021, 6 pgs.
Collison, Alan B.; Non-Final Office Action for U.S. Appl. No. 17/502,599, filed Oct. 15, 2021, mailed Sep. 12, 2022, 12 pgs.
Collison, Alan B.; Notice of Allowance for U.S. Appl. No. 17/502,599, filed Oct. 15, 2021, mailed Jan. 23, 2023, 12 pgs.
Collison, Alan B.; Notice of Allowance for U.S. Appl. No. 17/502,599, filed Oct. 15, 2021, mailed Mar. 9, 2022, 94 pgs.
Collison, Alan B.; Applicant-Initiated Interview Summary for U.S. Appl. No. 17/834,999, filed Jun. 8, 2022, mailed Oct. 27, 2022, 2 pgs.
Waltermire, Jamie; Advisory Action for U.S. Appl. No. 17/127,102, filed Dec. 18, 2020, mailed Dec. 7, 2022, 4 pgs.
Waltermire, Jamie; Applicant-Initiated Interview Summary for U.S. Appl. No. 17/127,102, filed Dec. 18, 2020, mailed Oct. 31, 2022, 2 pgs.
Waltermire, Jamie; Final Office Action for U.S. Appl. No. 17/127,102, filed Dec. 18, 2020, mailed Oct. 5, 2022, 31 pgs.
Waltermire, Jamie; Final Office Action for U.S. Appl. No. 17/127,102, filed Dec. 18, 2020, mailed Jul. 6, 2023, 35 pgs.
Waltermire, Jamie; Non-Final Office Action for U.S. Appl. No. 17/127,102, filed Dec. 18, 2020, mailed Jun. 27, 2022, 128 pgs.
Waltermire, Jamie; Notice of Allowance for U.S. Appl. No. 17/127,102, filed Dec. 18, 2020, mailed Oct. 20, 2023, 10 pgs.
Waltermire, Jamie; Requirement for Restriction/Election for U.S. Appl. No. 17/127,102, filed Dec. 18, 2020, mailed Apr. 14, 2022, 6 pgs.
Waltermire, Kamie; Non-Final Office Action for U.S. Patent Application No. 17/127, 102, filed Dec. 28, 2020, mailed Jan. 12, 2023, 19 pgs.
Waltermire, Jamie; Final Office Action for U.S. Appl. No. 16/689,433, filed Nov. 20, 2019, mailed Aug. 5, 2021, 23 pgs.
Waltermire, Jamie; Non-Final Office Action for U.S. Appl. No. 16/689,433, filed Nov. 20, 2019, mailed Feb. 23, 2021, 88 pgs.
Waltermire, Jamie; Notice of Allowance for U.S. Appl. No. 16/689,433, filed Nov. 20, 2019, mailed Oct. 15, 2021, 14 pgs.
Waltermire, Jamie; Requirement for Restriction/Election for U.S. Appl. No. 16/689,433, filed Nov. 20, 2019, mailed Oct. 16, 2020, 6 pgs.
Waltermire, Jamie; Final Office Action for U.S. Appl. No. 17/497,054, filed Oct. 8, 2021, mailed Nov. 28, 2023, 26 pgs.
Waltermire, Jamie; Final Office Action for U.S. Appl. No. 17/497,054, filed Oct. 8, 2021, mailed Apr. 24, 2023, 33 pgs.
Waltermire, Jamie; Non-Final Office Action for U.S. Appl. No. 17/497,054, filed Oct. 8, 2021, mailed Nov. 15, 2022, 131 pgs.
Waltermire, Jamie; Non-Final Office Action for U.S. Appl. No. 17/497,054, filed Oct. 8, 2021, mailed Aug. 3, 2023, 24 pgs.
Waltermire, Jamie; Requirement for Restriction/Election for U.S. Appl. No. 17/497,054, filed Oct. 8, 2021, mailed Oct. 6, 2022, 8 pgs.
Waltermire, Jamie; Certificate of Correction for U.S. Appl. No. 17/497,057, filed Oct. 8, 2021, mailed Sep. 5, 2023, 1 pg.
Waltermire, Jamie; Non-Final Office Action for U.S. Appl. No. 17/497,057, filed Oct. 8, 2021, mailed Oct. 19, 2022, 115 pgs.
Waltermire, Jamie; Notice of Allowance for U.S. Appl. No. 17/497,057, filed Oct. 8, 2021, mailed Feb. 16, 2023, 25 pgs.
Waltermire, Jamie; Requirement for Restriction/Election for U.S. Appl. No. 17/497,057, filed Oct. 8, 2021, mailed Sep. 15, 2022, 8 pgs.
Sollie, Greg; Non-Final Office Action for U.S. Appl. No. 15/845,545, filed Dec. 18, 2017, mailed Mar. 5, 2019, 41 pgs.
Sollie, Greg; Notice of Allowance for U.S. Appl. No. 15/845,545, filed Dec. 18, 2017, mailed Jun. 19, 2019, 20 pgs.
Sollie, Greg; Final Office Action for U.S. Appl. No. 16/552,277, filed Aug. 27, 2019, mailed Aug. 7, 2020, 19 pgs.
Sollie, Greg; Non-Final Office Action for U.S. Appl. No. 16/552,277, filed Aug. 27, 2019, mailed Jun. 3, 2020, 68 pgs.
Sollie, Greg; Notice of Allowance for U.S. Appl. No. 16/552,277, filed Aug. 27, 2019, mailed Aug. 31, 2020, 6 pgs.
Sollie, Greg; Restriction Requirement for U.S. Appl. No. 16/552,277, filed Aug. 27, 2019, mailed Apr. 20, 2020, 7 pgs.
Sollie, Greg; Non-Final Office Action for U.S. Appl. No. 16/951,454, filed Nov. 18, 2020, mailed Aug. 4, 2022, 165 pgs.
Sollie, Greg; Notice of Allowance for U.S. Appl. No. 16/951,454, filed Nov. 18, 2020, mailed Nov. 15, 2022, 13 pgs.
Sollie, Greg; Notice of Allowance for U.S. Appl. No. 16/951,454, filed Nov. 18, 2020, mailed May 2, 2023, 6 pgs.
Sollie, Greg; Restriction Requirement for U.S. Appl. No. 16/951,454, filed Nov. 18, 2020, mailed Jun. 14, 2022, 14 pgs.
Sollie, Greg; Applicant-Initiated Interview Summary for U.S. Appl. No. 16/951,465, filed Nov. 18, 2020, mailed Oct. 5, 2022, 2 pgs.
Sollie, Greg; Certificate of Correction for U.S. Appl. No. 16/951,465, filed Nov. 18, 2020, mailed Aug. 1, 2023, 1 pg.
Sollie, Greg; Non-Final Office Action for U.S. Appl. No. 16/951,465, filed Nov. 18, 2020, mailed Dec. 13, 2022, 17 pgs.

(56) References Cited

OTHER PUBLICATIONS

Sollie, Greg; Non-Final Office Action for U.S. Appl. No. 16/951,465, filed Nov. 18, 2020, mailed May 13, 2022, 123 pgs.
Sollie, Greg; Notice of Allowance for U.S. Appl. No. 16/951,465, filed Nov. 18, 2020, mailed Feb. 28, 2023, 12 pgs.
Sollie, Greg; Certificate of Correction for U.S. Appl. No. 15/845,540, filed Dec. 18, 2017, mailed Jun. 1, 2021, 1 pg.
Sollie, Greg; Final Office Action for U.S. Appl. No. 15/845,540, filed Dec. 18, 2017, mailed Oct. 30, 2019, 56 pgs.
Sollie, Greg; Final Office Action for U.S. Appl. No. 15/845,540, filed Dec. 18, 2017, mailed Sep. 2, 2020, 28 pgs.
Sollie, Greg; Non-Final Office Action for U.S. Appl. No. 15/845,540, filed Dec. 18, 2017, mailed Feb. 19, 2020, 32 pgs.
Sollie, Greg; Non-Final Office Action for U.S. Appl. No. 15/845,540, filed Dec. 18, 2017, mailed Apr. 2, 2019, 50 pgs.
Sollie, Greg; Notice of Allowance for U.S. Appl. No. 15/845,540, filed Dec. 18, 2017, mailed Sep. 17, 2020, 5 pgs.
Sollie, Greg; Certificate of Correction for U.S. Appl. No. 17/100,819, filed Nov. 21, 2020, mailed Feb. 28, 2023, 2 pgs.
Sollie, Greg; Final Office Action for U.S. Appl. No. 17/100,819, filed Nov. 21, 2020, mailed Apr. 13, 2022, 39 pgs.
Sollie, Greg; Non-Final Office Action for U.S. Appl. No. 17/100,819, filed Nov. 21, 2020, mailed Sep. 29, 2021, 107 pgs.
Sollie, Greg; Notice of Allowance for U.S. Appl. No. 17/100,819, filed Nov. 21, 2020, mailed Sep. 7, 2022, 15 pgs.
"Green Cell Foam Shipping Coolers", located at <https://www.greencellfoam.com/shipping-coolers>, accessed on Oct. 18, 2019, 4 pgs.
Collison, Alan B.; Applicant Interview Summary for U.S. Appl. No. 15/677,738, filed Aug. 15, 2017, mailed Dec. 5, 2018, 4 pgs.
Collison, Alan B.; Applicant Interview Summary for U.S. Appl. No. 15/677,738, filed Aug. 15, 2017, mailed Apr. 22, 2019, 4 pgs.
Collison, Alan B.; Corrected Notice of Allowance for U.S. Appl. No. 15/677,738, filed Aug. 15, 2017, mailed Jul. 15, 2019, 7 pgs.
Sollie, Greg; Advisory Action for U.S. Appl. No. 17/901,558, filed Sep. 1, 2022, mailed Dec. 12, 2023, 3 pgs.
Sollie, Greg; Final Office Action for U.S. Appl. No. 17/901,558, filed Sep. 1, 2022, mailed Aug. 21, 2023, 25 pgs.
Sollie, Greg; Non-Final Office Action for U.S. Appl. No. 17/901,558, filed Sep. 1, 2022, mailed Feb. 15, 2023, 128 pgs.
Sollie, Greg; Non-Final Office Action for U.S. Appl. No. 16/886,040, filed May 28, 2020, mailed Mar. 30, 2021, 89 pgs.
Sollie, Greg; Notice of Allowance for U.S. Appl. No. 16/886,040, filed May 28, 2020, mailed Nov. 18, 2021, 10 pgs.
Sollie, Greg; Notice of Allowance for U.S. Appl. No. 16/886,040, filed May 28, 2020, mailed Jul. 7, 2021, 12 pgs.
Sollie, Greg; Requirement for Restriction/Election for U.S. Appl. No. 16/886,040, filed May 28, 2020, mailed Dec. 23, 2020, 6 pgs.
Sollie, Greg; Certificate of Correction for U.S. Appl. No. 17/493,449, filed Oct. 4, 2021, mailed Aug. 15, 2023, 1 pg.
Sollie, Greg; Notice of Allowance for U.S. Appl. No. 17/493,449, filed Oct. 4, 2021, mailed Oct. 13, 2022, 10 pgs.
Sollie, Greg; Non-Final Office Action for U.S. Appl. No. 18/094,806, filed Jan. 9, 2023, mailed Apr. 21, 2023, 118 pgs.
Sollie, Greg; Notice of Allowance for U.S. Appl. No. 18/094,806, filed Jan. 9, 2023, mailed Jul. 21, 2023, 12 pgs.
Sollie, Greg; Certificate of Correction for U.S. Appl. No. 17/493,474, filed Oct. 4, 2021, mailed Aug. 1, 2023, 3 pgs.
Sollie, Greg; Non-Final Office Action for U.S. Appl. No. 17/493,474, filed Oct. 4, 2021, mailed Jul. 11, 2022, 112 pgs.
Sollie, Greg; Notice of Allowance for U.S. Appl. No. 17/493,474, filed Oct. 4, 2021, mailed Oct. 13, 2022, 15 pgs.
Sollie, Greg; Non-Final Office Action for U.S. Appl. No. 18/095,310, filed Jan. 10, 2023, mailed Apr. 24, 2023, 118 pgs.
Sollie, Greg; Notice of Allowance for U.S. Appl. No. 18/095,310, filed Jan. 10, 2023, mailed Jul. 28, 2023, 19 pgs.
Sollie, Greg; Non-Final Office Action for U.S. Appl. No. 17/307,650, filed May 4, 2021, mailed Nov. 30, 2022, 139 pgs.
Sollie, Greg; Notice of Allowance for U.S. Appl. No. 17/307,650, filed May 4, 2021, mailed Mar. 9, 2023, 15 pgs.
Sollie, Greg; Requirement for Restriction/Election for U.S. Appl. No. 17/307,650, filed May 4, 2021, mailed Oct. 28, 2022, 6 pgs.
Sollie, Greg; Requirement for Restriction/Election for U.S. Appl. No. 18/208,704, filed Jun. 12, 2023, mailed Jan. 9, 2024, 6 pgs.
Anagnostopoulos, John; Advisory Action for U.S. Appl. No. 17/666,206, filed Feb. 7, 2022, mailed Dec. 22, 2023, 4 pgs.
Anagnostopoulos, John; Final Office Action for U.S. Appl. No. 17/666,206, filed Feb. 7, 2022, mailed Oct. 2, 2023, 32 pgs.
Anagnostopoulos, John; Non-Final Office Action for U.S. Appl. No. 17/666,206, filed Feb. 7, 2022, mailed Apr. 19, 2023, 139 pgs.
Avella, et al.; Article entitled: "Biodegradable PVOH-based foams for packaging applications", Journal of Cellular Plastics 2011, 47:271, 12 pgs.
Moo-Tun, et al.; Article entitled: "Assessing the effect of PLA, cellulose microfibers and CaCO3 on the properties of starch-based foams using a factorial design", Polymer Testing 86 (2020) 106482, available on Mar. 8, 2020, 10 pgs.
Paperweb.com, 2006, downloaded online Sep. 26, 2023 from archive.org (Year: 2006), 1 pg.
Salgado, et al.; Article entitled: "Biodegradable foams based on cassava starch, sunflower proteins and cellulose fibers obtained by a baking process", Journal of Food Engineering 85 (2008) 435-443, available online Aug. 15, 2007, 9 pgs.
Schmidt, et al.; Article entitled: "Characterization of Foams Obtained from Cassava Starch, Cellulose Fibres and Dolomitic Limestone by a Thermopressing Process", Brazilian Archives of Biology and Technology vol. 53, n. 1, pp. 88-192, January-Feb. 2010, 8 p.
Waltermire, Jamie; International Preliminary Report on Patentability for PCT Application No. PCT/US18/65464, filed Dec. 13, 2018, mailed Jun. 24, 2021, 8 pgs.
Waltermire, Jamie; International Search Report and Written Opinion for PCT Application No. PCT/US18/65464, filed Dec. 13, 2018, mailed Mar. 11, 2019, 9 pgs.
Sollie, Greg; Examination Report for Australian application No. 2018260918, filed Nov. 8, 2018, mailed Oct. 13, 2023, 5 pgs.
Sollie, Greg; Examination Report for Australian application No. 2018260918, filed Nov. 8, 2018, mailed Dec. 2, 2023, 5 pgs.
Sollie, Greg; International Preliminary Report on Patentability for PCT Application No. PCT/US18/65459, filed Dec. 13, 2018, mailed Jul. 2, 2020, 11 pgs.
Sollie, Greg; International Search Report and Written Opinion for PCT Application No. PCT/US18/65459, filed Dec. 13, 2018, mailed May 1, 2019, 15 pgs.
Sollie, Greg; Examination Report for Australian patent application No. 2018260919, filed Nov. 8, 2018, mailed Oct. 16, 2023, 4 pgs.
Sollie, Greg; Examination Report for Australian patent application No. 2018260919, filed Nov. 8, 2018, mailed Dec. 5, 2023, 4 pgs.
Sollie, Greg; International Preliminary Report on Patentability for PCT Application No. PCT/US18/65461, filed Dec. 13, 2018, mailed Jul. 2, 2020, 12 pgs.
Sollie, Greg; International Search Report and Written Opinion for PCT Application No. PCT/US18/65461, filed Dec. 13, 2018, mailed Mar. 21, 2019, 13 pgs.
MP Global Products, LLC; First Examination Report for Australian patent application No. 2017359035, filed Nov. 7, 2017, mailed Nov. 27, 2020, 3 pgs.
MP Global Products, LLC; Office Action for Canadian patent application No. 3,043, 192, filed Nov. 7, 2017, mailed Oct. 25, 2021, 11 pgs.
MP Global Products, LLC; Office Action for Canadian patent application No. 3,043,192, filed Nov. 7, 2017, mailed Nov. 8, 2022, 3 pgs.
MP Global Products, LLC; Office Action for Canadian patent application No. 3,043,192, filed Nov. 7, 2017, mailed Apr. 8, 2022, 9 pgs.
MP Global Products, LLC: European Office Action for application No. 17868605.1, mailed Dec. 3, 2020, 4 pgs.
MP Global Products, LLC: European Office Action for application No. 17868605.1, mailed Apr. 13, 2021, 3 pgs.
MP Global Products, LLC: European Office Action Response for application No. 17868605.1, filed Jan. 19, 2021, 15 ogs.
MP Global Products, LLC: European Search Report Response for serial No. 17868605.1, filed Oct. 2, 2020, 15 pgs.

(56) References Cited

OTHER PUBLICATIONS

Collison, Alan B.; Examination Report for Australian patent application No. 2021204424, filed Nov. 7, 2017, mailed Dec. 6, 2022, 2 pgs.
Collison, Alan B.; Examination Report for Australian patent application No. 2021204424, filed Nov. 7, 2017, mailed Aug. 25, 2022, 8 pgs.
Collison, Alan B.; Office Action for Chinese patent application No. 2021107289972, filed Nov. 7, 2017, mailed Apr. 15, 2023, 7 pgs.
Collison, Alan. B.; Extended European Search Report for application No. 21160713.0, filed Nov. 7, 2017, mailed May 10, 2021, 7 pgs.
Waltermire, Jamie; Certificate of Correction for U.S. Appl. No. 17/127,050, filed Dec. 18, 2020, mailed Feb. 13, 2024, 1 pg.
Waltermire, Jamie; Advisory Action for U.S. Appl. No. 17/497,054, filed Oct. 8, 2021, mailed Jan. 30, 2024, 11 pgs.
Waltermire, Jamie; Notice of Allowance for U.S. Appl. No. 17/497,054, filed Oct. 8, 2021, mailed Mar. 6, 2024, 11 pgs.
Sollie, Greg; Non-Final Office Action for U.S. Patent Application No. 18/106, 169, filed Feb. 6, 2023, mailed Feb. 12, 2024, 148 pgs.
Sollie, Greg; Non-Final Office Action for U.S. Appl. No. 18/208,704, filed Jun. 12, 2023, mailed Feb. 13, 2024, 148 pgs.
Collison, Alan B.; Extended European Search Report for application No. 23211653.3, filed Nov. 7, 2017, mailed Mar. 14, 2024, 7 pgs.
Sollie, Greg; Examination Report for Australian Patent Application No. 2018264050, filed Nov. 14, 2018, mailed Mar. 7, 2024, 5 pgs.
Sollie, Greg; Notice of Allowance for U.S. Appl. No. 16/401,603, filed May 2, 2019, mailed Aug. 31, 2020, 14 pgs.
Sollie, Greg; Requirement for Restriction/Election for U.S. Appl. No. 16/401,603, filed May 2, 2019, mailed Feb. 18, 2020, 6 pgs.
Sollie, Greg; Non-Final Office Action for U.S. Appl. No. 17/078,884, filed Oct. 23, 2020, mailed Aug. 12, 2021, 105 pgs.
Sollie, Greg; Notice of Allowance for U.S. Appl. No. 17/078,884, filed Oct. 23, 2020, mailed Nov. 22, 2021, 12 pgs.
Sollie, Greg; Applicant-Initiated Interview Summary for U.S. Appl. No. 17/078,891, filed Oct. 23, 2020, mailed Oct. 25, 2021, 2 pgs.
Sollie, Greg; Non-Final Office Action for U.S. Appl. No. 17/078,891, filed Oct. 23, 2020, mailed Aug. 23, 2021, 104 pgs.
Sollie, Greg; Notice of Allowance for U.S. Appl. No. 17/078,891, filed Oct. 23, 2020, mailed Dec. 1, 2021, 12 ogs.
Sollie, Greg; Non-Final Office Action for U.S. Appl. No. 17/679,772, filed Feb. 24, 2022, mailed Oct. 17, 2022, 108 pgs.
Sollie, Greg; Non-Final Office Action for U.S. Appl. No. 17/679,772, filed Feb. 24, 2022, mailed May 2, 2023, 29 pgs.
Sollie, Greg; Notice of Allowance for U.S. Appl. No. 17/679,772, filed Feb. 24, 2022, mailed Aug. 30, 2023, 12 pgs.
Sollie, Greg; Non-Final Office Action for U.S. Appl. No. 16/401,607, filed May 2, 2019, mailed Aug. 19, 2020, 88 pgs.
Sollie, Greg; Notice of Allowance for U.S. Appl. No. 16/401,607, filed May 2, 2019, mailed Dec. 4, 2020, 12 pgs.
ULINE; Article entitled: Corrugated Corner Protectors—4 ×4", accessed on Oct. 25, 2018, 1 pg.
Sollie, Greg; Certificate of Correction for U.S. Appl. No. 17/187,239, filed Feb. 26, 2021, mailed Apr. 26, 2022, 1 pg.
Sollie, Greg; Non-Final Office Action for U.S. Appl. No. 17/187,239, filed Feb. 26, 2021, mailed Sep. 21, 2021, 99 pgs.
Sollie, Greg; Notice of Allowance for U.S. Appl. No. 17/187,239, filed Feb. 26, 2021, mailed Oct. 13, 2021, 5 pgs.
Sollie, Greg; Advisory Action for U.S. Appl. No. 17/536,878, filed Nov. 29, 2021, mailed Jan. 12, 2024, 8 pgs.
Sollie, Greg; Final Office Action for U.S. Appl. No. 17/536,878, filed Nov. 29, 2021, mailed Oct. 20, 2023, 29 pgs.
Sollie, Greg; Non-Final Office Action for U.S. Appl. No. 17/536,878, filed Nov. 29, 2021, mailed Apr. 12, 2023, 140 pgs.
Dhl Express; Brochure for Dry Ice Shipping Guidelines, accessed on Oct. 26, 2018, 12 pgs.
Sollie, Greg; Corrected Notice of Allowance for U.S. Appl. No. 16/382,710, filed Apr. 12, 2019, mailed Sep. 24, 2020, 9 pgs.
Sollie, Greg; Final Office Action for U.S. Appl. No. 16/382,710, filed Apr. 12, 2019, mailed Apr. 6, 2020, 33 pgs.
Sollie, Greg; Non-Final Office Action for U.S. Appl. No. 16/382,710, filed Apr. 12, 2019, mailed Oct. 10, 2019, 49 pgs.
Sollie, Greg; Notice of Allowance for U.S. Appl. No. 16/382,710, filed Apr. 12, 2019, mailed Oct. 21, 2020, 5 pgs.
Sollie, Greg; Notice of Allowance for U.S. Appl. No. 16/382,710, filed Apr. 12, 2019, mailed Jun. 3, 2020, 12 pgs.
Sollie, Greg; Requirement for Restriction/Election for U.S. Appl. No. 16/382,710, filed Apr. 12, 2019, mailed Jul. 15, 2019, 6 pgs.
Sollie, Greg; Certificate of Correction for U.S. Appl. No. 16/879,811, filed May 21, 2020, mailed Feb. 8, 2022, 1 pg.
Sollie, Greg; Non-Final Office Action for U.S. Appl. No. 16/879,811, filed May 21, 2020, mailed Jun. 22, 2021, 93 pgs.
Sollie, Greg; Notice of Allowance for U.S. Appl. No. 16/879,811, filed May 21, 2020, mailed Jul. 7, 2021, 5 pgs.
Sollie, Greg; Requirement for Restriction/Election for U.S. Appl. No. 16/879,811, filed May 21, 2020, mailed Apr. 15, 2021, 6 pgs.
Sollie, Greg; Non-Final Office Action for U.S. Appl. No. 17/492,285, filed Oct. 1, 2021, mailed Jul. 11, 2022, 109 pgs.
Sollie, Greg; Notice of Allowance for U.S. Appl. No. 17/492,285, filed Oct. 1, 2021, mailed Feb. 8, 2023, 25 pgs.
Sollie, Greg; Non-Final Office Action for U.S. Appl. No. 18/140,641, filed Apr. 28, 2023, mailed Dec. 27, 2023, 147 pgs.
Sollie, Greg; Requirement for Restriction/Election for U.S. Appl. No. 18/140,641, filed Apr. 28, 2023, mailed Nov. 8, 2023, 5 pgs.
Sollie, Greg; Certificate of Correction for U.S. Appl. No. 16/567,192, filed Sep. 11, 2019, mailed Feb. 16, 2021, 1 pg.
Sollie, Greg; Corrected Notice of Allowance for U.S. Appl. No. 16/567,192, filed Sep. 11, 2019, mailed Oct. 20, 2020, 8 pgs.
Sollie, Greg; Final Office Action for U.S. Appl. No. 16/567,192, filed Sep. 11, 2019, mailed Jun. 8, 2020, 20 pgs.
Sollie, Greg; Non-Final Office Action for U.S. Appl. No. 16/567,192, filed Sep. 11, 2019, mailed Dec. 10, 2019, 49 pgs.
Sollie, Greg; Notice of Allowance for U.S. Appl. No. 16/567,192, filed Sep. 11, 2019, mailed Aug. 7, 2020, 14 pgs.
Thomas Scientific; Article entitled: "Thermosafe: Test Tube Shipper/Rack", accessed on Oct. 26, 2018, 2 pgs.
Stinson, Elizabeth; Article entitled: "A Pizza Geek Discovers the World's Smartest Pizza Box", published Jan. 17, 2014, 8 pgs.
Sollie, Greg; Final Office Action for U.S. Appl. No. 16/408,981, filed May 10, 2019, mailed Dec. 29, 2020, 22 pgs.
Sollie, Greg; Final Office Action for U.S. Appl. No. 16/408,981, filed May 10, 2019, mailed Feb. 24, 2020, 29 pgs.
Sollie, Greg; Non-Final Office Action for U.S. Appl. No. 16/408,981, filed May 10, 2019, mailed Aug. 20, 2019, 50 pgs.
Sollie, Greg; Non-Final Office Action for U.S. Appl. No. 16/408,981, filed May 10, 2019, mailed Sep. 16, 2020, 40 pgs.
Sollie, Greg; Notice of Allowance for U.S. Appl. No. 16/408,981, filed May 10, 2019, mailed Feb. 23, 2021, 6 pgs.
Sollie, Greg; Certificate of Correction for U.S. Appl. No. 17/185,616, filed Feb. 25, 2021, mailed Feb. 28, 2023, 2 pgs.
Sollie, Greg; Final Office Action for U.S. Appl. No. 17/185,616, filed Feb. 25, 2021, mailed Jan. 28, 2022, 37 pgs.
Sollie, Greg; Non-Final Office Action for U.S. Appl. No. 17/185,616, filed Feb. 25, 2021, mailed Sep. 15, 2021, 103 pgs.
Sollie, Greg; Notice of Allowance for U.S. Appl. No. 17/185,616, filed Feb. 25, 2021, mailed Jun. 17, 2022, 18 pgs.
Waltermire, Jamie; Certificate of Correction for U.S. Appl. No. 16/293,716, filed Mar. 6, 2019, mailed Aug. 30, 2022, 1 pg.
Waltermire, Jamie; Final Office Action for U.S. Appl. No. 16/293,716, filed Mar. 6, 2019, mailed Oct. 29, 2020, 19 pgs.
Waltermire, Jamie; Final Office Action for U.S. Appl. No. 16/293,716, filed Mar. 6, 2019, mailed Sep. 10, 2020, 24 pgs.
Waltermire, Jamie; Non-Final Office Action for U.S. Appl. No. 16/293,716, filed Mar. 6, 2019, mailed Feb. 5, 2021, 18 pgs.
Waltermire, Jamie; Non-Final Office Action for U.S. Appl. No. 16/293,716, filed Mar. 6, 2019, mailed May 5, 2020, 70 pgs.
Waltermire, Jamie; Non-Final Office Action for U.S. Appl. No. 16/293,716, filed Mar. 6, 2019, mailed Jul. 26, 2021, 26 pgs.
Waltermire, Jamie; Notice of Allowance for U.S. Appl. No. 16/293,716, filed Mar. 6, 2019, mailed Nov. 3, 2021, 20 pgs.
Waltermire, Jamie; Requirement for Restriction/Election for U.S. Appl. No. 16/293,716, filed Mar. 6, 2019, mailed Feb. 26, 2020, 6 pgs.

(56) References Cited

OTHER PUBLICATIONS

Waltermire, Jamie; Certificate of Correction for U.S. Appl. No. 16/526,555, filed Jul. 30, 2019, mailed Nov. 16, 2021, 1 pg.
Waltermire, Jamie; Final Office Action for U.S. Appl. No. 16/526,555, filed Jul. 30, 2019, mailed Mar. 8, 2021, 25 pgs.
Waltermire, Jamie; Non-Final Office Action for U.S. Appl. No. 16/526,555, filed Jul. 30, 2019, mailed Oct. 27, 2020, 39 pgs.
Waltermire, Jamie; Non-Final Office Action for U.S. Appl. No. 16/526,555, filed Jul. 30, 2019, mailed Apr. 2, 2020, 63 pgs.
Waltermire, Jamie; Notice of Allowance for U.S. Appl. No. 16/526,555, filed Jul. 30, 2019, mailed May 21, 2021, 32 pgs.
Waltermire, Jamie; Requirement for Restriction/Election for U.S. Appl. No. 16/526,555, filed Jul. 30, 2019, mailed Jan. 17, 2020, 7 pgs.
Waltermire, Jamie; Supplemental Notice of Allowance for U.S. Appl. No. 16/526,555, filed Jul. 30, 2019, mailed Jun. 8, 2021, 13 pgs.
Waltermire, Jamie; Supplemental Notice of Allowance for U.S. Appl. No. 16/526,555, filed Jul. 30, 2019, mailed Aug. 11, 2021, 8 pgs.
Waltermire, Jamie; Non-Final Office Action for U.S. Appl. No. 17/173,293, filed Feb. 11, 2021, mailed Dec. 22, 2023, 168 pgs.
Waltermire, Jamie; Requirement for Restriction/Election for U.S. Appl. No. 17/173,293, filed Feb. 11, 2021, mailed Aug. 30, 2023, 6 pgs.
Waltermire, Jamie; Final Office Action for U.S. Appl. No. 17/127,050, filed Dec. 18, 2020, mailed Apr. 26, 2023, 32 pgs.
Waltermire, Jamie; Non-Final Office Action for U.S. Appl. No. 17/127,050, filed Dec. 18, 2020, mailed Dec. 2, 2022, 22 pgs.
Waltermire, Jamie; Non-Final Office Action for U.S. Appl. No. 17/127,050, filed Dec. 18, 2020, mailed Jun. 17, 2022, 147 pgs.
Waltermire, Jamie; Notice of Allowance for U.S. Appl. No. 17/127,050, filed Dec. 18, 2020, mailed Aug. 7, 2023, 14 pgs.
Waltermire, Jamie; Requirement for Restriction/Election for U.S. Appl. No. 17/127,050, filed Dec. 18, 2020, mailed Apr. 14, 2022, 5 pgs.
Waltermire, Jamie; Advisory Action for U.S. Appl. No. 17/127,060, filed Dec. 18, 2020, mailed Dec. 21, 2023, 8 pgs.
Waltermire, Jamie; Final Office Action for U.S. Appl. No. 17/127,060, filed Dec. 18, 2020, mailed Oct. 19, 2023, 44 pgs.
Waltermire, Jamie; Non-Final Office Action for U.S. Appl. No. 17/127,060, filed Dec. 18, 2020, mailed Jun. 21, 2023, 159 pgs.
Waltermire, Jamie; Final Office Action for U.S. Appl. No. 15/663,905, filed Jul. 31, 2017, mailed Aug. 22, 2019, 23 pgs.
Waltermire, Jamie; Non-Final Office Action for U.S. Appl. No. 15/663,905, filed Jul. 31, 2017, mailed Jun. 25, 2019, 66 pgs.
Waltermire, Jamie; Notice of Allowance for U.S. Appl. No. 15/663,905, filed Jul. 31, 2017, mailed Nov. 4, 2019, 18 pgs.
Waltermire, Jamie; Requirement for Restriction/Election for U.S. Appl. No. 15/663,905, filed Jul. 31, 2017, mailed Mar. 21, 2019, 8 pgs.
Waltermire, Jamie; Advisory Action for U.S. Appl. No. 16/381,678, filed Apr. 11, 2019, mailed Feb. 26, 2020, 3 pgs.
Waltermire, Jamie; Corrected Notice of Allowance for U.S. Appl. No. 16/381,678, filed Apr. 11, 2019, mailed Aug. 9, 2021, 8 pgs.
Waltermire, Jamie; Examiner-Initiated Interview Summary for U.S. Appl. No. 16/381,678, filed Apr. 11, 2019, mailed Aug. 30, 2021, 2 pgs.
Waltermire, Jamie; Final Office Action for U.S. Appl. No. 16/381,678, filed Apr. 11, 2019, mailed Oct. 19, 2020, 24 pgs.
Waltermire, Jamie; Final Office Action for U.S. Appl. No. 16/381,678, filed Apr. 11, 2019, mailed Dec. 30, 2019, 17 pgs.
Waltermire, Jamie; Final Office Action for U.S. Appl. No. 16/381,678, filed Apr. 11, 2019, mailed Jun. 16, 2020, 8 pgs.
Waltermire, Jamie; Final Office Action for U.S. Appl. No. 16/381,678, filed Apr. 11, 2019, mailed Aug. 20, 2020, 21 pgs.
Waltermire, Jamie; Non-Final Office Action for U.S. Appl. No. 16/381,678, filed Apr. 11, 2019, mailed Mar. 5, 2021, 36 pgs.
Waltermire, Jamie; Non-Final Office Action for U.S. Appl. No. 16/381,678, filed Apr. 11, 2019, mailed Apr. 17, 2020, 30 pgs.
Waltermire, Jamie; Non-Final Office Action for U.S. Appl. No. 16/381,678, filed Apr. 11, 2019, mailed Sep. 9, 2019, 50 pgs.
Waltermire, Jamie; Notice of Allowance for U.S. Appl. No. 16/381,678, filed Apr. 11, 2019, mailed Jun. 3, 2021, 14 pgs.
Waltermire, Jamie; Notice of Allowance for U.S. Appl. No. 16/381,678, filed Apr. 11, 2019, mailed Jul. 30, 2020, 15 pgs.
Waltermire, Jamie; Final Office Action for U.S. Appl. No. 16/561,203, filed Sep. 5, 2019, mailed Sep. 10, 2020, 25 pgs.
Waltermire, Jamie; Non-Final Office Action for U.S. Appl. No. 16/561,203, filed Sep. 5, 2019, mailed May 6, 2020, 59 pgs.
Waltermire, Jamie; Notice of Allowance for U.S. Appl. No. 16/561,203, filed Sep. 5, 2019, mailed Nov. 3, 2020, 14 pgs.
Waltermire, Jamie; Requirement for Restriction/Election for U.S. Appl. No. 16/561,203, filed Sep. 5, 2019, mailed Feb. 26, 2020, 5 pgs.
Waltermire, Jamie; Final Office Action for U.S. Appl. No. 16/689,407, filed Nov. 20, 2019, mailed Apr. 23, 2021, 18 pgs.
Waltermire, Jamie; Non-Final Office Action for U.S. Appl. No. 16/689,407, filed Nov. 20, 2019, mailed Jan. 8, 2021, 92 pgs.
Waltermire, Jamie; Notice of Allowance for U.S. Appl. No. 16/689,407, filed Nov. 20, 2019, mailed Jul. 19, 2021, 12 pgs.
Waltermire, Jamie; Requirement for Restriction/Election for U.S. Appl. No. 16/689,407, filed Nov. 20, 2019, mailed Oct. 29, 2020, 6 pgs.
Collison, Alan B.; Non-Final Office Action for U.S. Appl. No. 17/834,999, filed Jun. 8, 2022, mailed Jan. 27, 2023, 28 pgs.
Collison, Alan B.; Non-Final Office Action for U.S. Appl. No. 17/834,999, filed Jun. 8, 2022, mailed Sep. 12, 2022, 104 pgs.
Collison, Alan B.; Notice of Allowance for U.S. Appl. No. 17/834,999, filed Jun. 8, 2022, mailed May 18, 2023, 14 pgs.
Collison, Alan B.; Advisory Action for U.S. Appl. No. 17/688,356, filed Mar. 7, 2022, mailed Apr. 26, 2023, 7 pgs.
Collison, Alan B.; Advisory Action for U.S. Appl. No. 17/688,356, filed Mar. 7, 2022, mailed Jul. 25, 2023, 6 pgs.
Collison, Alan B.; Applicant-Initiated Interview Summary for U.S. Appl. No. 17/688,356, filed Mar. 7, 2022, mailed Dec. 28, 2022, 3 pgs.
Collison, Alan B.; Applicant-Initiated Interview Summary for U.S. Appl. No. 17/688,356, filed Mar. 7, 2022, mailed Apr. 6, 2023, 3 pgs.
Collison, Alan B.; Final Office Action for U.S. Appl. No. 17/688,356, filed Mar. 7, 2022, mailed Nov. 21, 2023, 29 pgs.
Collison, Alan B.; Final Office Action for U.S. Appl. No. 17/688,356, filed Mar. 7, 2022, mailed Feb. 1, 2023, 21 pgs.
Collison, Alan B.; Non-Final Office Action for U.S. Appl. No. 17/688,356, filed Mar. 7, 2022, mailed Oct. 24, 2022, 41 pgs.
Collison, Alan B.; Non-Final Office Action for U.S. Appl. No. 17/688,356, filed Mar. 7, 2022, mailed Jul. 31, 2023, 18 pgs.
Collison, Alan B.; Restriction Requirement for U.S. Appl. No. 17/688,356, filed Mar. 7, 2022, mailed Jun. 20, 2022, 9 pgs.
Sollie, Greg; Applicant Initiated Interview Summary for U.S. Appl. No. 15/988,550, filed May 24, 2018, mailed Dec. 27, 2019, 3 pgs.
Sollie, Greg; Applicant-Initiated Interview Summary for U.S. Appl. No. 15/988,550, filed May 24, 2018, mailed Dec. 24, 2020, 2 pgs.
Sollie, Greg; Final Office Action for U.S. Appl. No. 15/988,550, filed May 24, 2018, mailed Aug. 14, 2019, 19 pgs.
Sollie, Greg; Final Office Action for U.S. Appl. No. 15/988,550, filed May 24, 2018, mailed Aug. 27, 2020, 27 pgs.
Sollie, Greg; Non-Final Office Action for U.S. Appl. No. 15/988,550, filed May 24, 2018, mailed Oct. 9, 2019, 17 pgs.
Sollie, Greg; Non-Final Office Action for U.S. Appl. No. 15/988,550, filed May 24, 2018, mailed Mar. 11, 2020, 35 pgs.
Sollie, Greg; Non-Final Office Action for U.S. Appl. No. 15/988,550, filed May 24, 2018, mailed May 29, 2019, 48 pgs.
Sollie, Greg; Notice of Allowance for U.S. Appl. No. 15/988,550, filed May 24, 2018, mailed Apr. 13, 2021, 21 pgs.
Solie, Greg; Certificate of Correction for U.S. Appl. No. 16/280,595, filed Feb. 20, 2019, mailed Sep. 12, 2023, 2 pgs.
Sollie, Greg; Advisory Action for U.S. Appl. No. 16/280,595, filed Feb. 20, 2019, mailed Jul. 6, 2020, 3 pgs.
Sollie, Greg; Applicant-Initiated Interview Summary for U.S. Appl. No. 16/280,595, filed Feb. 20, 2019 mailed May 6, 2020, 3 pgs.

(56) References Cited

OTHER PUBLICATIONS

Sollie, Greg; Final Office Action for U.S. Appl. No. 16/280,595, filed Feb. 20, 2019, mailed Oct. 3, 2019, 19 pgs.
Sollie, Greg; Final Office Action for U.S. Appl. No. 16/280,595, filed Feb. 20, 2019, mailed Dec. 30, 2020, 25 pgs.
Sollie, Greg; Final Office Action for U.S. Appl. No. 16/280,595, filed Feb. 20, 2019, mailed Mar. 24, 2020, 20 pgs.
Sollie, Greg; Final Office Action for U.S. Appl. No. 16/280,595, filed Feb. 20, 2019, mailed May 31, 2022, 27 pgs.
Sollie, Greg; Final Office Action for U.S. Appl. No. 16/280,595, filed Feb. 20, 2019, mailed Aug. 16, 2021, 21 pgs.
Sollie, Greg; Non-Final Office Action for U.S. Appl. No. 16/280,595, filed Feb. 20, 2019, mailed Dec. 19, 2019, 23 pgs.
Sollie, Greg; Non-Final Office Action for U.S. Appl. No. 16/280,595, filed Feb. 20, 2019, mailed Dec. 8, 2021, 17 pgs.
Sollie, Greg; Non-Final Office Action for U.S. Appl. No. 16/280,595, filed Feb. 20, 2019, mailed Apr. 9, 2021, 20 pgs.
Sollie, Greg; Non-Final Office Action for U.S. Appl. No. 16/280,595, filed Feb. 20, 2019, mailed May 29, 2019, 60 pgs.
Sollie, Greg; Non-Final Office Action for U.S. Appl. No. 16/280,595, filed Feb. 20, 2019, mailed Aug. 28, 2020, 26 pgs.
Sollie, Greg; Non-Final Office Action for U.S. Appl. No. 16/280,595, filed 2/20/20219, mailed Sep. 16, 2022, 14 pgs.
Sollie, Greg; Notice of Allowance for U.S. Appl. No. 16/280,595, filed Feb. 20, 2019, mailed Mar. 31, 2023, 27 pgs.
Sollie, Greg; Advisory Action for U.S. Appl. No. 16/530,052, filed Aug. 2, 2019, mailed Mar. 9, 2022, 4 pgs.
Sollie, Greg; Advisory Action for U.S. Appl. No. 16/530,052, filed Aug. 2, 2019, mailed Jun. 29, 2021, 15 pgs.
Sollie, Greg; Applicant-Initiated Interview Summary for U.S. Appl. No. 16/530,052, filed Aug. 2, 2019, mailed Feb. 5, 2020, 2 pgs.
Sollie, Greg; Final Office Action for U.S. Appl. No. 16/530,052, filed Aug. 2, 2019, mailed Dec. 27, 2019, 49 pgs.
Sollie, Greg; Final Office Action for U.S. Appl. No. 16/530,052, filed Aug. 2, 2019, mailed Dec. 8, 2021, 17 pgs.
Sollie, Greg; Final Office Action for U.S. Appl. No. 16/530,052, filed Aug. 2, 2019, mailed Apr. 20, 2021, 27 pgs.
Sollie, Greg; Final Office Action for U.S. Appl. No. 16/530,052, filed Aug. 2, 2019, mailed Aug. 28, 2020, 29 pgs.
Sollie, Greg; Non-Final Office Action for U.S. Appl. No. 16/530,052, filed Aug. 2, 2019, mailed Oct. 2, 2019, 12 pgs.
Sollie, Greg; Non-Final Office Action for U.S. Appl. No. 16/530,052, filed Aug. 2, 2019, mailed Dec. 18, 2020, 17 pgs.
Sollie, Greg; Non-Final Office Action for U.S. Appl. No. 16/530,052, filed Aug. 2, 2019, mailed Mar. 3, 2020, 24 pgs.
Sollie, Greg; Non-Final Office Action for U.S. Appl. No. 16/530,052, filed Aug. 2, 2019, mailed Aug. 13, 2021, 22 pgs.
Cellulose Material Solutions, LLC; Brochure for Infinity Care Thermal Liner, accessed on Oct. 22, 2018, 2 pgs.
Sollie, Greg; Applicant-Initiated Interview Summary for U.S. Appl. No. 16/401,603, filed May 2, 2019, mailed May 15, 2020, 3 pgs.
Sollie, Greg; Final Office Action for U.S. Appl. No. 16/401,603, filed May 2, 2019, mailed Jun. 30, 2020, 13 pgs.
Sollie, Greg; Non-Final Office Action for U.S. Appl. No. 16/401,603, filed May 2, 2019, mailed Mar. 10, 2020, 67 pgs.
Collison, Alan B.; Non-Final Office Action for U.S. Appl. No. 18/234,425, filed Aug. 16, 2023, mailed Apr. 11, 2024, 143 pgs.
Waltermire, Jamie; Certificate of Correction for U.S. Appl. No. 15/482,186, filed Apr. 7, 2017, mailed Apr. 23, 2024, 1 pg.
Waltermire, Jamie; Non-Final Office Action for U.S. Appl. No. 17/891,565, filed Aug. 19, 2022, mailed Mar. 29, 2024, 24 pgs.
Waltermire, Jamie; Notice of Allowance for U.S. Appl. No. 18/146,232, filed Dec. 23, 2022, mailed Mar. 25, 2024, 149 pgs.
Waltermire, Jamie; Non-Final Office Action for U.S. Appl. No. 17/127,060, filed Dec. 18, 2020, mailed Mar. 13, 2024, 18 pgs.
Waltermire, Jamie; Certificate of Correction for U.S. Appl. No. 17/497,057, filed Oct. 8, 2021, mailed Apr. 23, 2024, 1 pg.
Solli, Greg; Non-Final Office Action for U.S. Appl. No. 17/536,878, filed Nov. 29, 2011, mailed Mar. 21, 2024, 25 pgs.
Sollie, Greg; Non-Final Office Action for U.S. Appl. No. 17/901,558, filed Sep. 1, 2022, mailed Mar. 11, 2024, 30 pgs.
Sollie, Greg; Certificate of Correction for U.S. Appl. No. 18/095,310, filed Jan. 10, 2023, mailed Apr. 16, 2024, 1 pg.
Sollie, Greg; Notice of Allowance for U.S. Appl. No. 18/208,709, filed Jun. 12, 2023, mailed Apr. 9, 2024, 9 pgs.
Anagnostopoulos, John; Non-Final Office Action U.S. Appl. No. 17/666,206, filed Feb. 7, 2022, mailed Mar. 19, 2024, 20 pgs.
https://www.cnckitchen.com/blog/whats-stronger-3d-prints-or-wood (Year: 2022), 2 pgs.
https://www.paperonweb.com/A 1030.htm#:-:text= Manila %20is %20considered %2othe%20longest, 3600mm)%20in%2othe%20natural%20state. (Year: 2006), 1 pg.
Waltermire, Jamie; Examination Report for Australian patent application No. 2018260901, filed Nov. 8, 2018, mailed Apr. 30, 2024, 4 pgs.
Waltermire, Jamie; Examination Report for Australian patent application No. 2018260911, filed Nov. 8, 2018, mailed Apr. 30, 2024, 4 pgs.
Waltermire, Jamie; Examination Report for Australian patent application No. 2018260914, filed Nov. 8, 2018, mailed Apr. 30, 2024, 4 pgs.
MP Global Products, LLC; Office Action for European patent application No. 22152100.8, mailed Mar. 19, 2024, 4 pgs.
Collison, Alan B.; Office Action for Canadian patent application No. 3,176,052, filed Nov. 7, 2027, mailed Feb. 27, 2024, 10 pgs.
Waltermire, Jamie; Non-Final Office Action for U.S. Appl. No. 18/416,948, filed Jan. 19, 2024, mailed Sep. 23, 2024, 155 pgs.
Waltermire, Jamie; Requirement for Restriction/Election for U.S. Appl. No. 18/416,948, filed Jan. 19, 2024, mailed Aug. 5, 2024, 6 pgs.
Waltermire, Jamie; Requirement for Restriction/Election for U.S. Appl. No. 18/734,865, filed Jun. 5, 2024, mailed Sep. 28, 2024, 6 pgs.
Collison, Alan B.; Restriction Requirement for U.S. Appl. No. 18/612,835, filed Mar. 21, 2024, mailed May 22, 2024, 12 pgs.
MP Global Products LLC; Notice of Decision to Grant for European Patent Application No. 17868605.1, mailed Dec. 23, 2021, 2 pgs.
MP Global Products, L.L.C.; Notice of Acceptance of Patent Application for Australian Patent Application No. 2017359035, mailed Jun. 25, 2021, 3 pgs.
Waltermire, Jamie; Final Office Action for U.S. Appl. No. 17/891,565, filed Aug. 19, 2022, mailed Aug. 21, 2024, 33 pgs.
Fibre Box Association (FBA); "Voluntary Standard for Repulping and Recycling Corrugated Fiberboard Treated to Improve Its Performance in the Presence of Water and Water Vapor", 2013, 23 pgs.
NC State University Bio Resources; "Repulping High Wet-Strength Waste Banknote Paper by a Dual-pH Pretreatment Process", 2012, 7 pgs.
Waltermire, Jamie; Non-Final Office Action for U.S. Appl. No. 18/115,791, filed Mar. 1, 2023, mailed Aug. 28, 2024, 167 pgs.
Waltermire, Jamie; Non-Final Office Action for U.S. Appl. No. 17/173,293, filed Feb. 11, 2021, mailed Sep. 10, 2024, 32 pgs.
Waltermire, Jamie; Advisory Action for U.S. Appl. No. 17/127,060, filed Dec. 18, 2020, mailed Aug. 30, 2024, 8 pgs.
Waltermire, Jamie; Final Office Action for U.S. Appl. No. 17/538,795, filed Nov. 30, 2021, mailed Aug. 27, 2024, 51 pgs.
Waltermire, Jamie; Certificate of Correction for U.S. Appl. No. 17/497,054, filed Oct. 8, 2021, mailed Sep. 10, 2024, 1 pg.
Waltermire, Jamie; Non-Final Office Action for U.S. Appl. No. 18/197,300, filed May 15, 2023, mailed Aug. 28, 2024, 162 pgs.
Waltermire, Jamie; Non-final Office Action for U.S. Appl. No. 18/416,949, filed Jan. 19, 2024, mailed Sep. 26, 2024, 157 pgs.
Waltermire, Jamie; Requirement for Restriction/Election for U.S. Appl. No. 18/416,949, filed Jan. 19, 2024, mailed Aug. 5, 2024, 8 pgs.
Sollie, Greg; Non-Final Office Action for U.S. Appl. No. 18/517,626, filed Nov. 22, 2023, mailed Aug. 30, 2024, 159 pgs.
Sollie, Greg; Final Office Action for U.S. Appl. No. 17/536,878, filed Nov. 29, 2021, mailed Sep. 6, 2024, 38 pgs.
Sollie, Greg; Notice of Allowance for U.S. Appl. No. 17/901,558, filed Sep. 1, 2022, mailed Sep. 16, 2024, 28 pgs.

(56) References Cited

OTHER PUBLICATIONS

Sollie, Greg; Non-Final Office Action for U.S. Appl. No. 18/208,704, filed Jun. 12, 2023, mailed Sep. 13, 2024, 13 pgs.
Waltermire, Jamie; Examination Report for Australian Patent Application No. 2018260901, filed Nov. 8, 2018, mailed Jul. 18, 2024, 5 pgs.
Waltermire, Jamie; Notice of Acceptance of Patent Application for Australian Patent Application No. 2018260920, filed Nov. 8, 2018, mailed Aug. 16, 2024, 4 pgs.
Collison, Alan B.; Final Office Action for U.S. Appl. No. 18/234,425, filed Aug. 16, 2023, mailed Jul. 23, 2024, 12 pgs.
Waltermire, Jamie; Final Office Action for U.S. Appl. No. 17/173,293, filed Feb. 11, 2021, mailed Jun. 6, 2024, 27 pgs.
Waltermire, Jamie; Final Office Action for U.S. Appl. No. 17/127,060, filed Dec. 18, 2020, mailed Jun. 24, 2024, 25 pgs.
Waltermire, Jamie; Non-Final Office Action for U.S. Appl. No. 17/538,795, filed Nov. 30, 2021, mailed May 13, 2024, 157 pgs.
Sollie, Greg; Notice of Allowance for U.S. Appl. No. 18/106,169, filed Feb. 6, 2023, mailed Jun. 7, 2024, 11 pgs.
Sollie, Greg; Certificate of Correction for U.S. Appl. No. 17/679,772, filed Feb. 24, 2022, mailed Jun. 4, 2024, 2 pgs.
Sollie, Greg; Requirement for Restriction/Election for U.S. Appl. No. 18/517,626, filed Nov. 22, 2023, mailed Jun. 13, 2024, 6 pgs.
Sollie, Greg; Final Office Action for U.S. Appl. No. 18/140,641, filed Apr. 28, 2023, mailed Jun. 27, 2024, 19 pgs.
Sollie, Greg; Non-Final Office Action for U.S. Appl. No. 18/208,704, filed Jun. 12, 2023, mailed May 22, 2024, 18 pgs.
Anagnostopoulos, John; Final Office Action for U.S. Appl. No. 17/666,206, filed Feb. 7, 2022, mailed Jul. 10, 2024, 30 pgs.
Waltermire, Jamie; Examination Report for Australian patent application No. 2018260915, filed Nov. 8, 2018, mailed May 30, 2024, 4 pgs.
Waltermire, Jamie; Examination Report for Australian patent application No. 2018260920, filed Nov. 8, 2018, mailed May 18, 2024, 4 pgs.
Collison, Alan B.; Office Action for European patent application No. 23211653.3, filed Nov. 7, 2017, mailed Jul. 12, 2024, 3 pgs.
Collison, Alan B.; Advisory Action for U.S. Appl. No. 18/234,425, filed Aug. 16, 2023, mailed Nov. 15, 2024, 3 pgs.
Collison, Alan B.; Applicant-Initiated Interview Summary for U.S. Appl. No. 18/612,835, filed Mar. 21, 2024, mailed Oct. 29, 2024, 2 pgs.
Collison, Alan B.; Non-Final Office Action for U.S. Appl. No. 18/612,835, filed Mar. 21, 2024, mailed Sep. 11, 2024, 65 pgs.
Waltermire, Jamie; Advisory Action for U.S. Appl. No. 17/891,565, filed Aug. 19, 2022, mailed Oct. 31, 2024, 14 pgs.
Waltermire, Jamie; Non-Final Office Action for U.S. Appl. No. 17/127,060, filed Dec. 18, 2020, mailed Oct. 9, 2024, 24 pgs.
Sollie, Greg; Notice of Allowance for U.S. Appl. No. 18/140,641, filed Apr. 28, 2023, mailed Oct. 31, 2024, 22 pgs.
Waltermire, Jamie; Examination Report for Australian Patent Application No. 2018260901, filed Nov. 8, 2018, mailed Oct. 24, 2024, 4 pgs.
Waltermire, Jamie; Examination Report for Australian Patent Application No. 2018260915, filed Nov. 8, 2018, mailed Oct. 2, 2024, 4 pgs.
Waltermire, Jamie; Examination Report for Australian Patent Application No. 2024216411, filed Nov. 8, 2018, mailed Oct. 8, 2024, 5 pgs.
Sollie, Greg; Examination Report for Australian Patent Application No. 2023266362, filed Nov. 8, 2018, mailed Oct. 30, 2024, 4 pgs.
Collison, Alan B.; Advisory Action for U.S. Appl. No. 18/234,425, filed Aug. 16, 2023, mailed Nov. 25, 2024, 2 pgs.
Sollie, Greg; Advisory Action for U.S. Appl. No. 17/536,878, filed Nov. 29, 2021, mailed Nov. 27, 2024, 14 pgs.
Waltermire, Jamie; Advisory Action for U.S. Appl. No. 17/538,795, filed Nov. 30, 2021, mailed Dec. 5, 2024, 3 pgs.
Collison, Alan B.; Communication pursuant to Article 94(3) EPC for Application No. 23211653.3, filed Nov. 7, 2017, mailed Oct. 4, 2024, 3 pgs.
Waltermire, Jamie; Notice of Allowance for U.S. Appl. No. 18/416,948, filed Jan. 19, 2024, mailed Jan. 29, 2025, 23 pgs.
Waltermire, Jamie; Non-Final Office Action for U.S. Appl. No. 18/734,865, filed Jun. 5, 2024, mailed Jan. 24, 2025, 131 pgs.
MP Global Products LLC; Examination Report for Canada Patent Application No. 3,218,319, mailed Dec. 23, 2024, 5 pgs.
Waltermire, Jamie; Notice of Allowance for U.S. Appl. No. 17/891,565, filed Aug. 19, 2022, mailed Jan. 2, 2025, 18 pgs.
Waltermire, Jamie; Applicant-Initiated Interview Summary for U.S. Appl. No. 18/115,791, filed Mar. 1, 2023, mailed Feb. 14, 2025, 3 pgs.
Waltermire, Jamie; Final Office Action for U.S. Appl. No. 18/115,791, filed Mar. 1, 2023, mailed Dec. 20, 2024, 28 pgs.
Waltermire, Jamie; Final Office Action for U.S. Appl. No. 17/173,293, filed Feb. 11, 2021, mailed Dec. 23, 2024, 22 pgs.
Waltermire, Jamie; Final Office Action for U.S. Appl. No. 17/127,060, filed Dec. 18, 2020, mailed Jan. 24, 2025, 24 pgs.
Waltermire, Jamie; Non-Final Office Action for U.S. Appl. No. 17/538,795, filed Nov. 30, 2021, mailed Feb. 4, 2025, 33 pgs.
Waltermire, Jamie; Final Office Action for U.S. Appl. No. 18/197,300, filed May 15, 2023, mailed Jan. 13, 2025, 22 pgs.
Waltermire, Jamie; Notice of Allowance for U.S. Appl. No. 18/416,949, filed Jan. 19, 2024, mailed Jan. 27, 2025, 25 pgs.
Sollie, Greg; Final Office Action for U.S. Appl. No. 18/517,626, filed Nov. 22, 2023, mailed Dec. 12, 2024, 16 pgs.
Sollie, Greg; Non-Final Office Action for U.S. Appl. No. 17/536,878, filed Nov. 29, 2021, mailed Dec. 30, 2024, 25 pgs.
Sollie, Greg; Certificate of Correction for U.S. Appl. No. 18/094,806, filed Jan. 9, 2023, mailed Dec. 31, 2024, 4 pgs.
Sollie, Greg; Notice of Allowance for U.S. Appl. No. 18/208,704, filed Jun. 12, 2023, mailed Jan. 2, 2025, 26 pgs.
Sollie, Greg; Certificate of Correction for U.S. Appl. No. 18/208,708, filed Jun. 12, 2023, mailed Jan. 21, 2025, 1 pg.
Sollie, Greg; Certificate of Correction for U.S. Appl. No. 18/208,709, filed Jun. 12, 2023, mailed Jan. 21, 2025, 1 pg.
Anagnostopoulos, John; Notice of Allowance for U.S. Appl. No. 17/666,206, filed Feb. 7, 2022, mailed Dec. 9, 2024, 31 pgs.
Waltermire, Jamie; Examination Report for Australian Patent Application No. 2024216411, filed Nov. 8, 2018, mailed Dec. 19, 2024, 4 pgs.
Sollie, Greg; Examination Report for Australian Application No. 2023285920, filed Nov. 8, 2018, mailed Jan. 16, 2025, 4 pgs.
Sollie, Greg; Examination Report for Australian Patent Application No. 2023285879, filed Nov. 8, 2018, mailed Jan. 14, 2025, 3 pgs.
Collison, Alan B.; Notice of Allowance for Canadian Patent Application No. 3,176,052, filed Nov. 7, 2017, mailed Feb. 6, 2025, 1 pgs.
Collison, Alan B.; Examination Report for Australian Patent Application No. 2023203006, filed Nov. 7, 2017, mailed Nov. 27, 2024, 7 pgs.
Collison, Alan B.; Notice of Allowance for U.S. Appl. No. 18/234,425, filed Aug. 16, 2023, mailed Apr. 2, 2025, 35 pgs.
Waltermire, Jamie; Non-Final Office Action for U.S. Appl. No. 18/115,791, filed Mar. 1, 2023, mailed Apr. 9, 2025, 22 pgs.
Waltermire, Jamie; Advisory Action for U.S. Appl. No. 17/173,293, filed Feb. 11, 2021, mailed Feb. 28, 2025, 3 pgs.
Waltermire, Jamie; Non-Final Office Action for U.S. Appl. No. 17/173,293, filed Feb. 11, 2021, mailed Apr. 11, 2025, 16 pgs.
Waltermire, Jamie; Non-Final Office Action for U.S. Appl. No. 17/127,060, filed Dec. 18, 2020, mailed Apr. 25, 2025, 23 pgs.
Waltermire, Jamie; Non-Final Office Action for U.S. Appl. No. 18/197,300, filed May 15, 2023, mailed Mar. 27, 2025, 14 pgs.
Sollie, Greg; Certificate of Correction for U.S. Appl. No. 18/106,169, filed Feb. 6, 2023, mailed Apr. 29, 2025, 1 pg.
Sollie, Greg; Notice of Allowance for U.S. Appl. No. 18/517,626, filed Nov. 22, 2023, mailed Feb. 28, 2025, 10 pgs.
Sollie, Greg; Applicant-Initiated Interview Summary for U.S. Appl. No. 17/536,878, filed Nov. 29, 2021, mailed Apr. 2, 2025, 2 pgs.
Sollie, Greg; Notice of Allowance for U.S. Appl. No. 17/536,878, filed Nov. 29, 2021, mailed May 7, 2025, 12 pgs.
Sollie, Greg; Notice of Allowance for U.S. Appl. No. 18/140,641, filed Apr. 28, 2023, mailed Mar. 26, 2025, 13 pgs.
Sollie, Greg; Notice of Allowance for U.S. Appl. No. 19/056,551, filed Feb. 18, 2025, mailed Apr. 14, 2025, 8 pgs.

(56) References Cited

OTHER PUBLICATIONS

Sollie, Greg; Non-Final Office Action for U.S. Appl. No. 18/974,426, filed Dec. 9, 2024, mailed Mar. 7, 2025, 20 pgs.
Anagnostopoulos, John; Non-Final Office Action for U.S. Appl. No. 19/056,573, filed Feb. 18, 2025, mailed Apr. 30, 2025, 13 pgs.
Waltermire, Jamie; Examination Report for Australian Patent Application No. 2024216412, filed Nov. 8, 2018, mailed Mar. 25, 2025, 9 pgs.
Sollie, Greg; Examination Report for Australian Application No. 2024200915, filed Nov. 8, 2018, mailed Mar. 5, 2025, 3 pgs.
Sollie, Greg; Examination Report for Australian Application No. 2024200916, filed Nov. 8, 2018, mailed Mar. 5, 2025, 4 pgs.
Sollie, Greg; Examination Report for Australian Application No. 2024200959, filed Nov. 8, 2018, mailed Mar. 8, 2025, 3 pgs.
Sollie, Greg; Examination Report for Australian Application No. 2024200964, filed Nov. 8, 2018, mailed Mar. 5, 2025, 4 pgs.
Waltermire, Jamie; Final Office Action for U.S. Appl. No. 18/734,865, filed Jun. 5, 2024, mailed May 23, 2025, 45 pgs.
Collison, Alan B.; Non-Final Office Action for U.S. Appl. No. 18/612,835, filed Mar. 21, 2024, mailed Jun. 6, 2025, 21 pgs.
Waltermire, Jamie; Final Office Action for U.S. Appl. No. 17/127,060, filed Dec. 18, 2020, mailed Jun. 17, 2025, 14 pgs.
Waltermire, Jamie; Final Office Action for U.S. Appl. No. 17/538,795, filed Nov. 30, 2021, mailed Jun. 5, 2025, 34 pgs.
Waltermire, Jamie; Non-Final Office Action for U.S. Appl. No. 19/188,779, filed Apr. 24, 2025, mailed Jun. 3, 2025, 11 pgs.
Sollie, Greg; Final Office Action for U.S. Appl. No. 18/974,426, filed Dec. 9, 2024, mailed Jun. 13, 2025, 24 pgs.
Sollie, Greg; Non-Final Office Action for U.S. Appl. No. 19/185,469, filed Apr. 22, 2025, mailed May 30, 2025, 9 pgs.
Pratt Retail PTY LTD; Office Action for Chinese Patent Application No. 202311045972.8, filed Nov. 7, 2017, mailed Apr. 30, 2025, 7 pgs.
Sollie, Greg; Examination Report for Australian Patent Application No. 2024204391, filed Nov. 14, 2018, mailed May 30, 2025, 3 pgs.
Waltermire, Jamie; Final Office Action for U.S. Appl. No. 17/173,293, filed Feb. 11, 2021, mailed Jul. 25, 2025, 17 pgs.
Sollie, Greg; Non-Final Office Action for U.S. Appl. No. 19/252,342, filed Jun. 27, 2025, mailed Jul. 24, 2025, 9 pgs.
Waltermire, Jamie; Final Office Action for U.S. Appl. No. 18/115,791, filed Mar. 1, 2023, mailed Jul. 23, 2025, 22 pgs.
Waltermire, Jamie; Advisory Action for U.S. Appl. No. 18/734,865, filed Jun. 5, 2024, mailed Aug. 11, 2025, 5 pgs.
Collison, Alan B.; Applicant-Initiated Interview Summary for U.S. Appl. No. 18/612,835, filed Mar. 21, 2024, mailed Jun. 25, 2025, 2 pgs.
Waltermire, Jamie; Requirement for Restriction/Election for U.S. Appl. No. 18/747,098, filed Jun. 18, 2024, mailed Aug. 28, 2025, 8 pgs.
Waltermire, Jamie; Notice of Allowance for U.S. Appl. No. 17/127,060, filed Dec. 18, 2020, mailed Sep. 11, 2025, 17 pgs.
Waltermire, Jamie; Advisory Action for U.S. Appl. No. 17/538,795, filed Nov. 30, 2021, mailed Aug. 26, 2025, 9 pgs.
Waltermire, Jamie; Notice of Allowance for U.S. Appl. No. 18/197,300, filed May 15, 2023, mailed Aug. 5, 2025, 16 pgs.
Waltermire, Jamie; Examination Report for Australian Patent Application No. 2024208808, filed Nov. 8, 2018, mailed Sep. 5, 2025, 7 pgs.
MP Global Products, L.L.C.; Examination Report for Australian Patent Application No. 2024201654, filed Nov. 7, 2017, mailed Jun. 26, 2025, 4 pgs.
Waltermire, Jamie; Non-Final Office Action for U.S. Appl. No. 18/734,865, filed Jun. 5, 2024, mailed Sep. 17, 2025, 20 pgs.
Waltermire, Jamie; Final Office Action for U.S. Appl. No. 19/188,779, filed Apr. 24, 2025, mailed Sep. 16, 2025, 14 pgs.
Anagnostopoulos, John; Final Office Action for U.S. Appl. No. 19/056,573, filed Feb. 18, 2025, mailed Sep. 12, 2025, 28 pgs.
https://www.acme-hardesty.com/product/sodiu m-coco-sulfate-scs-95/ (Year: 2014).
Collison, Alan B.; Notice of Allowance for U.S. Appl. No. 18/612,835, filed Mar. 21, 2024, mailed Oct. 28, 2025, 7 pgs.
Waltermire, Jamie; Non-Final Office Action for U.S. Appl. No. 18/115,791, filed Mar. 1, 2023, mailed Nov. 28, 2025, 27 pgs.
Waltermire, Jamie; Advisory Action for U.S. Appl. No. 17/173,293, filed Feb. 11, 2021, mailed Oct. 1, 2025, 3 pgs.
Waltermire, Jamie; Non-Final Office Action for U.S. Appl. No. 17/173,293, filed Feb. 11, 2021, mailed Dec. 5, 2025, 24 pgs.
Waltermire, Jamie; Corrected Notice of Allowance for U.S. Appl. No. 18/197,300, filed May 15, 2023, mailed Nov. 26, 2025, 8 pgs.
Waltermire, Jamie; Notice of Allowance for U.S. Appl. No. 19/188,779, filed Apr. 24, 2025, mailed Nov. 17, 2025, 13 pgs.
Sollie, Greg; Non-Final Office Action for U.S. Appl. No. 19/252,342, filed Jun. 27, 2025, mailed Nov. 28, 2025, 11 pgs.
Sollie, Greg; Requirement for Restriction/Election for U.S. Appl. No. 19/328,837, filed Sep. 15, 2025, mailed Oct. 30, 2025, 6 pgs.
Sollie, Greg; Notice of Allowance for U.S. Appl. No. 18/974,426, filed Dec. 9, 2024, mailed Sep. 26, 2025, 12 pgs.
Chen, Greg; Notice of Allowance for U.S. Appl. No. 19/185,469, filed Apr. 22, 2025, mailed Oct. 2, 2025, 10 pgs.
Waltermire, Jamie; Examination Report for Australian Patent Application No. 2024227354, filed Nov. 8, 2018, mailed Nov. 28, 2025, 4 pgs.
Pratt Retail PTY LTD; Office Action for Chinese Patent Application No. 202311045972.8, filed Nov. 7, 2017, mailed Nov. 29, 2025, 6 pgs.
https://www.acme-hardesty.com/producUsodium-coco-sulfate-scs-95/ (Year: 2014).
Anagnostopoulos, John; Non-Final Office Action for U.S. Appl. No. 19/056,573, filed Feb. 18, 2025, mailed Dec. 23, 2025, 26 pgs.
Sollie, Greg; Non-Final Office Action for U.S. Appl. No. 19/328,837, filed Sep. 15, 2025, mailed Jan. 23, 2026, 15 pgs.
Waltermire, Jamie; Notice of Allowance for U.S. Appl. No. 18/734,865, filed Jun. 5, 2024, mailed Feb. 10, 2026, 22 pgs.
Waltermire, Jamie; Notice of Allowance for U.S. Appl. No. 17/538,795, filed Nov. 30, 2021, mailed Feb. 25, 2026, 27 pgs.
Waltermire, Jamie; Examination Report for Australian Patent Application No. 2024203770, filed Nov. 8, 2018, mailed Feb. 25, 2026, 4 pgs.
Waltermire, Jamie; Final Office Action for U.S. Appl. No. 17/173,293, filed Feb. 11, 2021, mailed Mar. 25, 2026, 23 pgs.
Waltermire, Jamie; Final Office Action for U.S. Appl. No. 18/115,791, filed Mar. 1, 2023, mailed Mar. 26, 2026, 26 pgs.
Sollie, Greg; Non-Final Office Action for U.S. Appl. No. 19/450,853, filed Jan. 16, 2026, mailed Apr. 3, 2026, 9 pgs.
Sollie, Greg; Notice of Allowance for U.S. Appl. No. 19/252,342, filed Jun. 27, 2025, mailed Apr. 7, 2026, 11 pgs.
Sollie, Greg; Restriction Requirement for U.S. Appl. No. 19/446,284, filed Jan. 12, 2026, mailed Apr. 9, 2026, 5 pgs.
Waltermire, Jamie; Non-Final Office Action for U.S. Appl. No. 18/747,098, filed Jun. 18, 2024, mailed Apr. 22, 2026, 215 pgs.
Waltermire, Jamie; Examination Report for Australian Patent Application No. 2024208808, filed Nov. 8, 2018, mailed Apr. 28, 2026, 5 pgs.
Sollie, Greg; Notice of Allowance for U.S. Appl. No. 19/328,837, filed Sep. 15, 2025, mailed May 11, 2026, 17 ogs.
Pratt Retail Pty Ltd; Search Report for Chinese Patent Application No. 202311045972.8, filed Nov. 7, 2017, mailed Mar. 27, 2026, 6 pgs.
Waltermire, Jamie; Examination Report for Australian Patent Application No. 2024205762, filed Nov. 8, 2018, mailed May 14, 2026, 10 pgs.
Waltermire, Jamie; Notice of Allowance for U.S. Appl. No. 18/734,865, filed Jun. 5, 2024, mailed May 22, 2026, 2 pgs.
MP Global Products, L.L.C.; Notice of Acceptance for Australian Patent Application No. 2024201654, filed Nov. 7, 2017, mailed Apr. 24, 2026, 3 pgs.
Pratt Retail Specialties, LLC; Examination Report for Australian Patent Application No. 2024205763, filed Nov. 8, 2018, mailed May 29, 2026, 7 pgs.

* cited by examiner

INSULATED BOX

CROSS-REFERENCE TO RELATED APPLICATIONS

This application is a divisional of U.S. application Ser. No. 17/127,050, filed Dec. 18, 2020, which issued as U.S. Pat. No. 11,858,717, on Jan. 2, 2024, which is a divisional of U.S. application Ser. No. 15/590,349, filed May 9, 2017, which issued as U.S. Pat. No. 10,954,057 on Mar. 23, 2021, each of which is hereby incorporated by reference herein in their entireties.

JOINT RESEARCH AGREEMENT

The subject matter disclosed was developed and the claimed invention was made by, or on behalf of, one or more parties to a joint research agreement between MP Global Products LLC of Norfolk, NE and Pratt Retail Specialties, LLC of Conyers, GA, that was in effect on or before the effective filing date of the claimed invention, and the claimed invention was made as a result of activities undertaken within the scope of the joint research agreement.

TECHNICAL FIELD

This disclosure relates to packaging. More specifically, this disclosure relates to an insulated box.

BACKGROUND

Packaging perishable or temperature sensitive contents for storage or shipping can pose challenges. The contents can spoil, destabilize, freeze, melt, or evaporate during storage or shipping if the temperature of the contents is not maintained or the packaging is not protected from hot or cold environmental conditions. Contents such as food, pharmaceuticals, electronics, or other temperature sensitive items can be damaged if exposed to temperature extremes. Many insulated packages are bulky and difficult to store prior to use. Additionally, many insulated packages cannot be recycled and are often disposed of in landfills.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

Disclosed is an insulated box comprising a box, the box comprising a bottom panel and a side panel, the side panel attached to the bottom panel; and an insulated panel attached to the side panel, the insulated panel comprising an insulation batt and a sheet, the insulation batt enclosed between the side panel and the sheet.

Also disclosed is an insulated box assembly comprising an insulated box, the insulated box comprising a box, the box comprising a bottom panel and a side panel, the side panel attached to the bottom panel, the box defining a box cavity; and an insulated panel attached to the side panel, the insulated panel comprising an insulation batt and a sheet, the insulation batt enclosed between the side panel and the sheet; and an insulated cavity panel, the insulated cavity panel disposed within the box cavity, the insulated cavity panel comprising a cavity sheet and a cavity insulation batt, the cavity sheet encapsulating the cavity insulation batt.

Also disclosed is a method for insulating a box, the method comprising positioning an insulated panel adjacent to a side panel of the box, the insulated panel comprising an insulation batt and a sheet, the insulated panel defining a border extending around a perimeter of the insulation batt; and attaching a seam of the border to a portion of a perimeter area of the side panel.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The features and components of the following figures are illustrated to emphasize the general principles of the present disclosure. The drawings are not necessarily drawn to scale. Corresponding features and components throughout the figures may be designated by matching reference characters for the sake of consistency and clarity.

DETAILED DESCRIPTION

Figure 1:
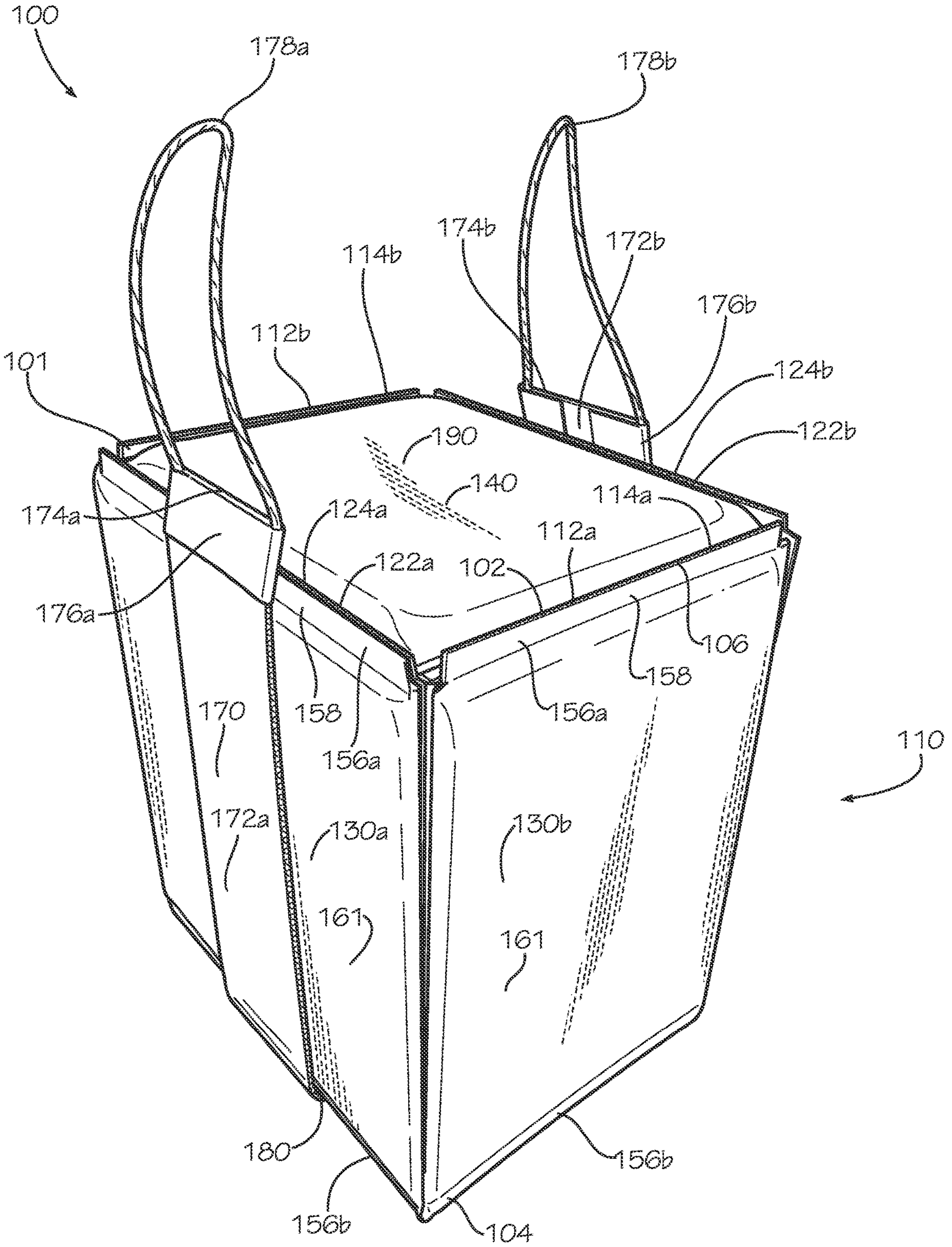
FIG. 1 is a perspective view of an insulated box assembly comprising an insulated box, a box top, and a carrying accessory in accordance with one aspect of the current disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is an insulated box assembly and associated methods, systems, devices, and various apparatus. The insulated box assembly comprises an insulated box, a box top, and a carrying accessory. It would be understood by one of skill in the art that the disclosed insulated box assembly is described in but a few exemplary embodiments among many. No particular terminology or description should be considered limiting on the disclosure or the scope of any claims issuing therefrom.

FIG. 1 is a perspective view of an insulated box assembly 100 in a closed position in accordance with one aspect of the present disclosure. The insulated box assembly 100 can comprise an insulated box 110, a carrying accessory 170, and a box top 190. The insulated box 110 can comprise a box 101 and a plurality of insulated panels 130*a-d* (insulated panels 130*c,d* shown in FIG. 3). The box 101 can comprise a rigid board material such as corrugated cardboard; however in other aspects, the box 101 can comprise other suitable rigid board materials, such as wood, plastic, metal, or any other material.

The box 101 can comprise a first pair of opposing side panels 112*a,b* and a second pair of opposing side panels 122*a,b*. The side panels 112*a,b*,122*a,b* can each be a rigid panel. The side panel 112*a* can be substantially parallel to the side panel 112*b*, and the side panel 122*a* can be substantially parallel to the side panel 122*b*. Each side panel 112*a,b* can be substantially perpendicular to both side panels 122*a,b*. The box 101 can define a rectangular or square cross-sectional shape; however, in other aspects, the box 101 can define a different cross-sectional shape such as a circular, triangular, pentagonal, or hexagonal, shape or any other desired shape.

The box 101 can define a top end 102 and a bottom end 104, and the top end 102 can be disposed opposite from the bottom end 104. The side panels 112*a,b* can define lips 114*a*,*b*, respectively, disposed proximate to the top end 102 of the insulated box 110. The side panels 122*a*,*b* can define lips 124*a*,*b*, respectively, disposed proximate to the top end 102 of the insulated box 110. The box 101 can define a box opening 106 at the top end 102. The box top 190 can be sized and shaped to fit between the lips 114*a*,*b* and the lips 124*a*,*b* to cover the box opening 106 when the insulated box 110 is in the closed position. The box top 190 can comprise an insulated panel 140 which can be substantially identical in construction to the insulated panels 130*a*-*d*; however in other aspects, the insulated panel 140 can differ in construction from the insulated panels 130*a*-*d*.

The insulated panels 130*a*-*d* can be attached to the side panels 112*a*,*b*,122*a*,*b*. The insulated panels 130*a*,*c* (130*c* shown in FIG. 3) can be respectively attached to the side panels 112*a*,*b*, and the insulated panels 130*b*,*d* (130*d* shown in FIG. 3) can be respectively attached to the side panels 122*a*,*b*. Each insulated panel 130*a*-*d* can define a border 158 extending around the respective insulated panel 130*a*-*d*. An area encircled by the border 158 can define an insulated portion 161 of the respective insulated panel 130.

The border 158 of each insulated panel 130*a*-*d* can define a top seam 156*a* and a bottom seam 156*b* extending outwards from the insulated portion 161 of the respective insulated panel 130*a*-*d*. The top seam 156*a* can be attached to the adjacent side panel 112*a*,*b*,122*a*,*b* of the box 101 proximate the top end 102 of the box 101. In the present aspect, the top seam 156*a* of each insulated panel 130*a*-*d* can attach to the lip 114*a*,*b*,124*a*,*b* of the adjacent side panel 112*a*,*b*,122*a*,*b*. The bottom seam 156*b* of each insulated panel 130*a*-*d* can be attached to the adjacent side panel 112*a*,*b*,122*a*,*b* along the bottom end 104 of the box 101. The seams 156*a*,*b* can be attached by an adhesive such as a glue, cement, epoxy, mastic, double-sided tape, cohesive, or any other suitable material, and the seams 156*a*,*b* can secure the insulated panels 130*a*-*d* to the respective adjacent side panels 112*a*,*b*,122*a*,*b*.

The carrying accessory 170 can extend beneath the insulated box 110 to facilitate hand carrying of the insulated box 110. The carrying accessory 170 can define a U-shape. A middle portion 180 can extend beneath the insulated box 110. A first side portion 172*a* can extend upwards from the middle portion 180 and can be adjacent to the insulated panel 130*a*. A second side portion 172*b* can extend upwards from the middle portion 180 and can be adjacent to the insulated panel 130*c* (shown in FIG. 3).

In the present aspect, the carrying accessory 170 can be attached to the insulated box 110 such as with an adhesive, such as a glue, cement, epoxy, mastic, double-sided tape, cohesive, or any other suitable material. In other aspects, the carrying accessory 170 can be mechanically attached, such as with a hook-and-loop fastener, stitching, or staples, and the mechanical attachment of the carrying accessory 170 can be configured to be selectively attached and detached from the insulated box 110 such as with hook-and-loop fasteners. In other aspects, the carrying accessory 170 may not be attached to the insulated box 110. In some aspects, the side portions 172*a*,*b* can extend upwards adjacent to the insulated panels 130*b*,*d*. In some aspects, the carrying accessory 170 can have four side portions (not shown), and one side portion can be positioned adjacent to each of the four insulated panels 130*a*-*d*.

The side portions 172*a*,*b* can respectively define handles 178*a*,*b*. In the present aspect, handle 178*a* can be attached to an end 174*a* of the first side portion 172*a* by a base strip 176*a*. Handle 178*b* can be attached to an end 174*b* of the second side portion 172*b* by a base strip 176*b*. The handles 178*a*,*b* can comprise twisted paper rope, and the handles 178*a*,*b* can be laminated between two layers of the respective base strip 176*a*,*b*. In other aspects, the handles 178*a*,*b* can be integrally formed with the base strips 176*a*,*b*, and the handles 178*a*,*b* and the base strips 176*a*,*b* can comprise a common material. For example, the base strips 176*a*,*b* and the handles 178*a*,*b* can comprise a heavy kraft paper, plastic, posterboard, cardboard, or other suitable material. In other aspects, the handles 178*a*,*b* can comprise a fiber such as cotton, hemp, jute, or bamboo fiber.

The base strips 176*a*,*b* can be attached to the respective ends 174*a*,*b* with an adhesive such as a glue, cement, epoxy, mastic, double-sided tape, cohesive, or any other suitable material. The ends 174*a*,*b* and the handles 178*a*,*b* can extend upwards above the box opening 106. In other aspects, the handles 178*a*,*b* and the ends 174*a*,*b* may not extend above the box opening 106, and the handles 178*a*,*b* can be positioned adjacent to the insulated panels 130*b*,*d*. In other aspects, the handles 178*a*,*b* can have a different shape and can be attached directly to the respective side portions 172*a*,*b*. In some aspects, the handles 178*a*,*b* can be formed integrally with the respective side portions 172*a*,*b*, for example, by cutting a hand hole through the respective side portion 172*a*,*b*.

Figure 2:
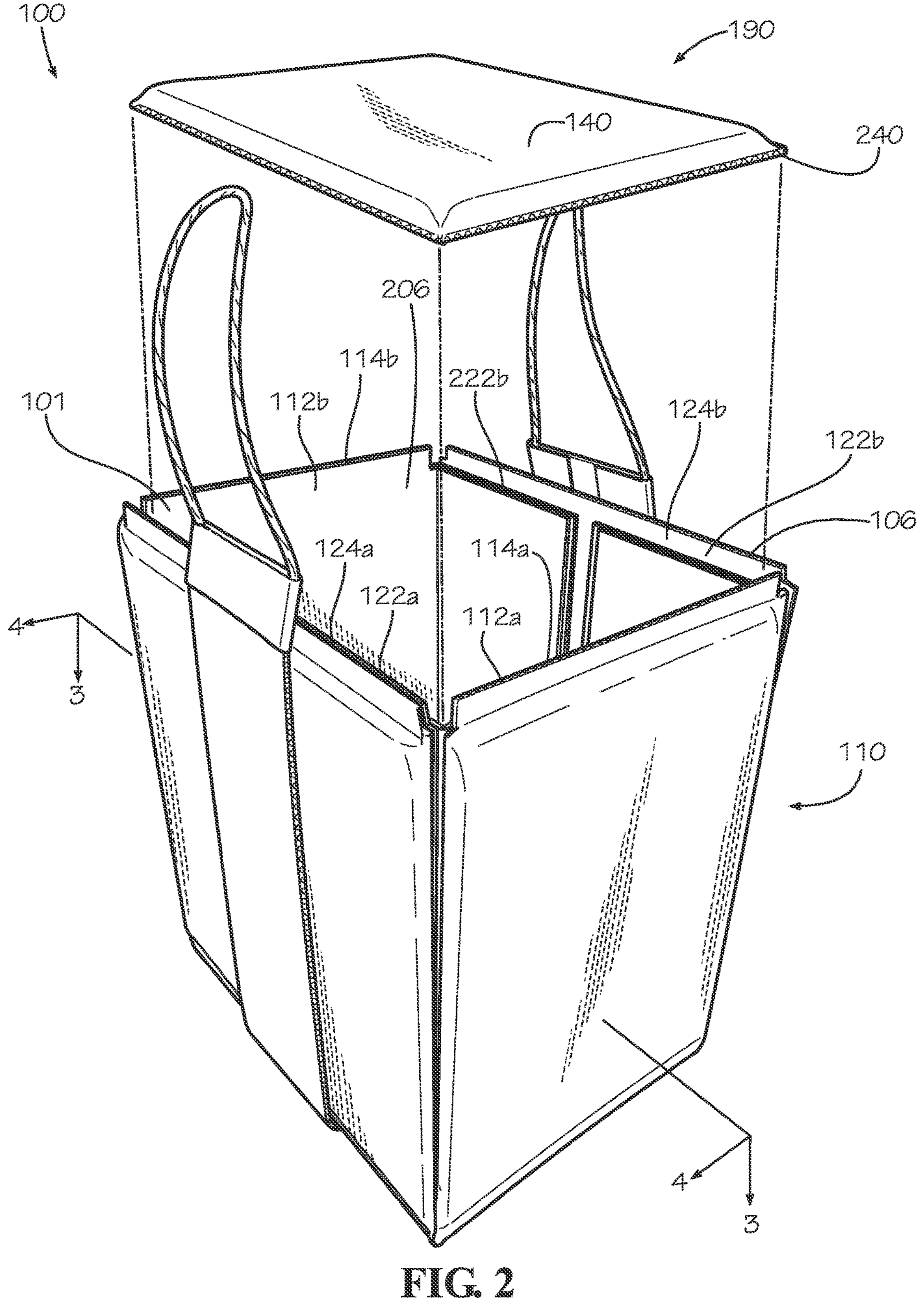
FIG. 2 is a perspective view of the insulated box assembly of FIG. 1 with the insulated box in an open position.

FIG. 2 is a perspective view of the insulated box assembly 100 of FIG. 1 with the box top 190 in an open position. In the open position, the box top 190 can be removed from the box opening 106, thereby exposing a box cavity 206 defined within the box 101. The first pair of opposing side panels 112*a*,*b* and the second pair of opposing side panels 122*a*,*b* of the box 101 can define the box cavity 206. A pair of shoulders 222*a*,*b* can extend inwards into the box cavity 206 from each of the side panels 122*a*,*b*, as represented by the shoulder 222*b* (shoulder 222*a* shown in FIG. 3). The shoulders 222*a*,*b* are configured to support the box top 190 when the box top 190 is positioned between the lips 114*a*,*b*,124*a*,*b* in the closed position. In the closed position, the box top 190 can cover the box opening 106 and enclose the box cavity 206.

In the present, aspect, the box top 190 can comprise the insulated panel 140 and a top panel 240. The top panel 240 can be a rigid panel. The insulated panel 140 can be attached to the top panel 240 and positioned atop the top panel 240 as shown. In other aspects, the box top 190 can be flipped, and the insulated panel 140 can be positioned beneath the top panel 240. In other aspects, the box top 190 can comprise a second insulated panel (not shown), and the box top 190 can be insulated on both sides for added insulation value. In other aspects, the box top 190 may not comprise the insulated panel 140, and the top panel 240 can be uninsulated. The top panel 240 can comprise corrugated cardboard in the present aspect; however, in other aspects the top panel 240 can be comprise a suitable rigid board material such as wood, plastic, metal, or any other material.

Figure 3:
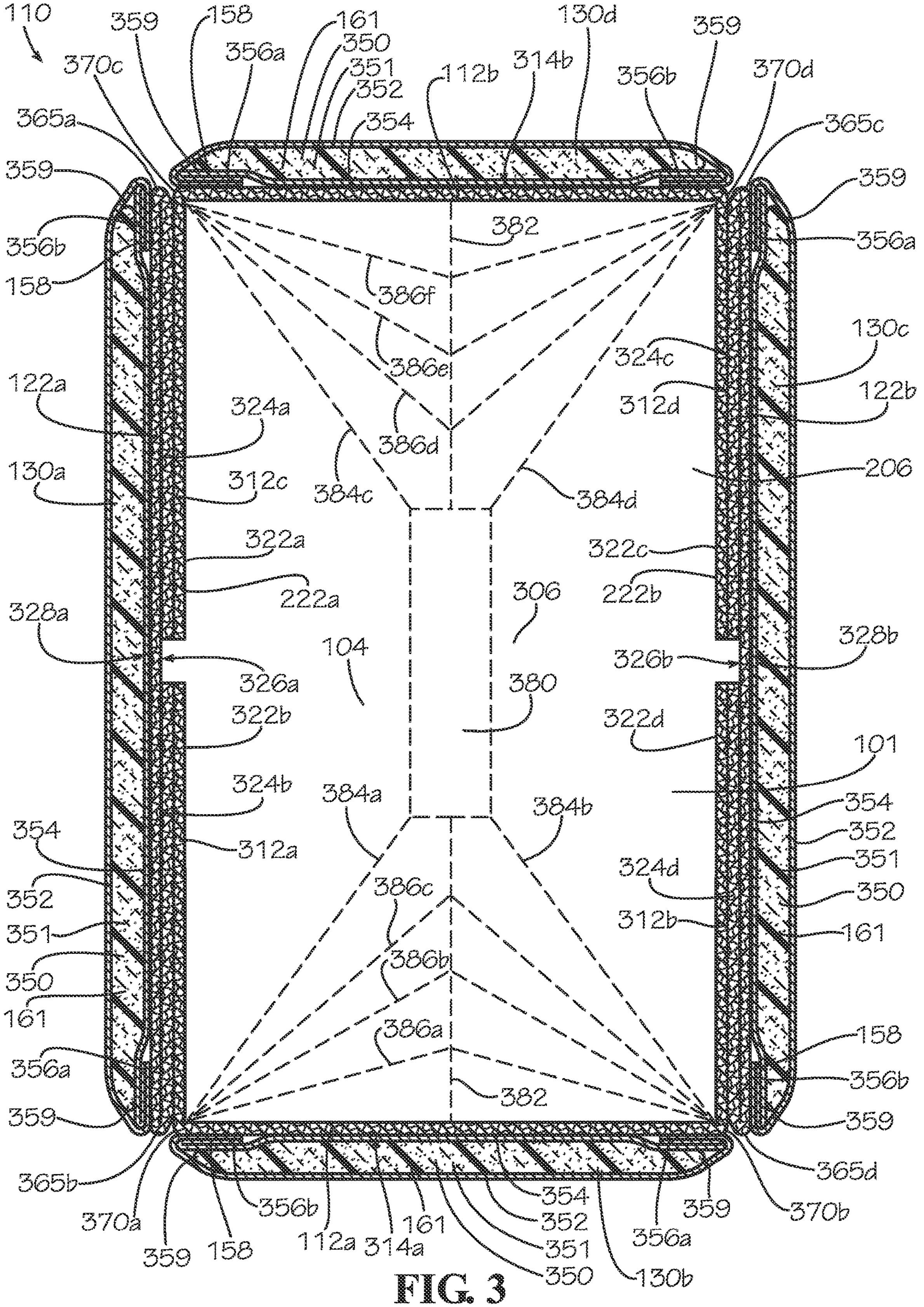
FIG. 3 is a cross-section of the insulated box of FIG. 1 taken along line 3-3 shown in FIG. 2.

FIG. 3 is a cross-section of the insulated box 110 of FIG. 1 taken along line 3-3 shown in FIG. 2, with the carrying accessory 170 and the box top 190 removed. As shown, each shoulder 222*a*,*b* can comprise two sub-shoulders 322. The shoulder 222*a* can comprise the sub-shoulders 322*a*,*b*, and the shoulder 222*b* can comprise the sub-shoulders 322*c*,*d*. The sub-shoulders 322*a*-*d* can be defined by a plurality of first wings 312*a*-*d* and a plurality of second wings 324*a*-*d*. The first wings 312*a*,*b* can be attached at opposite sides of the side panel 112*a*, and the first wings 312*c*,*d* can be attached at opposite sides of the side panel 112*b*. The second wings 324*a*,*b* can be attached at opposite sides of the side panel 122a, and the second wings 324c,d can be attached at opposite sides of the side panel 122b.

The second wing 324a can be folded inwards at a hinge 365a and positioned adjacent to an inner side surface 326a defined by the side panel 122a, and the first wing 312c can be folded at a hinge 370c and positioned adjacent to the second wing 324a. The second wing 324a and the first wing 312c can be secured in position, such as with an adhesive, to form the sub-shoulder 322a. The second wing 324b can be folded inwards at a hinge 365b and positioned adjacent to the inner side surface 326a, and the first wing 312a can be folded at a hinge 370a and positioned adjacent to the second wing 324b. The second wing 324b and the first wing 312a can be secured in position, such as with an adhesive, to form the sub-shoulder 322b.

For the sub-shoulder 322c of shoulder 222b, the second wing 324c can be folded inward at a hinge 365c and positioned adjacent to an inner side surface 326b defined by the side panel 122b. The first wing 312d can then be folded at a hinge 370d and positioned adjacent to the second wing 324c. The first wing 312d and the second wing 324c can be secured in position, such as with an adhesive, to form the sub-shoulder 322c. For the sub-shoulder 322d of shoulder 222b, the second wing 324d can be folded inward at a hinge 365d and positioned adjacent to the inner side surface 326b. The first wing 312b can then be folded at a hinge 370b and positioned adjacent to the second wing 324d. The first wing 312b and the second wing 324d can be secured in position, such as with an adhesive, to form the sub-shoulder 322d.

The formation of the sub-shoulders 322a-d can also secure each side panel 112a,b to each side panel 122a,b, thereby defining the square or rectangular horizontal cross-section of the box 101. The box 101 can further comprise a bottom panel 306. The bottom panel 306 can be a rigid panel. The bottom panel 306 can be disposed at the bottom end 104 of the box 101, and the bottom panel 306 can be attached to each of the side panels 112a,b,122a,b. The bottom panel 306 can further define the box cavity 206. The box 101 is but one example of a box, and the methods discussed below for insulating the box 101 to form the insulated box 110 can be applied to a box of another shape, size, or form.

In the present aspect, the bottom panel 306 can define a center subpanel 380 disposed at a center of the bottom panel 306. The center subpanel 380 can be substantially rectangular in shape. A center fold line 382 can extend between the center subpanel 380 and each side panel 112a,b, and the center fold line 382 can substantially bisect the bottom panel 306, with the exception of within the center subpanel 380. The center fold line 382 can also bisect each side panel 112a,b, as shown and further described with respect to FIG. 7. Four corner fold lines 384a-d can extend between the corners of the center subpanel 380 and the hinges 370a-d. The corner fold line 384a can extend from the hinge 370a to the center subpanel 380. The corner fold line 384b can extend from the hinge 370b to the center subpanel 380. The corner fold line 384c can extend from the hinge 370c to the center subpanel 380. The corner fold line 384d can extend from the hinge 370d to the center subpanel 380.

A plurality of V-shaped fold lines 386a-f can extend between the hinges 370a-d and the center fold line 382. The V-shaped fold lines 386a-c can each extend from the hinge 370a to center fold line 382 and then to the hinge 370b. The V-shaped fold lines 386a-c can be defined between the corner fold lines 384a and 384b. The V-shaped fold lines 386d-f can each extend from the hinge 370c to center fold line 382 and then to the hinge 370d. The V-shaped fold lines 386d-f can be defined between the corner fold lines 384c and 384d. The center subpanel 380, the center fold line 382, the corner fold lines 384a-d, and the V-shaped fold lines 386a-f can cooperate to collapse the insulated box 110 and to provide the bottom panel 306 with a truncated pyramidal shape when collapsed, as further discussed below with respect to FIG. 8.

The box 101 of the insulated box 110 can be clad with the insulated panels 130a-d. The insulated panel 130a can be attached to an outer side surface 328a defined by the side panel 122a. The insulated panel 130b can be attached to an outer side surface 314a defined by the side panel 112a. The insulated panel 130c can be attached to an outer side surface 328b defined by the side panel 122b. The insulated panel 130d can be attached to an outer side surface 314b defined by the side panel 112b. In the present aspect, the box 101 can be externally clad with the insulated panels 130a-d, however in other aspects, the box 101 can be internally clad, both internally and externally clad, or a mixed arrangement of partially internally clad and partially externally clad with insulated panels 130.

In the present aspect, each insulated panel 130a-d can comprise an insulation batt 350, a first sheet 352, and a second sheet 354. The insulation batt 350 can be encapsulated in a panel cavity 351 defined between the first sheet 352 and the second sheet 354. The insulation batt 350 can be encapsulated by the border 158 which can extend around a perimeter 359 of the insulation batt 350, thereby sealing the panel cavity 351. The panel cavity 351 containing the insulation batt 350 can define the insulated portion 161 of the respective insulated panel 130a-d. The border 158 can be a seam formed by attaching a perimeter portion of the first sheet 352 which overhangs the perimeter 359 of the insulation batt 350 with a perimeter portion of the second sheet 354 which also overhangs the perimeter 359 of the insulation batt 350. The first sheet 352 can be attached to the second sheet 354 with an adhesive such as a glue, cement, epoxy, mastic, cohesive, double-side tape or other suitable adhesive to form the border 158. In some aspects, the border 158 can be formed by mechanically fastening the first sheet 352 to the second sheet 354, such as by stapling, stitching, or any other suitable method of fastening.

The border 158 can further define a first side seam 356a and a second side seam 356b. In the present aspect, the first side seam 356a and the second side seam 356b can be vertically oriented seams. The first side seam 356a and the second side seam 356b of the border 158 can be folded inwards and disposed between the insulation batt 350 of the insulated portion 161 and the outer side surface 328a,b of the respective side panels 122a,b or the outer side surfaces 314a,b of the respective side panels 112a,b. The first side seam 356a and the second side seam 356b can be attached to the adjacent side panel 112a,b,122a,b, thereby further securing the insulated panel 130a-d to the adjacent side panel 112a,b,122a,b and enclosing the insulation batt 350 between the first sheet 352 and the adjacent side panel 112a,b,122a,b. By folding the first side seam 356a and the second side seam 356b inwards, the insulation batt 350 and the insulated portion 161 can extend completely across or nearly completely across the width of the adjacent side panel 112a,b,122a,b without leaving the first side seam 356a and the second side seam 356b sticking outwards beyond the side panel 112a,b,122a,b. This configuration can provide full insulation or nearly full insulation over the width of the adjacent side panel 112a,b,122a,b.

With the first side seam 356a and the second side seam 356b folded inwards, the first sheet 352 can be attached to the respective adjacent side panel 112*a,b*,122*a,b* with an adhesive such as a glue, cement, epoxy, mastic, double-sided tape, cohesive, or other suitable material. A portion of the second sheet 354 extending between the first side seam 356*a* and the second side seam 356*b* can also be in facing contact with the adjacent side panel 112*a,b*,122*a,b* and can optionally be attached with the adhesive. In other aspects, the insulated panels 130*a-d* may not comprise the second sheet 354, and either the insulation batt 350 can be in facing contact with the respective adjacent side panel 112*a,b*,122*a, b*, or the first sheet 352 can fully encapsulate the insulation batt 350.

Figure 4:
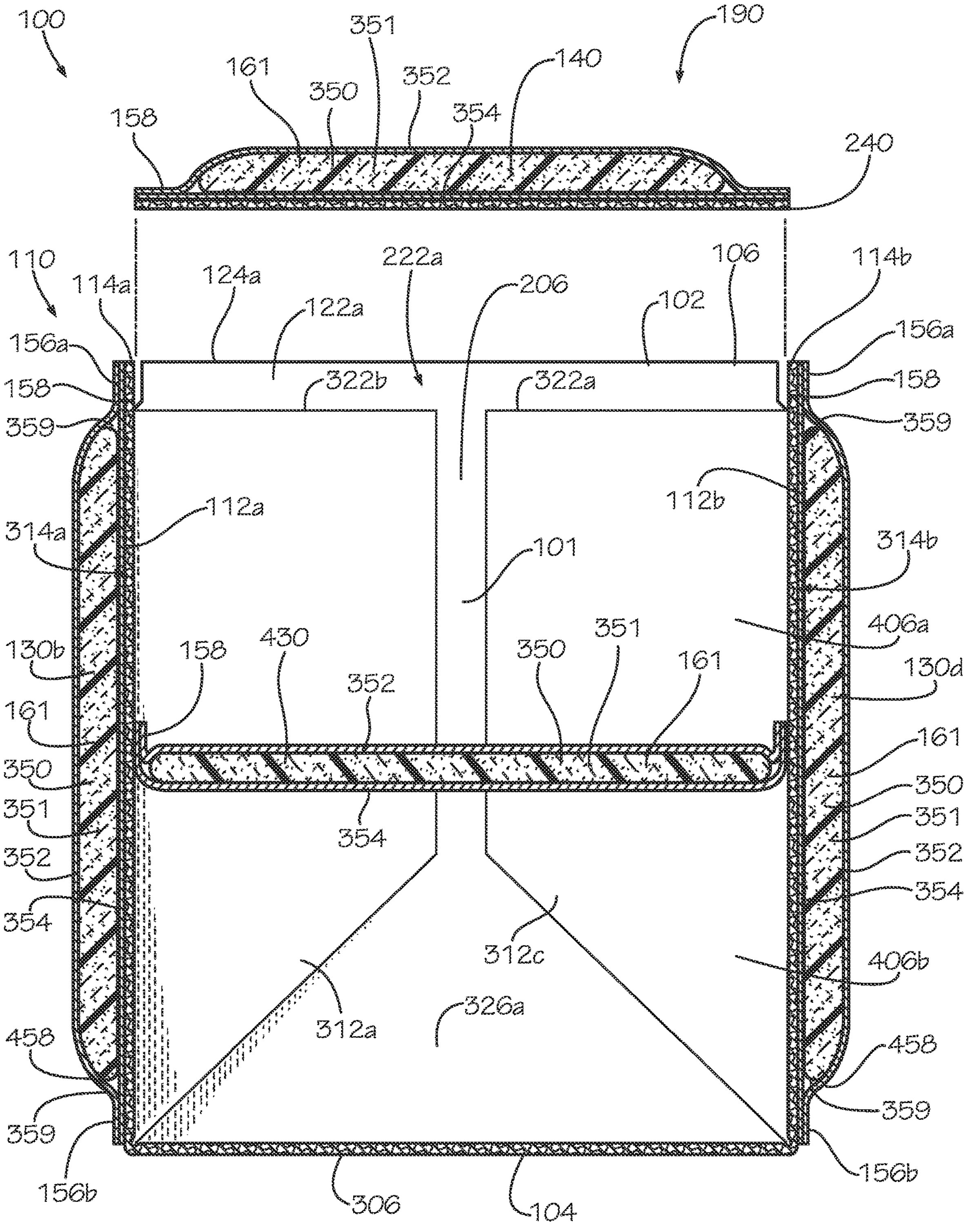
FIG. 4 is a cross-section of the insulated box assembly of FIG. 1 taken along line 4-4 shown in FIG. 2.

FIG. 4 is a cross-section of the insulated box assembly 100 of FIG. 1 taken along line 4-4 shown in FIG. 2. In the present view, the carrying accessory 170 has been removed. The insulated box assembly 100 can further comprise an insulated cavity panel 430 which can be disposed within the box cavity 206. The insulated cavity panel 430 can be constructed similar to the insulated panels 130*a-d*,190; however, in the present aspect, the insulated cavity panel 430 can be a loose panel. The insulated portion 161 of the insulated cavity panel 430 can be shaped and sized complimentary to the horizontal cross-section of the box 101 in order to provide a close fit within the box cavity 206.

As shown, the insulated cavity panel 430 can divide the box cavity 206 into a first sub-compartment 406*a* and a second sub-compartment 406*b*. In the present aspect, the insulated cavity panel 430 can be horizontally oriented, and the first sub-compartment 406*a* can be an upper sub-compartment while the second sub-compartment 406*b* can be a lower sub-compartment. In other aspects, the insulated cavity panel 430 can be vertically oriented to divide the box cavity 206 into side-by-side compartments. In some aspects, the insulated box 110 can comprise multiple cavity panels 430 disposed within the box cavity 206 to divide the box cavity 206 into more than two compartments or no cavity panels 430 so that the box cavity 206 is a single compartment. Dividing the box cavity 206 into sub-compartments can be desirable in order to package both hot and cold contents in the same insulated box 110 or other contents that should be stored at different temperatures.

In the present aspect, the bottom panel 306 can be uninsulated. Optionally, the insulated cavity panel 430 can be placed atop the bottom panel 306 to provide insulation for the bottom end 104 of the insulated box 110. In other aspects, the insulated box 110 can further comprise another insulated panel 130 (not shown) attached internally or externally to the bottom panel 306. In aspects in which the box top 190 can be uninsulated, the insulated cavity panel 430 can be positioned adjacent to the box top 190 to provide insulation for the top end 102 of the insulated box 110. In some aspects, the bottom panel 306 can be insulated and the insulated cavity panel 430 can be placed atop the bottom panel 306 in order to provide additional insulation for example. In some aspects, the insulated box assembly 100 can comprise multiple insulated cavity panels 430 positioned within the box cavity 206.

The bottom seam 156*b* and the top seam 156*a* of the border 158 of each insulated panel 130*a-d* can extend outwards from the perimeter 359 of the insulation batt 350 and the insulated portion 161. As previously discussed, the bottom seams 156*b* and the top seams 156*a* can be attached to the respective adjacent side panel 112*a,b*,122*a,b* with the adhesive in order to secure the insulated panels 130*a-d*, to the box 101 proximate the top end 102 and the bottom end 104. In such aspects, the second sheet 354 can be attached to the adjacent side panel 112*a,b*,122*a,b*, and the first sheet 352 may not contact the adjacent side panel 112*a,b*,122*a,b* at the bottom seam 156*b* and the top seam 156*a*; however, the insulation batt 350 remains enclosed between the first sheet 352 and the adjacent side panel 112*a,b*,122*a,b*. Optionally, portions of the second sheet 354 disposed between the top seams 156*a* and the bottom seam 156*b* can also be attached to the respective adjacent side panel 112*a,b*,122*a,b* with the adhesive.

The outward extending top seams 156*a* can leave the lips 114*a,b*,124*a,b* uninsulated; however, because the box top 190 rests below the box opening 106 on the shoulders 222*a,b* (should 222*b* shown in FIG. 3), the top end 102 of the insulated box 110 can remain fully insulated. Similarly, the bottom seams 156*b* can leave a portion of the side panels 112*a,b*,122*a,b* proximate the bottom panel 306 uninsulated. However, in aspects in which the insulated cavity panel 430 can be positioned atop the bottom panel 306, the insulated cavity panel 430 can fully insulate the bottom end 104 of the insulated box 110. In other aspects, either or both of the bottom seams 156*b* and top seams 156*a* can be folded inward towards the insulation batt 350 and the insulated portion 161, and the insulation batt 350 can fully cover the height of the side panels 112*a,b*,122*a,b*.

The outwardly extended bottom seams 156*b* can define a bottom taper 458 extending around the insulated box 110 proximate the bottom end 104. The bottom taper 458 can cooperate with the lips 114*a,b*,124*a,b* to securely stack multiple insulated boxes 110 on top of one another. The lips 114*a,b*,124*a,b* of a lower insulated box of the stack of insulated boxes can deflect outwards allowing the bottom taper 458 of an upper insulated box to nest between the lips 114*a,b*,124*a,b* and atop the box top 190 of the lower insulated box. By nesting between the lips 114*a,b*,124*a,b*, the lips 114*a,b*,124*a,b* can prevent the upper insulated box from sliding sideways off the top end 102 of the lower insulated box. The insulated boxes 110 can also be conveyable, such as on a conveyor belt, and the insulated boxes 110 can be rigid and strong enough to resist collapse on the conveyor belt.

Figure 5:
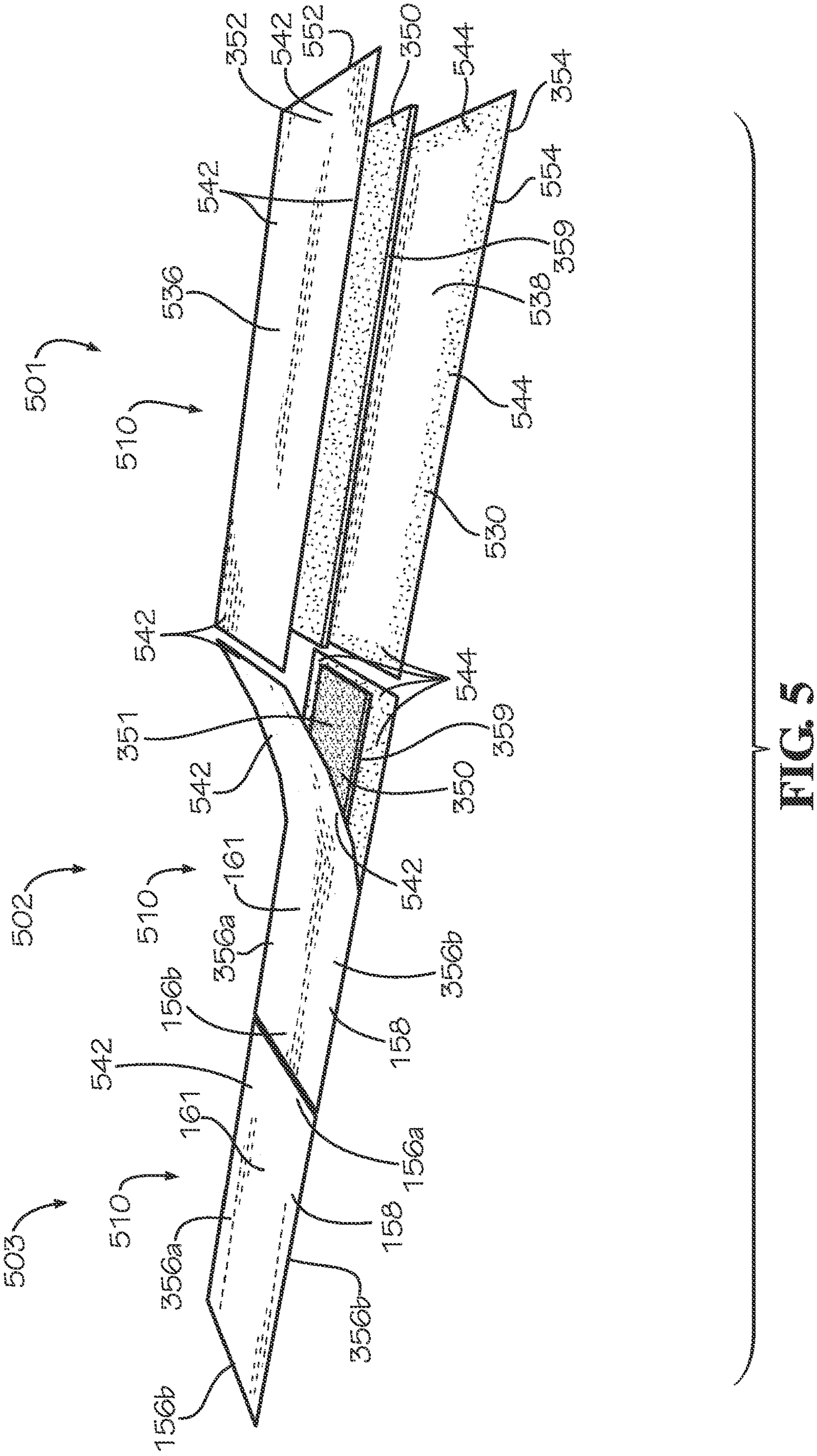
FIG. 5 is a perspective view of a method for manufacturing an insulated panel in accordance with another aspect of the current disclosure.

FIG. 5 is a perspective view of a method of manufacturing for an insulated panel 510. The method can apply to the manufacture of the insulated panels 130*a-d*,140,430. In a step 501, the insulation batt 350 can be positioned between the first sheet 352 and the second sheet 354. The first sheet 352 and the second sheet 354 can be sized and shaped complimentary to each other; however in some aspects, the sheets 352,354 can differ in size and shape. The insulation batt 350 and the sheets 352,354 can each be flat and substantially planar before assembly. In the present aspect, the insulation batt 350 can be approximately ⅜" thick; however this thickness is not limiting. The thickness can range from 1/16" to over 2" with a preferred range of ¼" to ½".

The first sheet 352 can define a first outer edge 552, and a portion of the first sheet 352 proximate the first outer edge 552 can define a first perimeter portion 542. The second sheet 354 can define a second outer edge 554, and a portion of the second sheet 354 proximate the second outer edge 554 can define a second perimeter portion 544. The sheets 352,354 can be sized to overhang the insulation batt 350 on all sides with the first perimeter portion 542 and the second perimeter portion 544 extending beyond the perimeter 359 of the insulation batt 350. The first perimeter portion 542 can encompass a first interior portion 536 of the first sheet 352, and the second perimeter portion 544 can encompass a second interior portion 538 of the second sheet 354. The interior portions 536,538 can be sized and shaped complimentary to the insulation batt 350.

Surfaces of the sheets 352,354 facing one another can be treated with an adhesive 530 such as a cohesive. In various aspects, the adhesive can be a glue, epoxy, cement, double-sided tape, or other suitable adhesive. The surfaces can be entirely treated with the adhesive 530 or selectively treated with the adhesive 530. In the aspect shown, the perimeter portions 542,544 can be selectively treated with the adhesive 530. In some aspects, the insulation batt 350 can also be adhered to the interior portions 536,538 of the sheets 352, 354.

In a step 502, the sheets 352,354 can be aligned and positioned in facing engagement wherein the first perimeter portion 542 can be attached to the second perimeter portion 544 by the adhesive 530. The insulation batt 350 can be aligned between the interior portions 536,538. Attaching the perimeter portions 542,544 can form the border 158 of the insulated panel 510 around the perimeter 359 of the insulation batt 350. As depicted in step 502, the bottom seam 156*b* has been formed, the first side seam 356*a* and the second side seam 356*b* are partially formed, and the top seam 156*a* is yet to be formed.

The border 158 can seal the insulation batt 350 within the panel cavity 351 defined between the interior portions 536,538 of the sheets 352,354, respectively. Portions of the insulated panel 510 containing the insulation batt 350 can define the insulated portion 161 of the insulated panel 510. In some aspects, the insulation batt 350 can be aligned off-center from the sheets 352,354 wherein the border 158 can extend outwards further in some areas than others. In some aspects, the first side seam 356*a*, the second side seam 356*b*, the bottom seam 156*b*, and the top seam 156*a* can define different widths from one another. For example and without limitation, the first side seam 356*a* can extend outwards from the insulation batt 350 further than the bottom seam 156*b* or vice versa.

In a step 503, the first perimeter portion 542 has been fully attached to the second perimeter portion 544, thereby forming the completed border 158. Each of the first side seam 356*a*, the second side seam 356*b*, the bottom seam 156*b*, and the top seam 156*a* are fully formed. Manufacturing of the insulated panel 510 is thus completed; however in some aspects, the method can comprise additional steps such as cutting slots into the border 158. The border 158 can fully encapsulate the insulation batt 350 within the panel cavity 351; however in some aspects, the insulation batt 350 may not be fully encapsulated. In some aspects, the insulation batt 350 can define a complex shape which can comprise curves, notches, cutouts, or other features which can be reflected by complimentary shapes of the border 158 and the insulated portion 161.

In other aspects, the border 158 may not fully encompass and encapsulate the insulation batt 350. In some aspects, some portions of the perimeter 359 may be exposed at an unfinished side or a cutout of the border 158. In some aspects, the insulated panel 510 may not define the border 158 on any portion of the perimeter of the insulated panel 510, and the entire perimeter can define an unfinished edge. In such aspects, the insulated panel 510 can comprise pre-laminated paper and each of the sheets 352,354 can be attached in facing contact with the insulation batt 350 with, for example and without limitation, an adhesive. In some aspects in which the insulated panel 510 defines the border 158, the insulation batt 350 can also be attached in facing contact with one or both of the sheets 352,354. In some aspects, the pre-laminated paper can be provided in a roll, and the insulated panels 510 can be cut to size from the roll. In other aspects, the first sheet 352 and the second sheet 354 can be halves of a single sheet (not shown) which can be folded substantially in half. In such aspects, the insulation batt 350 can be encapsulated between the two halves of the single sheet. In other aspects, the second sheet 354 can be a board (not shown), such as a piece of cardboard, and the insulation batt 350 can be encapsulated between the first sheet 352 and the board.

Figure 6A:
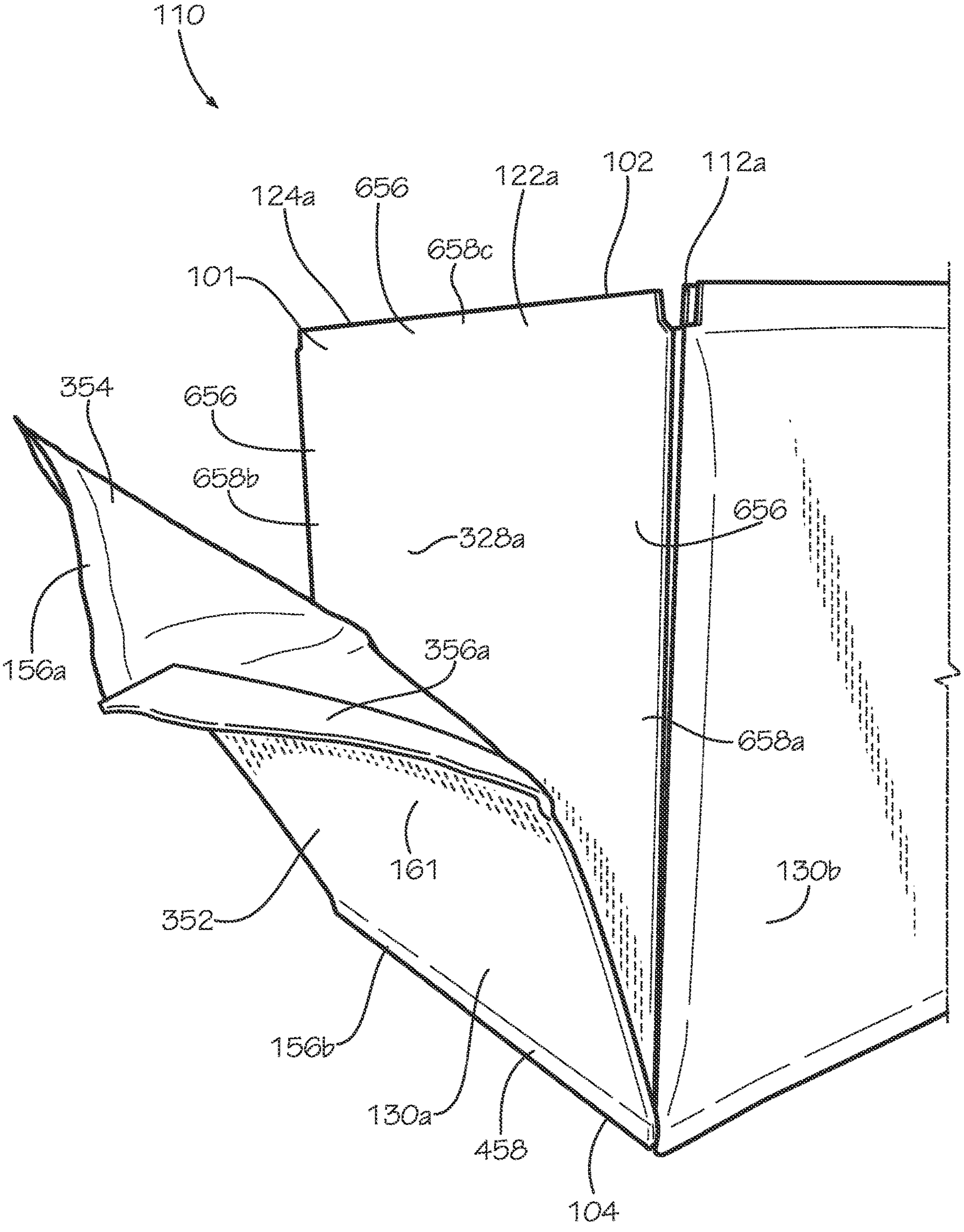
FIG. 6A is a perspective view of another aspect of an insulated panel in accordance with another aspect of the current disclosure prepared for installation on a box of the insulated box of FIG. 1.
Figure 6B:
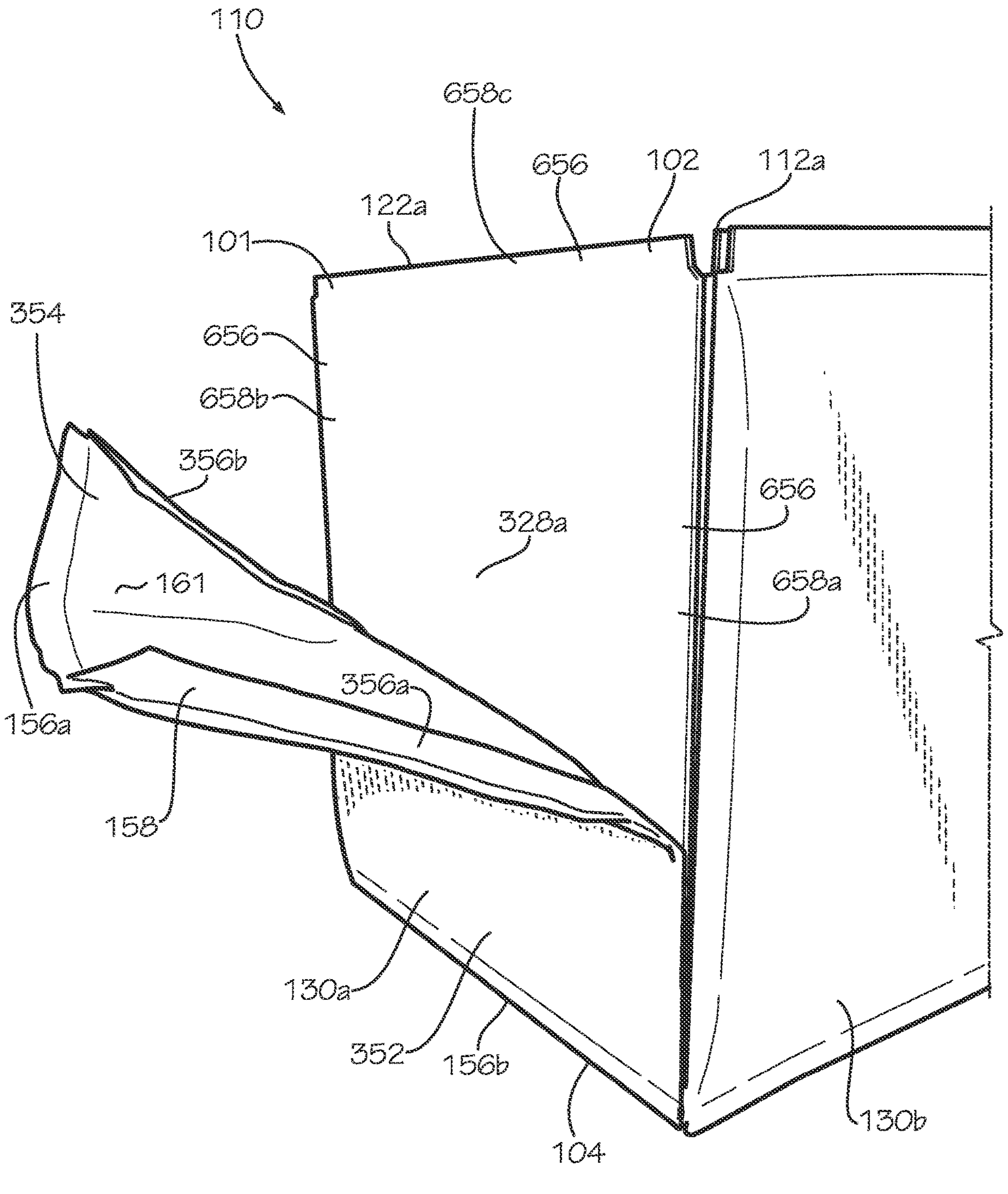
FIG. 6B is a perspective view of the insulated panel of FIG. 6A partially installed on the box of FIG. 6A.
Figure 6C:
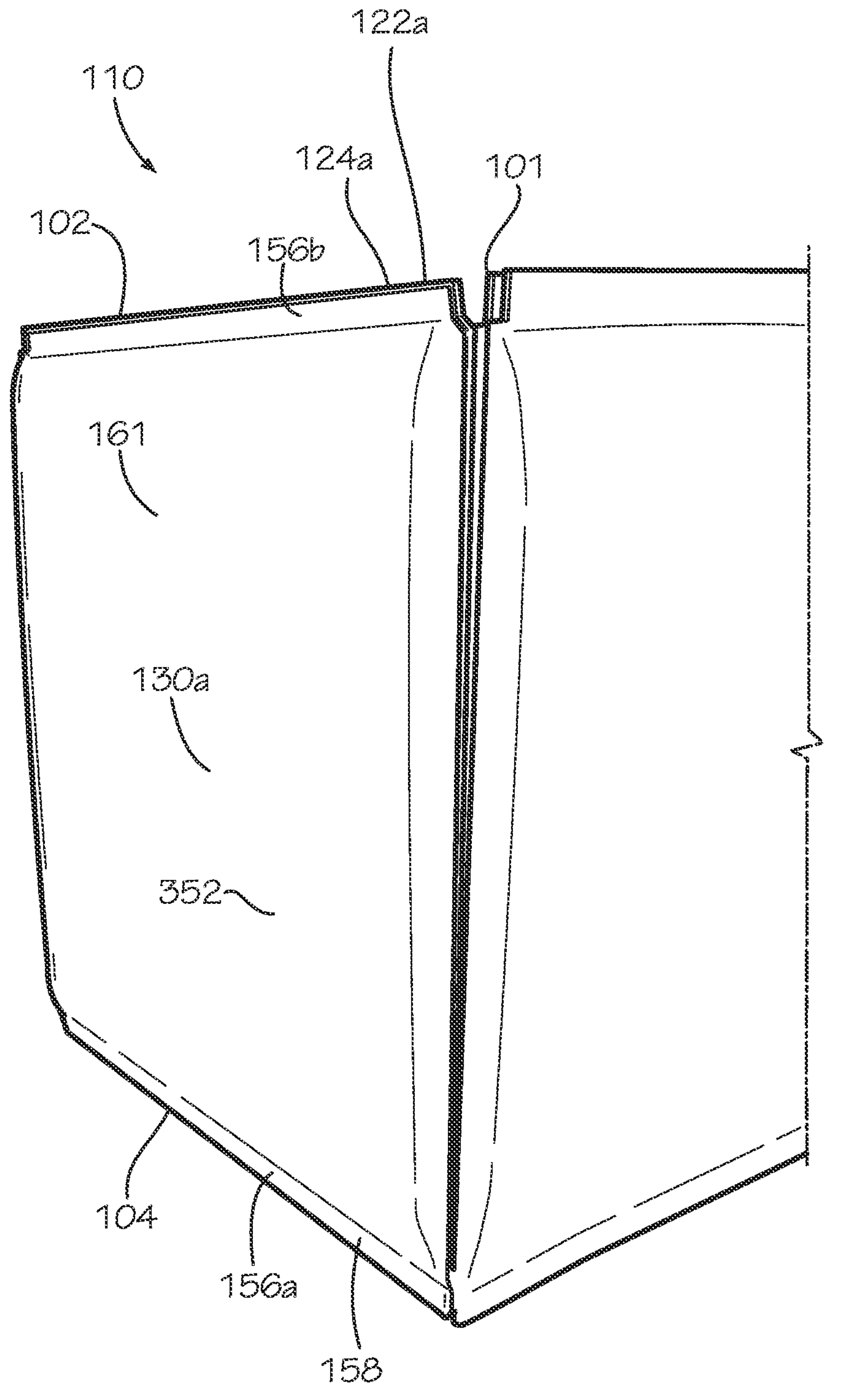
FIG. 6C is a perspective view of the insulated panel of FIG. 6A completely installed on the insulated box of FIG. 6A.

FIGS. 6A-C show perspective views of a method for attaching the insulated panel 130*a* to the side panel 122*a*. In FIG. 6A, the insulated panel 130*a* is shown partially attached to the side panel 122*a*. In the present aspect, the insulated panel 130*a* and the adjacent insulated panel 130*b* can be separate and isolated insulation panels 130 which are not connected together. By using isolated insulated panels 130, manufacturing stress around corners of the insulated box 110 can be reduced during assembly of the insulated box 110, thereby reducing the likelihood of ripping or tearing the insulated panels 130 during assembly. The insulated panel 130*a* can be positioned adjacent to the side panel 122*a*, and the bottom seam 156*b* can be attached to a perimeter area 656 of the outer side surface 328*a*. The perimeter area 656 can extend around the edges of the side panel 122*a*. Specifically, the bottom seam 156*b* can be attached to a bottom portion (not shown) of the perimeter area 656 extending along the bottom end 104 of the side panel 122*a*. The perimeter area 656 can also define a first portion 658*a* and a second portion 658*b* extending upwards from the bottom portion towards a top portion 658*c*. The top portion 658*c* can extend along the lip 124*a* proximate the top end 102 of the side panel 122*a*.

The bottom seam 156*b* of the border 158 can extend outwards from the insulated portion 161 of the insulated panel 130*a*, and the second sheet 354 of the bottom seam 156*b* can be attached to the outer side surface 328*a*. In other aspects, the bottom seam 156*b* can be folded inwards towards the insulation batt 350 (not shown) encapsulated within the insulated portion 161. The bottom seam 156*b* can be attached in facing contact with the side panel 122*a* by an adhesive such as a glue, epoxy, cement, mastic, or any other suitable adhesive. In other aspects, the bottom seam 156*b* can be mechanically attached to the side panel 122*a* such as with a hook-and-loop fastener, stitching, or staples, or other suitable fasteners. In the present aspect, the first side seam 356*a* and the second side seam 356*b* (shown in FIG. 6B) can be folded inwards towards the insulation batt 350 (not shown) encapsulated within the insulated portion 161. The first side seam 356*a* can be attached to the bottom portion (not shown) at an intersection between the bottom portion and the first portion 658*a* of the perimeter area 656. The second side seam 356*b* can be attached to the bottom portion (not shown) at an intersection between the bottom portion and the second portion 658*b* of the perimeter area 656.

In FIG. 6B, the insulated panel 130*a* is shown with the bottom seam 156*b* attached to the side panel 122*a*, and the first side seam 356*a* and the second side seam 356*b* partially attached to the first portion 658*a* and the second portion 658*b* of the perimeter area 656, respectively. The first sheet 352 of the first side seam 356*a* and the second side seam 356*b* can be attached in facing contact to the perimeter area 656 of the outer side surface 328*a* by an adhesive such as a glue, epoxy, cement, mastic, double-sided tape, cohesive, or other suitable adhesive. In other aspects, the first sheet 352 of the first side seam 356*a* and the second side seam 356*b* can be mechanically attached to the perimeter area 656 of the outer side surface 328*a*, such as with a hook-and-loop fastener, stitching, or staples, or other suitable fasteners. In the aspect shown, the insulated panel 130*a* is shown as first attached proximate the bottom end 104 and then subsequently attached upwards along the first side seam 356*a* and the second side seam 356*b* towards the top end 102; however, this sequence and direction of attachment are not limiting. The insulated panel 130*a* can first be attached at the first side seam 356*a*, the second side seam 356*b*, or the top seam 156*a* and further attached in a sideways or downwards direction, or in any other suitable sequence. In some aspects, the second sheet 354 of the insulated portion 161 can also be attached to the outer side surface 328*a* by an adhesive such as a glue, epoxy, cement, mastic, or any other suitable adhesive.

FIG. 6C shows the insulated panel 130*a* completely attached to the side panel 122*a*. The first side seam 356*a* (shown in FIG. 6B) can be completely attached to the first portion 658*a* (shown in FIG. 6B) of the perimeter area 656 (shown in FIG. 6B) from the bottom end 104 to the top end 102. The second side seam 356*b* (shown in FIG. 6B) can be completely attached to the second portion 658*b* (shown in FIG. 6B) of the perimeter area 656 (shown in FIG. 6B) from the bottom end 104 to the top end 102. The top seam 156*a* can be fully attached to the top portion 658*c* (shown in FIG. 6B) by an adhesive such as a glue, epoxy, cement, mastic, double-sided tape, cohesive, or any other suitable adhesive. In other aspects, the top seam 156*a* can be mechanically attached to the top portion 658*c*, such as with a hook-and-loop fastener, staples, or stitching, or other suitable fasteners.

The method for attaching the insulated panel 130*a* to the side panel 122*a* shown in FIGS. 6A-C can apply to any of the insulated panels 130*a-d*,140 and any of the adjacent panels 112*a,b*,122*a,b*,240. The method can also be used to attach the insulated panels 130*a-d* to an inner surface, such as inner side surfaces 326*a,b*, within the box cavity 206. The method is demonstrated on the assembled box 101, and the method is exemplary and not limiting. The various panels 112*a,b*,122*a,b*,306 of the box 101 can be clad with insulated panels 130*a-d* prior to assembly of the box 101. For example, the insulated panels 130*a-d*, can be attached to the respective panels 112*a,b*,122*a,b* of an unfolded box blank 710 (shown in FIG. 7). It can be desirable to attach the insulated panels 130*a-d* to the unfolded box blank 710 prior to assembly in order to reduce mechanical handling of the box 101.

Figure 7:
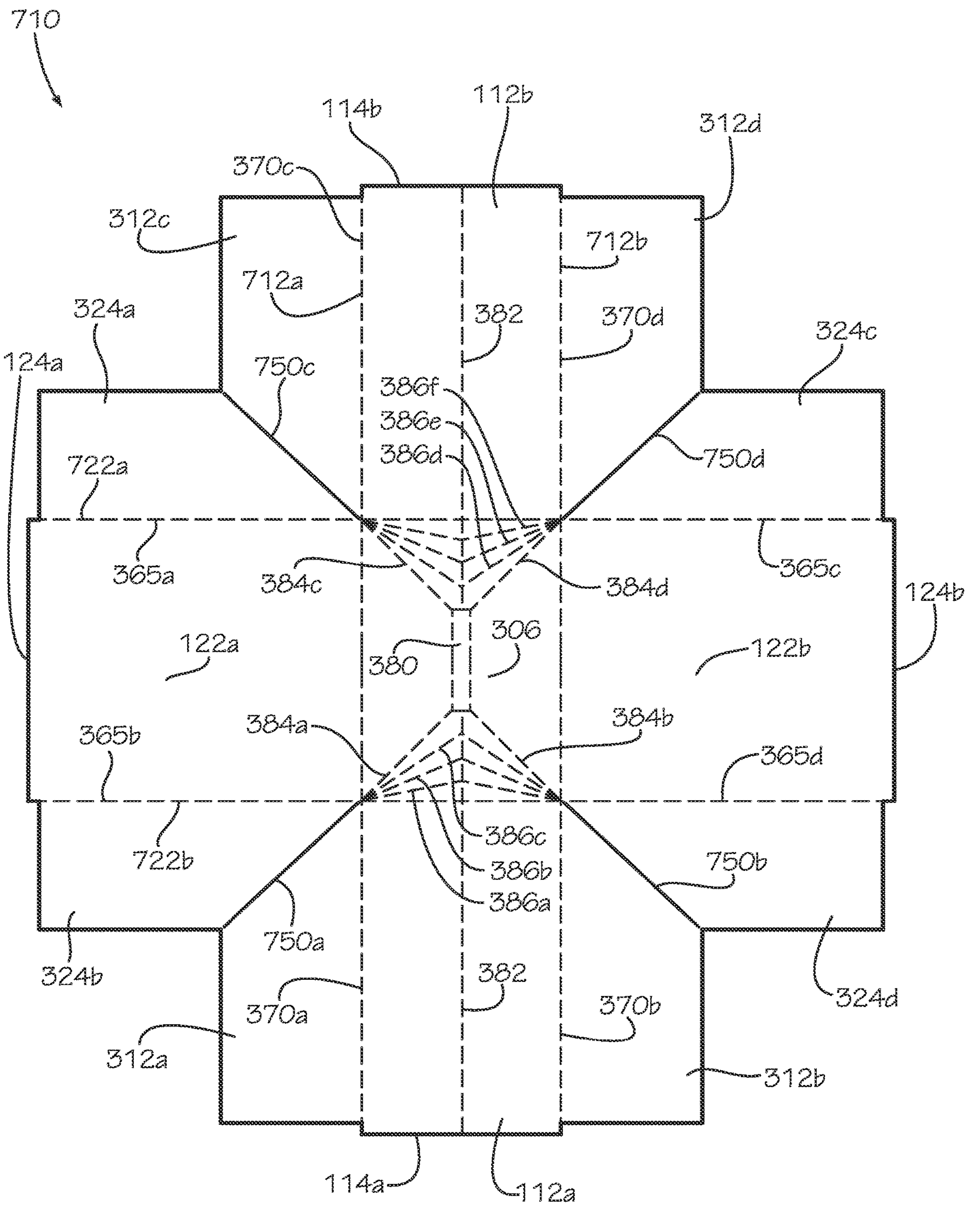
FIG. 7 is a top view of a box blank of the box of FIG. 6A.

FIG. 7 is a top view of the box blank 710 which can be assembled to form the box 101 of the insulated box 110. The box blank 710 can further define four corner cuts 750*a-d*. In other aspects, the box blank 710 can define fold lines or scored lines in place of the corner cuts 750*a*— d. A first corner cut 750*a* can extend outwards from the bottom panel 306 to separate the first wing 312*a* from the second wing 324*b*. A second corner cut 750*b* can extend outwards from the bottom panel 306 to separate the first wing 312*b* from the second wing 324*d*. A third corner cut 750*c* can extend outwards from the bottom panel 306 to separate the first wing 312*c* from the second wing 324*a*. A fourth corner cut 750*d* can extend outwards from the bottom panel 306 to separate the first wing 312*d* from the second wing 324*c*. In other aspects, the corner cuts 750*a-d* can be creases instead of cuts, and the adjacent wings 312*a-d*,324*a-d* can be hingedly connected by the corner cuts 750*a-d*.

The box blank 710 can define a first length fold line 712*a* and a second length fold line 712*b* extending from the side panel 112*a* to the side panel 112*b*. The first length fold line 712*a* can facilitate folding of the first wing 312*a* relative to the side panel 112*a*, the side panel 122*a* relative to the bottom panel 306, and the first wing 312*c* relative to the second side panel 112*b*. The second length fold line 712*b* can facilitate folding of the first wing 312*b* relative to the side panel 112*a*, the side panel 122*b* relative to the bottom panel 306, and the first wing 312*d* relative to the side panel 112*b*.

The box blank 710 can further define a first width fold line 722*a* and a second width fold line 722*b*. The width fold lines 722*a,b* can be defined substantially perpendicular to the length fold lines 712*a,b*. The first width fold line 722*a* can facilitate folding of the second wing 324*a* relative to the side panel 122*a*, the side panel 112*b* relative to the bottom panel 306, and the second wing 324*c* relative to the side panel 122*b*. The second width fold line 722*b* can facilitate folding of the second wing 324*b* relative to the side panel 122*a*, the side panel 112*a* relative to the bottom panel 306, and the second wing 324*d* relative to the side panel 122*b*.

The center fold line 382 can extend across and bisect each side panel 112*a,b*. The center fold line 382 facilitates each of the side panels 112*a,b* folding inwards about the center fold line 382 and towards the bottom panel 306 to facilitate collapsing the insulated box 110 as shown in FIG. 8.

In some aspects, the insulated panels 130*a-d* can be attached to the side panels 112*a,b*,122*a,b* to the unfolded box blank 710 prior to assembly. In other aspects, a single insulated panel 130*a,b* can be attached to the unfolded box blank 710 to cover the side panels 112*a,b*,122*a,b*, and in some aspects, the bottom panel 306 as well. In some aspects, the entire unfolded box blank 710 can be covered by a single insulated panel.

Figure 8:
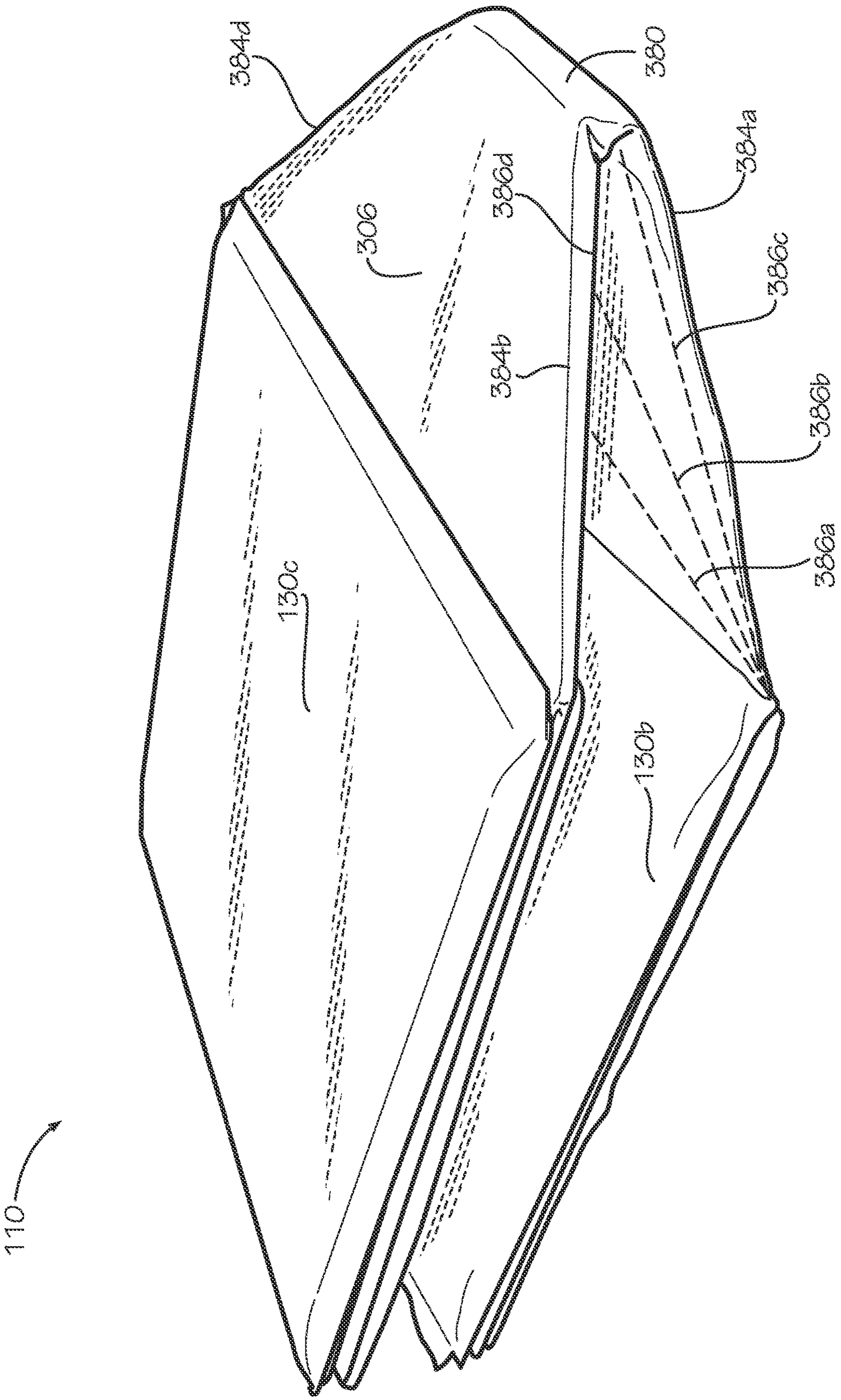
FIG. 8 is a perspective view of the insulated box of FIG. 1 in a collapsed configuration.

FIG. 8 is a perspective view of the insulated box 110 of FIG. 1 in a collapsed configuration. In the present view, the carrying accessory 170 is removed to better show the details of the bottom panel 306. As the insulated box 110 collapses, the side panels 122*a,b* (side panels 122*a,b* shown in FIG. 1) move inwards together and towards one another, and the side panels 112*a,b* fold inwards towards one another (side panels 112*a,b* shown in FIG. 1). The V-shaped fold lines 386*a-f* (V-shaped fold lines 386*e,f* shown in FIG. 7) cooperate to transition the bottom panel 306 from a substantially planar shape to the truncated pyramidal shape. In the truncated pyramidal shape, the center subpanel 380 extends outwards and away from the side panels 112*a,b* and the side panels 122*a,b* (shown in FIG. 7). Exerting a force upon the center subpanel 380, such as by pushing the box 101 against the ground can cause the insulated box 110 to self-expand into an expanded configuration (shown in FIG. 1) with a substantially rectangular prism shape. The self-expanding action can be desirable to allow for quick and easy reconfiguration of the insulated box 110, unlike many boxes which must be folded and taped together. The insulated boxes 110 can be shipped and stored in the collapsed configuration for space-efficient packing, and a user can simply press upon the center subpanel 380, such as by pressing the center subpanel 380 against the ground, and the insulated box 110 can reconfigure to the expanded configuration.

Figure 9:
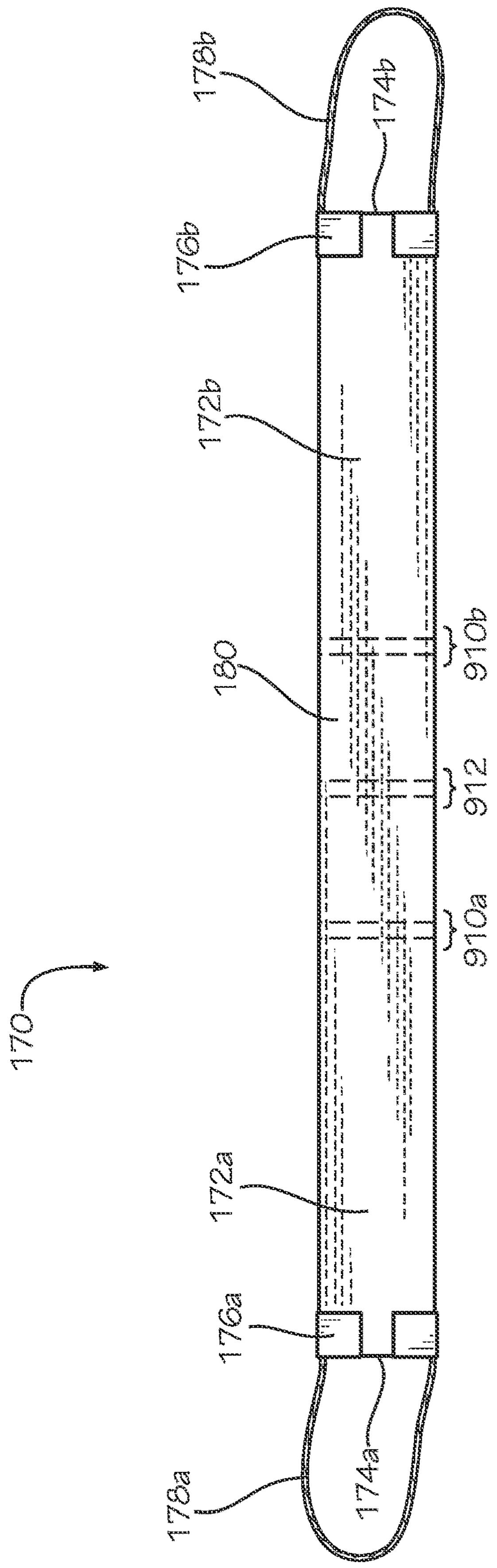
FIG. 9 is a top view of the carrying accessory of the insulated box assembly of FIG. 1.

FIG. 9 is a top view of the carrying accessory 170 of FIG. 1. As previously described, the carrying accessory 170 can be configured to extend beneath the insulated box 110 (shown in FIG. 1) to facilitate hand carrying of the insulated box 110. The carrying accessory 170 can define two pairs of fold lines 910*a,b*. A first pair of fold lines 910*a* can be defined between the first side portion 172*a* and the middle portion 180, and a second pair of fold lines 910*b* can be defined between the second side portion 172*b* and the middle portion 180. The fold lines of each pair of fold lines 910*a,b* can be placed closely together, such as an inch apart or less, and can be substantially parallel to one another. The pairs of fold lines 910*a,b* configure the carrying accessory 170 to closely conform to the bottom taper 458 (shown in FIG. 3) of the bottom end 104 of the insulated box 110. The middle portion 180 of the carrying accessory 170 can also define a pair of middle fold lines 912. The middle fold lines 912 can configure the carrying accessory 170 to closely conform to the truncated pyramidal shape of the bottom panel 306 (shown in FIG. 8) when the insulated box 110 is in the collapsed configuration as shown in FIG. 8. In other aspects each or any of the pairs of fold lines 910*a,b* and 912 can be substituted with single fold lines as desired.

Figure 10:
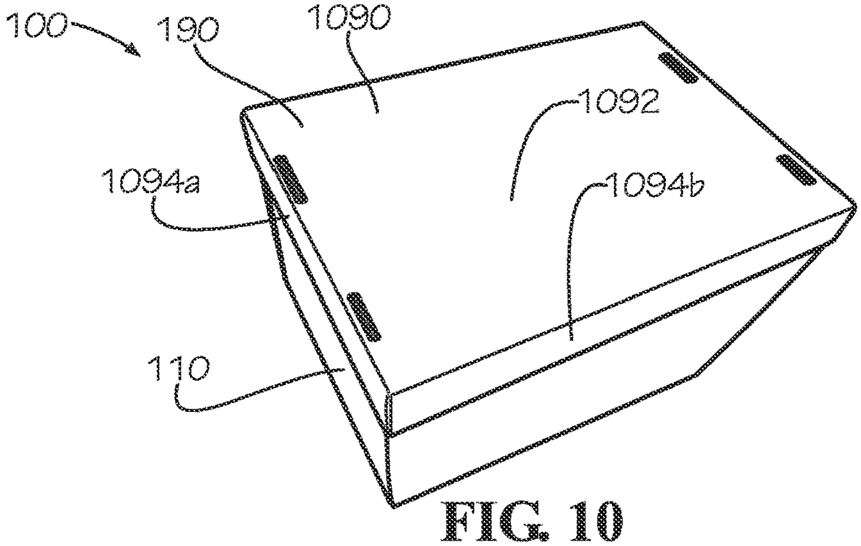
FIG. 10 is a perspective view of the insulated box assembly comprising the insulated box of FIG. 1 and another aspect of a box top in accordance with another aspect of the present disclosure.

FIG. 10 is a perspective view of the insulated box assembly 100 comprising the insulated box 110 of FIG. 1 and another aspect of a box top 190 in accordance with another aspect of the present disclosure. In the present aspect, the box top 190 can be a tray top 1090. The tray top 1090 can comprise a top panel 1092 and four side panels, as represented by side panels 1094*a,b*, extending down from the top panel 1092. The tray top 1090 can be configured to fit over the top end 102 of the box 101 (shown in FIG. 1). The side panels 1094 can fit over the lips 114*a,b*,124*a,b* (shown in FIG. 1) to enclose the box cavity 206 (shown in FIG. 2).

Figure 11:
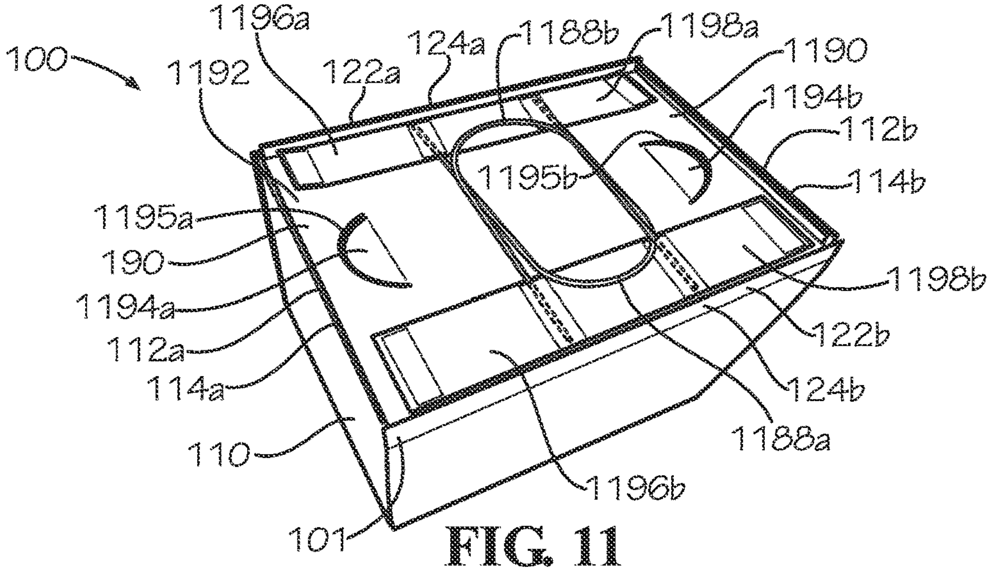
FIG. 11 is a perspective view of the insulated box assembly comprising the insulated box of FIG. 1 and another aspect of a box top in accordance with another aspect of the present disclosure.

FIG. 11 is a perspective view of the insulated box assembly 100 comprising the insulated box 110 of FIG. 1 and another aspect of a box top 190 in accordance with another aspect of the present disclosure. In the present aspect, the box top 190 can be a handle panel or handle top 1190. The handle top 1190 can comprise a top panel 1192 and a pair of side panels 1196*a,b* attached at opposite sides of the top panel 1192. In the present aspect, the top panel 1192 can be positioned between the lips 114*a,b*,124*a,b* of the box 101, and the side panels 1196*a,b* can be positioned adjacent to the side panels 124*a,b*. The side panels 1196*a,b* can be hingedly attached to the top panel 1192. The handle top 1190 can further comprise a pair of side tabs (not shown) which can be attached to the top panel 1192 and which can extend downwards into the box cavity 206 (shown in FIG. 2), adjacent to the side panels 112*a,b*. In some aspects, the side tabs of the handle top 1190 can be glued to either the inside or the outside of the side panels 112*a,b* to secure the handle top 1190 to the insulated box 110. In other aspects, the handle top 1190 can be secured to the insulated box 110 by tape, banding, a strap, or other restraint mechanism.

A handle loop 1188*a,b* can be attached to each side panel 1196*a,b*, respectively, by a tape strip 1198*a,b*. In the present aspect, the tape strips 1198*a,b* can extend completely around the respective side panel 1196*a,b* to secure the handle loop 1188*a,b* to the side panel 1196*a,b*. In the present aspect, the handle loops 1188*a,b* can be rope loops. The handle loops 1188*a,b* can allow a user to carry the insulated box assembly 100.

In the present aspect, the top panel 1192 can further comprise a pair of folding tabs 1194*a,b*. The folding tabs 1194*a,b* can cover a pair of hand holes 1195*a,b*, respectively. The folding tabs 1194*a,b* can be hingedly attached to the top panel 1192, and the folding tabs 1194*a,b* can be pressed inwards towards the box cavity 206. With the folding tabs 1194*a,b* pressed inwards, a user can put a finger or fingers through each of the hand holes 1195*a,b* to pick up the insulated box assembly 100. In some aspects, the hand holes 1195*a,b* can be positioned close enough together that a user can insert a thumb through a first of the hand holes 1195*a,b* and a finger through the second of the hand holes 1195*a,b* to pick up the insulated box assembly 100 with one hand. In some aspects, the handle top 1190 can comprise the handle loops 1188*a,b* but may not comprise the folding tabs 1194*a,b* or define the hand holes 1195*a,b*. In other aspects, the handle top 1190 can comprise the folding tabs 1194*a,b* and define the hand holes 1195*a,b* but may not comprise the handle loops 1188*a,b*.

Figure 12:
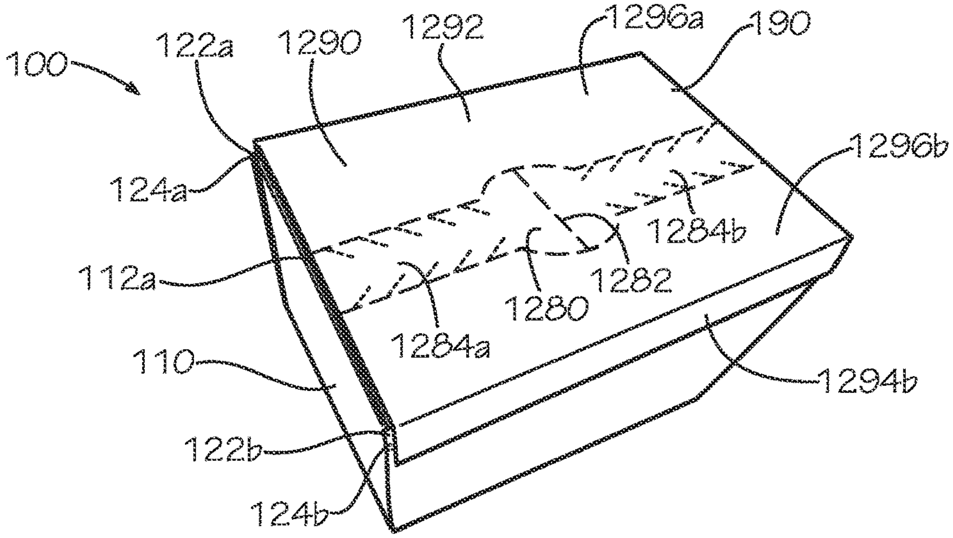
FIG. 12 is a perspective view of the insulated box assembly comprising the insulated box of FIG. 1 and another aspect of a box top in accordance with another aspect of the present disclosure.

FIG. 12 is a perspective view of the insulated box assembly 100 comprising the insulated box 110 of FIG. 1 and another aspect of a box top 190 in accordance with another aspect of the present disclosure. The box top 190 can be a zipper top 1290. The zipper top 1290 can comprise a top panel 1292 and a pair of side panels 1294, as represented by the side panel 1294*b*. The side panels 1294 can be hingedly attached to the top panel 1292. In the present aspect, the side panels 1294 can overlaps the lips 124*a,b* of the side panels 122*a,b* of the insulated box 110. The side panels 1294 can be attached to the side panels 122*a,b* by an adhesive, such as a glue, mastic, epoxy, cement, double-sided tape, or any other suitable material. In the present aspect, a strip of adhesive (not shown) can be covered by a backing strip (not shown), and the backing strip can be removed to adhere the side panels 1294 to the side panels 122*a,b*. The zipper top 1290 can further comprise a pair of tabs (not shown) which can be inserted into the box cavity 206 (shown in FIG. 2) and positioned adjacent to the side panels 112*a,b* (side panel 112*b* shown in FIG. 1). In other aspects, the tabs can be disposed external to the side panels 112*a,b*, similar to the side panels 1294. The tabs can be attached to the side panels 112*a,b* by the adhesive or the adhesive strip, and the tabs can seal the box cavity 206.

The top panel 1292 can define a zipper 1280 which can be defined by a perforations extending around the zipper 1280. The zipper 1280 can extend across the top panel 1292 and divide the top panel 1292 into a first top panel portion 1296*a* and a second top panel portion 1296*b*. The zipper 1280 can be divided into a first zipper portion 1284*a* and a second zipper portion 1284*b* by a center perforation line 1282. A user can press inwards on the center perforation line 1282 to separate the first zipper portion 1284*a* from the second zipper portion 1284*b*. Each zipper portion 1284*a,b* can then be ripped out of the top panel 1292 along the perforations, thereby detaching the first top panel portion 1296*a* from the second top panel portion 1296*b*. With the top panel portions 1296*a,b* detached, the top panel 1292 can be opened to allow access to contents within the box cavity 206.

In the present aspect, the sheets 352,354 can comprise paper, such as kraft paper; however, in other embodiments, the sheets can comprise posterboard, cardboard, plastic sheeting, cellulose film, cloth, or any other suitable material. In some aspects, the sheets can comprise a water-proof or water-resistant material, such as water-proof paper. In some aspects, a one of the sheets 352,354 of the insulated box assembly 100 can comprised a material different from another of the sheets 352,354. In the present aspect, the box 101 can comprise a paper fiber-based material such as corrugated cardboard or poster board; however, the box 101 can be comprised of any suitable rigid board material such as wood, plastic, metal, or any other material.

The insulation batts 350 can comprise paper or other paper fiber materials; however, in other aspects, the insulation batts can comprise cotton, foam, rubber, plastics, fiberglass, mineral wool, or any other flexible insulation material. In the present application, the insulation batts can be repulpable. In the present aspect, the insulated box assembly 100 can be 100% recyclable. In the present aspect, the insulated box assembly 100 can be single-stream recyclable wherein all materials comprised by the insulated box assembly 100 can be recycled by a single processing train without requiring separation of any materials or components of the insulated box assembly 100. In the present aspect, the insulated box assembly 100 can be compostable. In the present aspect, the insulated box assembly 100 can be repulpable. In the present aspect, insulated box assembly 100 and each of the insulated box 110 and the insulated panels 130*a*-*d*,430,140,510 can be repulpable in accordance with the requirements of the Aug. 16, 2013, revision of the "Voluntary Standard For Repulping and Recycling Corrugated Fiberboard Treated to Improve Its Performance in the Presence of Water and Water Vapor" provided by the Fibre Box Association of Elk Grove Village, IL which is hereby incorporated in its entirety. In the present aspect, insulated box assembly 100 and each of the insulated box 110 and the insulated panels 130*a*-*d*,430,140,510 can be recyclable in accordance with the requirements of the Aug. 16, 2013, revision of the "Voluntary Standard For Repulping and Recycling Corrugated Fiberboard Treated to Improve Its Performance in the Presence of Water and Water Vapor" provided by the Fibre Box Association of Elk Grove Village, IL.

Recyclable and repulpable insulation materials are further described in U.S. Patent Application No. 62/375,555, filed Aug. 16, 2016, U.S. Patent Application No. 62/419,894, filed Nov. 9, 2016, and U.S. Patent Application No. 62/437,365, filed Dec. 21, 2016, which are each incorporated by reference in their entirety herein.

The insulated box assembly 100 can be used in applications in which a user or mail carrier transports perishable or temperature-sensitive goods. For example and without limitation, the insulated box assembly 100 can be used to transport groceries. The insulated box assembly 100 can improve upon a common cardboard box by providing insulation to prevent spoilage of the contents.

In order to ship temperature-sensitive goods, common cardboard boxes are often packed with insulating materials made of plastics or foams which are not accepted by many recycling facilities or curb-side recycling programs in which a waste management service collects recyclables at a user's home. Consequently, shipping temperature-sensitive goods often produces non-recyclable waste which is deposited in landfills. The insulation materials often decompose very slowly, sometimes over the course of several centuries. In some instances, non-recyclable and non-biodegradable insulating materials can enter the oceans where the insulation materials can remain for years and harm marine life. In some aspects, the insulated box assembly 100 can reduce waste and pollution by comprising materials which are recyclable or biodegradable. In aspects in which the insulated box assembly 100 is curb-side or single-stream recyclable, the user may be more likely to recycle the insulated box assembly 100 due to the ease of curb-side collection.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. An insulated box assembly comprising:
- a box top comprising a handle panel, the handle panel comprising:
  - a first side panel;
  - a second side panel opposite the first side panel; and
  - a top panel hingedly coupled to the first side panel and the second side panel; and
- an insulated box comprising:
  - a box comprising a bottom panel and a side panel, the side panel attached to the bottom panel and defining a box cavity;
  - an insulated panel comprising an insulation batt attached to the side panel;
  - an insulated cavity panel disposed within the box cavity, the insulated cavity panel comprising a cavity insulation batt;
  - a first side panel defining a first lip; and
  - a second side panel defining a second lip;
- wherein:
  - the top panel is positioned between the first lip and the second lip of the insulated box;
  - the first side panel of the box top is adhered to the first side panel of the insulated box; and
  - the second side panel of the box top is adhered to the second side panel of the insulated box.

2. The insulated box assembly of claim 1, wherein at least a portion of the top panel of the box top extends downwards into the box cavity of the box.

3. The insulated box assembly of claim 1, wherein the box top comprises:
- a top panel; and
- wherein the pair of side panels of the box top are attached at opposite sides of the top panel.

4. The insulated box assembly of claim 3, wherein the pair of side panels of the box top are hingedly attached to the top panel.

5. The insulated box assembly of claim 3, wherein a pair of tabs extend downwards into the box cavity and attach the top panel of the box top to at least one of the first side panel and the second side panel of the insulated box.

6. The insulated box assembly of claim 3, wherein the box top comprises a pair of folding tabs hingedly attached to the top panel, the folding tabs covering a pair of hand holes in the top panel.

7. The insulated box assembly of claim 6, wherein the box top comprises the pair of folding tabs covering the pair of hand holes and a handle loop attached to the top panel.

8. The insulated box assembly of claim 3, wherein the box top comprises a handle loop attached to each of the pair of side panels of the box top opposite sides of the top panel.

9. The insulated box assembly of claim 8, wherein the handle loop is attached by a tape strip that extends completely around each panel of the pair of side panels.

10. An insulated box, comprising:

a bottom panel;

a first side panel attached to the bottom panel and defining a box cavity;

a first insulated panel comprising an insulation batt attached to the first side panel of the insulated box;

an insulated cavity panel disposed within the box cavity, the insulated cavity panel comprising a cavity insulation batt;

a box top attached to the first side panel and comprising a handle panel;

a second insulated panel attached to a second side panel;

a box opening of the box cavity disposed opposite from the bottom panel;

a first shoulder disposed proximate the box opening extends inwards into the box cavity from the first side panel;

a second shoulder disposed proximate the box opening extends inwards into the box cavity from the second side panel; and the handle panel of the box top rests upon the first shoulder and the second shoulder and encloses the box cavity.

11. The insulated box of claim 10, wherein:

the second side panel couples to the second insulated panel opposite the first side panel; and the box top hingedly couples to the first side panel and defines a first lip and the second side panel defines a second lip.

12. The insulated box of claim 10, wherein the box top comprises a top panel, a pair of folding tabs, and a handle loop attached to the top panel.

13. The insulated box of claim 10, wherein the box top comprises a top panel, and a pair of folding tabs hingedly attached to the top panel and covering a pair of hand holes in the top panel.

14. The insulated box of claim 10, wherein the box top comprises a top panel and the pair of side panels attached at opposite sides of the top panel.

15. The insulated box of claim 14, wherein the pair of side panels are hingedly attached to the top panel.

16. The insulated box of claim 10, further comprising a pair of handle loops attached to a pair of side portions of the box top.

* * * * *